United States Patent
Nishiuchi et al.

(10) Patent No.: US 7,217,328 B2
(45) Date of Patent: *May 15, 2007

(54) COMPOUND FOR RARE-EARTH BONDED MAGNET AND BONDED MAGNET USING THE COMPOUND

(75) Inventors: Takeshi Nishiuchi, Ibaraki (JP); Hirokazu Kanekiyo, Kyoto (JP); Satoshi Hirosawa, Otsu (JP); Toshio Miyoshi, Osaka (JP)

(73) Assignee: Neomax Co., Ltd., Osaka (JP)

( * ) Notice: Subject to any disclaimer, the term of this patent is extended or adjusted under 35 U.S.C. 154(b) by 279 days.

This patent is subject to a terminal disclaimer.

(21) Appl. No.: 10/642,324

(22) Filed: Aug. 18, 2003

(65) Prior Publication Data

US 2004/0099346 A1    May 27, 2004

Related U.S. Application Data

(63) Continuation-in-part of application No. PCT/JP02/12033, filed on Nov. 18, 2002, now abandoned, and a continuation-in-part of application No. 09/986,390, filed on Nov. 8, 2001, now Pat. No. 6,790,296.

(30) Foreign Application Priority Data

| Nov. 13, 2000 | (JP) | 2000-344567 |
| Nov. 20, 2000 | (JP) | 2000-352306 |
| Feb. 28, 2001 | (JP) | 2001-054252 |
| Sep. 7, 2001 | (JP) | 2001-271414 |
| Oct. 3, 2001 | (JP) | 2001-307819 |
| Nov. 20, 2001 | (JP) | 2001-354315 |

(51) Int. Cl.
 *H01F 1/053* (2006.01)
 *H01F 1/057* (2006.01)
(52) U.S. Cl. .................................. 148/302; 148/301

(58) Field of Classification Search ............... None
See application file for complete search history.

(56) References Cited

U.S. PATENT DOCUMENTS 4,585,473 A    4/1986 Narasimhan et al.

(Continued)

FOREIGN PATENT DOCUMENTS

DE    197 39 959    3/1998

(Continued)

OTHER PUBLICATIONS

Fumitoshi Yamashita, "Applications of Rare-Earth Magnets to the Small Motor Industry", Proceeding of the Seventeenth International Workshop, Aug. 18-22, 2002, Newark, Delaware, USA, pp. 100-111.

(Continued)

*Primary Examiner*—John P. Sheehan
(74) *Attorney, Agent, or Firm*—Keating & Bennett, LLP

(57) ABSTRACT

A compound for a rare-earth bonded magnet includes a rare-earth alloy powder and a binder. The rare-earth alloy powder includes at least about 2 mass % of Ti-containing nanocomposite magnet powder particles with a composition represented by $(Fe_{1-m}T_m)_{100-x-y-z}Q_xR_yM_z$, where T is Co and/or Ni; Q is B with or without C; R is at least one rare-earth element substantially excluding La and Ce; M is at least one metal element selected from Ti, Zr and Hf and always includes Ti; and $10<x\leq20$ at %; $6\leq y<10$ at %; $0.1\leq z\leq12$ at %; and $0\leq m\leq0.5$. The particles include at least two ferromagnetic crystalline phases, in which hard magnetic phases have an average crystal grain size of about 10 nm to about 200 nm, soft magnetic phases have an average crystal grain size of about 1 nm to about 100 nm; and the average crystal grain size of the soft magnetic phases is smaller than that of the hard magnetic phases.

20 Claims, 15 Drawing Sheets

U.S. PATENT DOCUMENTS

| | | | |
|---|---|---|---|
| 4,597,938 A | 7/1986 | Matsuura et al. | |
| 4,664,724 A | 5/1987 | Mizoguchi et al. | |
| 4,770,723 A | 9/1988 | Sagawa et al. | |
| 4,836,868 A | 6/1989 | Yajima et al. | |
| 4,845,837 A | 7/1989 | Lloyd | |
| 4,851,058 A * | 7/1989 | Croat | 148/302 |
| 4,935,074 A | 6/1990 | De Mooij et al. | |
| 4,994,109 A | 2/1991 | Willman et al. | |
| 5,022,939 A | 6/1991 | Yajima et al. | |
| 5,049,203 A | 9/1991 | Mukai et al. | |
| 5,049,208 A | 9/1991 | Yajima et al. | |
| 5,190,684 A | 3/1993 | Yamashita et al. | |
| 5,209,789 A | 5/1993 | Yoneyama et al. | |
| 5,225,004 A | 7/1993 | O'Handley et al. | |
| 5,230,749 A | 7/1993 | Fujimura et al. | |
| 5,240,513 A | 8/1993 | McCallum et al. | |
| 5,595,608 A | 1/1997 | Takebuchi et al. | |
| 5,597,425 A | 1/1997 | Akioka et al. | |
| 5,665,177 A | 9/1997 | Fukuno et al. | |
| 5,666,635 A | 9/1997 | Kaneko et al. | |
| 5,725,792 A | 3/1998 | Panchanathan | |
| 5,834,663 A | 11/1998 | Fukuno et al. | |
| 5,872,501 A | 2/1999 | Hamano et al. | |
| 5,905,424 A | 5/1999 | Panchanathan | |
| 6,022,424 A | 2/2000 | Sellers et al. | |
| 6,172,589 B1 | 1/2001 | Fujita et al. | |
| 6,183,571 B1 | 2/2001 | Inoue et al. | |
| 6,183,572 B1 | 2/2001 | Panchanathan et al. | |
| 6,280,536 B1 | 8/2001 | Inoue et al. | |
| 6,302,972 B1 | 10/2001 | Hirosawa et al. | |
| 6,332,933 B1 | 12/2001 | Ma et al. | |
| 6,352,599 B1 | 3/2002 | Chang et al. | |
| 6,386,269 B1 | 5/2002 | Kanekiyo et al. | |
| 6,471,786 B1 | 10/2002 | Shigemoto et al. | |
| 6,478,889 B2 | 11/2002 | Kanekiyo | |
| 6,648,984 B2 | 11/2003 | Takaki et al. | |
| 6,706,124 B2 | 3/2004 | Kanekiyo et al. | |
| 6,790,293 B2 | 9/2004 | Nomura | |
| 6,790,296 B2 | 9/2004 | Kanekiyo et al. | |
| 6,796,363 B2 | 9/2004 | Arai et al. | |
| 6,814,776 B2 | 11/2004 | Kanekiyo et al. | |
| 6,890,392 B2 | 5/2005 | Kanekiyo et al. | |
| 2001/0015239 A1 | 8/2001 | Kanekiyo | |
| 2002/0017339 A1 | 2/2002 | Kanekiyo et al. | |
| 2002/0117235 A1 | 8/2002 | Kanekiyo et al. | |
| 2003/0136468 A1 | 7/2003 | Kanekiyo et al. | |
| 2004/0020569 A1 | 2/2004 | Kanekiyo | |
| 2004/0051614 A1 | 3/2004 | Kanekiyo et al. | |
| 2004/0099346 A1 | 5/2004 | Nishiuchi et al. | |
| 2004/0134567 A1 | 7/2004 | Kanekiyo et al. | |
| 2004/0194856 A1 | 10/2004 | Miyoshi et al. | |
| 2005/0040923 A1 | 2/2005 | Miyoshi | |

FOREIGN PATENT DOCUMENTS

| | | |
|---|---|---|
| EP | 0 197 712 | 10/1986 |
| EP | 0 302 395 | 2/1989 |
| EP | 0 529 148 A2 | 3/1993 |
| EP | 0 632 471 | 1/1995 |
| EP | 06-32471 | 1/1995 |
| EP | 0 874 375 A1 | 10/1998 |
| EP | 0 959 478 A1 | 11/1999 |
| EP | 1 018 751 | 7/2000 |
| EP | 1 061 532 | 12/2000 |
| EP | 1 158 545 | 11/2001 |
| EP | 1 207 537 A1 | 5/2002 |
| EP | 1 371 434 A1 | 12/2003 |
| HU | 199904 | 7/1987 |
| JP | 59-046008 | 3/1984 |
| JP | 60-009852 | 1/1985 |
| JP | 61-140350 | 6/1986 |
| JP | 62-062503 | 3/1987 |
| JP | 63-155601 | 6/1988 |
| JP | 63-190138 | 8/1988 |
| JP | 63-301505 | 12/1988 |
| JP | 64-703 | 1/1989 |
| JP | 64-7501 | 1/1989 |
| JP | 64-7502 | 1/1989 |
| JP | 64-081301 | 3/1989 |
| JP | 1-100242 | 4/1989 |
| JP | 01-162702 | 6/1989 |
| JP | 01-204401 | 8/1989 |
| JP | 02-247307 | 10/1990 |
| JP | 2-298003 | 12/1990 |
| JP | 3-260018 | 11/1991 |
| JP | 3-261104 | 11/1991 |
| JP | 03-264653 | 11/1991 |
| JP | 04-147604 | 5/1992 |
| JP | 05-269549 | 10/1993 |
| JP | 05-315174 | 11/1993 |
| JP | 06-140235 | 5/1994 |
| JP | 06-338407 | 12/1994 |
| JP | 7-122412 | 5/1995 |
| JP | 07-226312 | 8/1995 |
| JP | 08-053710 | 2/1996 |
| JP | 08-124730 | 5/1996 |
| JP | 8-162312 | 6/1996 |
| JP | 8-167515 | 6/1996 |
| JP | 11-071646 | 6/1996 |
| JP | 08-322175 | 12/1996 |
| JP | 9-155507 | 6/1997 |
| JP | 09-155513 | 6/1997 |
| JP | 10-053844 | 2/1998 |
| JP | 10-282790 | 10/1998 |
| JP | 11-8109 | 1/1999 |
| JP | 11-101607 | 4/1999 |
| JP | 11-206075 | 7/1999 |
| JP | 11-323509 | 11/1999 |
| JP | 2000-079449 | 3/2000 |
| JP | 2000-079451 | 3/2000 |
| JP | 2000-234137 | 8/2000 |
| JP | 2000-235909 | 8/2000 |
| JP | 2000-348919 | 12/2000 |
| JP | 2001-244107 | 9/2001 |
| JP | 2001-354315 | 11/2001 |
| JP | 2002-64009 | 2/2002 |
| JP | 2002-80921 | 3/2002 |
| JP | 2002-175908 | 6/2002 |
| JP | 2002-212686 | 7/2002 |
| JP | 2002-239688 | 8/2002 |
| JP | 2002-302702 | 10/2002 |
| KR | 1998-16178 | 5/1998 |
| KR | 100201601 | 3/1999 |
| RU | 2 136 069 | 8/1999 |
| WO | WO 99/21196 | 4/1999 |
| WO | WO 00/03403 | 1/2000 |
| WO | WO 00/45397 | 8/2000 |
| WO | WO 00/52713 | 9/2000 |
| WO | WO 01/68297 | 9/2001 |
| WO | WO 02/067275 | 8/2002 |
| WO | WO 02/067275 A1 | 8/2002 |
| WO | WO 02/093591 A2 | 11/2002 |

OTHER PUBLICATIONS

L. Henderson Lewis et al., "Phase Composition and Magnetic Characteristics of Inert Gas-Atomized RE-Fe-B-Based Powders", IEEE Transactions on Magnetics, vol. 31, No. 6, Nov. 1995, pp. 3641-3643.

M.J. Kramer et al., "A Generalized Solidification Model and Microstructural Verification for the Nd-Fe-B-Ti-C System Processed by Rapid Solidification", J. Appl. Phys. 81(8), Apr. 1997. pp. 4459-4461.

Missell et al., "Rare-Earth Magnets and Their Applications," Proceedings of the 14th International Workshop, Sep. 1996, pp. 28-37, vol. 1, World Scientific, Singapore, new Jersey, London, Hong Kong.

Yao, J.M. et al, "Coercivity of Ti-modified ($\alpha$-Fe)-$Nd_2Fe_{14}B$ Nanocrystalline Alloys", Journal of Applied Physics, Nov. 15, 1994, pp. 7071-7073, vol. 76, No. 10, American Institute of Physics, Woodbury, New York, USA.

Z.S. Wronski, "Microstructure and Magnetic Properties of Low-Neodymium Nd-Fe-B-Si Magnets Produced from HP Gas Atomized Powder", J. Appl. Phys. 69(8), Apr. 1991, pp. 5507-5509.

D.J. Branagan, et al., "A New Generation of Gas Atomized Powder with Improved Levels of Energy Product and Processability", IEEE Transactions of Magnetics, vol. 32, No. 5, Sep. 1996, pp. 5097-5099.

Lewis L H et al, "Compositional Clustering in ND2FE14B Melt-Spun Ribbons" Journal of Applied Physics, American Institue of Physics. New York, US, vol. 87, No. 9, May 1, 2000, pp. 4735-4737.

Office Action issued Jun. 17, 2005. U.S. Appl. No. 10/432,862. "Nanocomposite Magnet."

Office Action issued Mar. 28, 2005. U.S. Appl. No. 10/381,005. "Iron-based rare earth alloy nanocomposite magnet and method for producing the same."

R. Coehoorn, et al., "Novel Permanent Magnetic Materials Made by Rapid Quenching", Journal de Physique, C8, Dec. 1988, pp. 669-670.

W.C. Chang, et al., "The Effects of Refractory Metals on the Magnetic Properties Of $\alpha$-Fe/$R_2Fe_{14}B$-Type Nanocomposites", IEEE, Transactions on Magnetics, vol. 35,No. 5, Sep. 1999, pp. 3265-3267.

W.C. Chang, et al., Magnetic and Microstructure Sudies of boron-enriched $(Nd_{0.95}La_{0.05})_{11}Fe_{76.5-x}Co_xTi_2B_{10.5}$ (x=0-15) Melt-Spun Ribbons, IEEE, Transactions on Magnetics, vol. 36, No. 5, Sep. 2000, pp. 312-3314.

W.C. Chang, et al., "High performance $\alpha$-Fe/$Nd_2Fe_{14}B$-type nancomposites", Applied Physics Letters, vol. 72 No. 1, Jan. 1998, pp. 121-123.

Chang, et al., "The effect of boron and rare earth contents on the magnetic properties of La and Cr substituted $\alpha$-Fe/$R_2Fe_{14}B$-Type Nanocomposites", Journal of Applied Physics, vol. 83 No. 11, Jun. 1998pp. 6271-6273.

G. Ya. Merkulova, et al., "The temperature dependence of coercivity in nanocrystalline Nd-Fe-B-(TiC)magnets", Journal of Applied Physics, Vo.87 No. 9, May 2000, pp. 4738-4740.

Chiriac, et al., "$Nd_8Fe_{73}Co_5Hf_2B_{12}$ strip cast alloy", Journal of Applied Physics, vol. 87 No. 9, May 2000, pp. 5338-5340.

J. Bernardi, et al., "Microstructural analysis of strip cast Nd-Fe-B alloys for high $(BH)_{max}$ magnets", Journal of Applied Physics, vol. 83 No. 11, Jun. 1998, pp. 6396-6398.

W.C. Chang, et al., "The effects of La-substitution on the microstructure and magnetic properties of nanocomposite NdFeB melt spun ribbons", Journal of Magnetism and Magnetic Materials, Vo.167 Nos. 1-2, Mar. 1997, pp. 65-70.

W.C. Chang, et al., "High performance $\alpha$-Fe/$R_2Fe_{14}$ B-type nanocomposites with nominal compositions of $(Nd, La)_{9.5}Fe_{78-x}Co_xCr_2B_{10.5}$ (x=0-10), Journal of Magnetism and Magnetic Materials", Vo. 189 No. 1, Oct. 1998, pp. 55-61.

R. Hermann, et al., "Growth kinetics in undercooled Nd-Fe-B alloys with carbon and Ti or Mo additions, Journal of Magnetism and Magnetic Materials", Vo.213 Nos. 1-2, Apr. 2000, pp. 82-86.

Q. Chen, et al., "A Study on the Phase Transformation and Exchange-coupling of $(Nd_{0.95}La_{0.05})_{9.5}$ $Fe_{bal}Co_5Nb2B_{10.5}$ Nanaocomposites, Materials Research Society Symposium Proceedings", Vo.577, Apr. 1999,pp. 209-219.

U.S. Appl. No. 09/863,902, H.Kanekiyo, et al., "Permanent Magent Including Multiple Ferromagnetic Phases and Method for Producing the Magnet", filed May 24, 2001.

Official Communication issued in a corresponding Hungarian Patent Application No. P0400631; dated Jul. 4, 2004.

Chang et al., "High Performance . . . Nanocomposites", pp. 121-123, Jan. 1998, Applied Physics Letters, vol. 72, No. 1.

* cited by examiner

COMPACTING

COMPOUND FOR RARE-EARTH BONDED MAGNET AND BONDED MAGNET USING THE COMPOUND

This is a Continuation-In-Part Application of U.S. patent application Ser. No. 09/986,390 filed Nov. 8, 2001, now U.S. Pat. No. 6,790,296, and International Application No. PCT/JP02/12033 filed Nov. 18, 2002, now abandoned, the contents of which applications are incorporated herein by reference.

BACKGROUND OF THE INVENTION

1. Field of the Invention

The present invention relates to a compound for a rare-earth bonded magnet and a rare-earth bonded magnet using such a compound.

2. Description of the Related Art

A bonded magnet is currently used in various types of electric equipment including motors, actuators, loudspeakers, meters and focus convergence rings. A bonded magnet is a magnet obtained by mixing together an alloy powder for a magnet (i.e., a magnet powder) and a binder (such as a resin or a low-melting metal) and then compacting and setting the mixture.

In the prior art, an Fe—R—B based magnet powder available from Magnequench International Inc. (which will be referred to herein as "MQI Inc."), or a so-called "MQ powder", is used extensively as a magnet powder for a bonded magnet. The MQ powder normally has a composition which is represented by the general formula: $Fe_{100-a-b}B_aR_b$ (where Fe is iron, B is boron, and R is at least one rare-earth element selected from the group consisting of Pr, Nd, Dy and Tb). In this general formula, a and b satisfy the inequalities 1 at %$\leq a \leq$6 at % and 10 at %$\leq b \leq$25 at %, respectively. The MQ powder is a rare-earth alloy powder with a high R mole fraction b.

A conventional alloy powder for a bonded magnet such as the MQ powder is obtained by rapidly cooling and solidifying a molten material alloy (i.e., "molten alloy"). As such a melt quenching process, a single roller method (typically, a melt spinning process) is often used. The single roller method is a method of cooling and solidifying a molten alloy by bringing the alloy into contact with a rotating chill roller. In this method, the resultant rapidly solidified alloy has the shape of a thin strip (or ribbon), which is elongated in the surface velocity direction of the chill roller. The thin-strip rapidly solidified alloy obtained in this manner is thermally treated and then pulverized to a mean particle size of 300 μm or less (or typically about 150 μm) to be a rare-earth alloy powder for a permanent magnet. In the following description, the rare-earth alloy powder obtained by such a melt quenching process will be simply referred to herein as a "conventional rapidly solidified magnet powder", which will not include the nanocomposite magnet powder to be described later.

By mixing the conventional rapidly solidified magnet powder with a resin (which will include herein rubber or elastomer), a compound for a bonded magnet (which will be simply referred to herein as a "compound") is prepared. An additive such as a lubricant or a coupling agent is sometimes mixed with this compound.

Thereafter, by compacting this compound into a desired shape by a compression, extrusion or injection molding process, for example, a bonded magnet is obtained as a compact for a permanent magnet (which will be sometimes referred to herein as a "permanent magnet body"). Also, the bonded magnet to be obtained by the compression or extrusion process includes the binder at a relatively low percentage, and may be further subjected to a surface treatment to protect the magnet powder from corrosion.

Meanwhile, an iron-based rare-earth alloy (e.g., Fe—R—B based, in particular) nanocomposite magnet (which is sometimes called an "exchange spring magnet") powder has recently been used more and more often as a magnet powder for a bonded magnet because such a magnet powder is relatively cost effective. The Fe—R—B based nanocomposite magnet is an iron-based alloy permanent magnet in which nanometer-scale crystals of iron-based borides (e.g., $Fe_3B$, $Fe_{23}B_6$ and other soft magnetic phases) and those of an $R_2Fe_{14}B$ phase as a hard magnetic phase are distributed uniformly within the same metal structure and are magnetically coupled together via exchange interactions (see Japanese Laid-Open Publication No. 2001-244107, for example).

The nanocomposite magnet includes soft magnetic phases and yet exhibits excellent magnetic properties due to the magnetic coupling (i.e., the exchange interactions) between the soft and hard magnetic phases. Also, since there are those soft magnetic phases including no rare-earth elements R such as Nd, the total percentage of the rare-earth elements R can be relatively low (a typical R mole fraction is 4.5 at %). This is advantageous for the purposes of reducing the manufacturing cost of magnets and supplying the magnets constantly. Furthermore, since R, which is active to oxygen, is included at a low percentage, the magnet also excels in anticorrosiveness. The nanocomposite magnet may also be made by a melt quenching process. Then, the nanocomposite magnet is pulverized by a predetermined method to obtain a nanocomposite magnet powder.

However, the conventional compound for a rare-earth bonded magnet, made of the alloy powder (or magnet powder) described above, has the following drawbacks.

Firstly, to obtain a uniform microcrystalline structure, which contributes to expressing excellent magnetic properties, for the conventional rapidly solidified magnet powder (e.g., the MQ powder), the molten alloy needs to be rapidly cooled and solidified at a relatively high rate. For example, when the conventional rapidly solidified magnet powder is made by a single roller method, the roller should have a surface velocity of 20 m/s or more to obtain a rapidly solidified alloy (typically in a thin strip shape) with a thickness of 50 μm or less (typically, 20 μm to 40 μm).

However, when the rapidly solidified alloy obtained in this manner is pulverized, the resultant powder will mostly consist of particles with aspect ratios of less than 0.3. If a compound for a rare-earth bonded magnet (which will be simply referred to herein as a "compound") is obtained by mixing the powder of such a shape and a binder together, the compound will exhibit poor flowability during an injection molding process, for example. Thus, such a compound may need to be compacted at a higher temperature and/or at a higher pressure, the types and applications of resins to be used may be limited, or the content of the magnet powder may be limited to ensure sufficient flowability. Also, it has been difficult to obtain a bonded magnet having a complex shape or a bonded magnet to fill a small gap (e.g., with a width of 2 mm) as in an IPM (interior permanent magnet) type motor including a magnet embedded rotor as disclosed in Japanese Laid-Open Publication No. 11-206075. As used herein, the "aspect ratio" means the ratio of the minor-axis size of a particle relative to the major-axis size thereof.

Furthermore, in a compound including the conventional rapidly solidified magnet powder (e.g., the MQ powder), the} magnet powder is easily oxidized in air, the properties of the magnet powder itself deteriorate due to the heat during an injection molding process, and the resultant bonded magnet may exhibit insufficient magnetic properties. The present inventors discovered via experiments that such oxidation was particularly noticeable when the conventional rapidly solidified magnet powder included particles with particle sizes of 53 μm or less.

Accordingly, when a bonded magnet is made of a compound including the conventional rapidly solidified magnet powder, the compacting temperature is limited to minimize the oxidation to be caused by the heat during the molding process. As a result, the compactability, including the flowability, must be sacrificed.

Furthermore, as for a compound to be subjected to an injection molding process or an extrusion process, the compound being prepared is exposed to the heat that is applied to melt a thermoplastic resin as a binder. Thus, during the manufacturing process, the magnet powder in the compound may be oxidized and the resultant magnetic properties may deteriorate.

Furthermore, when the injection-molded body is cut off from the runner portion, the magnet powder will be exposed on the resin surface on the cross section of the molded body. Also, the magnet powder itself may be exposed on the cross section. When the magnet powder is exposed in some areas in this manner, corrosion easily advances from those areas. This problem is particularly noticeable when the wettability between the resin and the magnet powder is poor. Also, it depends not only on a particular material combination but also on how the process step of mixing the resin and magnet powder material is carried out. Specifically, the conventional rapidly solidified magnet powder has a small aspect ratio, and is hard to mix uniformly in the compound preparing process step. Thus, in the resultant compound, the wettability between the resin and the magnet powder may be poor enough to expose the magnet powder particles here and there. Furthermore, since the magnet powder has a large aspect ratio, the magnet powder is crushed by shear force applied in the mixing process step to newly expose other cross sections easily. As a result, the magnet powder in the resultant compound is easily oxidizable.

On the other hand, the conventional Fe—R—B based nanocomposite magnet powder includes the rare-earth elements at a relatively low mole fraction and typically includes 30 vol % or less of hard magnetic phases. Thus, the magnetic properties (e.g., coercivity $H_{cJ}$) thereof are inferior to those of the conventional rapidly solidified magnet powder (such as the MQ powder). Accordingly, it is difficult to make a bonded magnet with sufficient magnetic properties from a compound including only the nanocomposite magnet powder as its magnet powder. For example, a bonded magnet for use in a motor for a hard disk drive (HDD) could not be made from such a nanocomposite magnet powder. For that reason, the conventional nanocomposite magnet powder described above needs to be mixed with the conventional rapidly solidified magnet powder. Consequently, it has been difficult so far to obtain a bonded magnet with excellent magnetic properties while totally eliminating the problems of the compound including the conventional rapidly solidified magnet powder.

SUMMARY OF THE INVENTION

In order to overcome the problems described above, preferred embodiments of the present invention provide a compound for a rare-earth bonded magnet, which can minimize the deterioration in magnetic properties due to heat applied to form a bonded magnet by a compaction process, can improve the compactability including flowability, and can make a rare-earth bonded magnet with excellent magnetic properties and anticorrosiveness.

A compound for a rare-earth bonded magnet according to a preferred embodiment of the present invention includes a rare-earth alloy powder and a binder. The rare-earth alloy powder includes at least about 2 mass % of Ti-containing nanocomposite magnet powder particles. The Ti-containing nanocomposite magnet powder particles have a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C and always includes B; R is at least one rare-earth element substantially excluding La and Ce; M is at least one metal element selected from the group consisting of Ti, Zr and Hf and always includes Ti; and the mole fractions x, y, z and m satisfy the inequalities of: 10 at %<x≦20 at %; 6 at %≦y<10 at %; 0.1 at %≦z≦12 at %; and 0≦m≦0.5, respectively. The Ti-containing nanocomposite magnet powder particles include at least two ferromagnetic crystalline phases, in which hard magnetic phases have an average crystal grain size of about 10 nm to about 200 nm, soft magnetic phases have an average crystal grain size of about 1 nm to about 100 nm, and the average crystal grain size of the soft magnetic phases is smaller than the average crystal grain size of the hard magnetic phases.

In one preferred embodiment, the soft magnetic phases are present on a grain boundary between the hard magnetic phases.

The Ti-containing nanocomposite magnet powder particles preferably have aspect ratios of about 0.3 to about 1.0.

The rare-earth alloy powder preferably includes at least about 10 mass % of the Ti-containing nanocomposite magnet powder particles with particle sizes of about 53 μm or less.

The rare-earth alloy powder preferably includes at least about 8 mass % of the Ti-containing nanocomposite magnet powder particles with particle sizes of about 38 μm or less.

The rare-earth alloy powder preferably includes at least about 70 mass % of the Ti-containing nanocomposite magnet powder particles.

The rare-earth alloy powder preferably consists essentially of the Ti-containing nanocomposite magnet powder particles.

The rare-earth alloy powder preferably has an oxygen content of less than about 0.24 mass % when left in the air for an hour at a heating temperature of approximately 300° C. More preferably, the rare-earth alloy powder has an oxygen content of about 0.20 mass % or less when left in the air for an hour at a heating temperature of approximately 350° C.

When left in the air at approximately 400° C. for 10 minutes, the compound preferably increases its mass by less than about 0.26 mass % due to oxidation.

The binder may include a thermoplastic resin. Alternatively, the binder may include a thermosetting resin and a thermoplastic resin.

The thermoplastic resin preferably has a softening point of about 180° C or more.

The compound preferably includes the rare-earth alloy powder at about 60 mass % to about 99 mass % with respect to the sum of the rare-earth alloy powder and the binder.

The rare-earth alloy powder is preferably made up of powder particles obtained by pulverizing a rapidly solidified alloy with a thickness of about 60 μm to about 300 μm.

The rare-earth alloy powder is preferably made up of powder particles obtained by pulverizing a rapidly solidified alloy that has been formed by a strip casting process.

The compound preferably further includes a coupling agent.

A rare-earth bonded magnet according to a preferred embodiment of the present invention is made of the compound for a rare-earth bonded magnet according to any of the preferred embodiments described above. A rare-earth bonded magnet according to a preferred embodiment is preferably made by an injection molding process. In this case, the rare-earth alloy powder is preferably loaded to at least about 60 vol %.

Other features, elements, characteristics and advantages of the present invention will become more apparent from the following detailed description of preferred embodiments thereof with reference to the attached drawings.

BRIEF DESCRIPTION OF DRAWINGS

FIGS. 16(a) and 16(b) are graphs showing the evaluated anticorrosiveness of bonded magnets made of compounds of Example No. 4 of preferred embodiments of the present invention and Comparative Examples Nos. 2 and 3 when those magnets were left in a high-temperature, high-humidity environment with a relative humidity of about 90%, wherein:

FIG. 16(a) is a graph plotting the mass increase percentage with respect to the time in which the magnet was left; and FIG. 16(b) is a graph plotting the variation in magnetic flux (Φ open) with respect to the time in which the magnet was left.

DETAILED DESCRIPTION OF PREFERRED EMBODIMENTS

Figure 1:
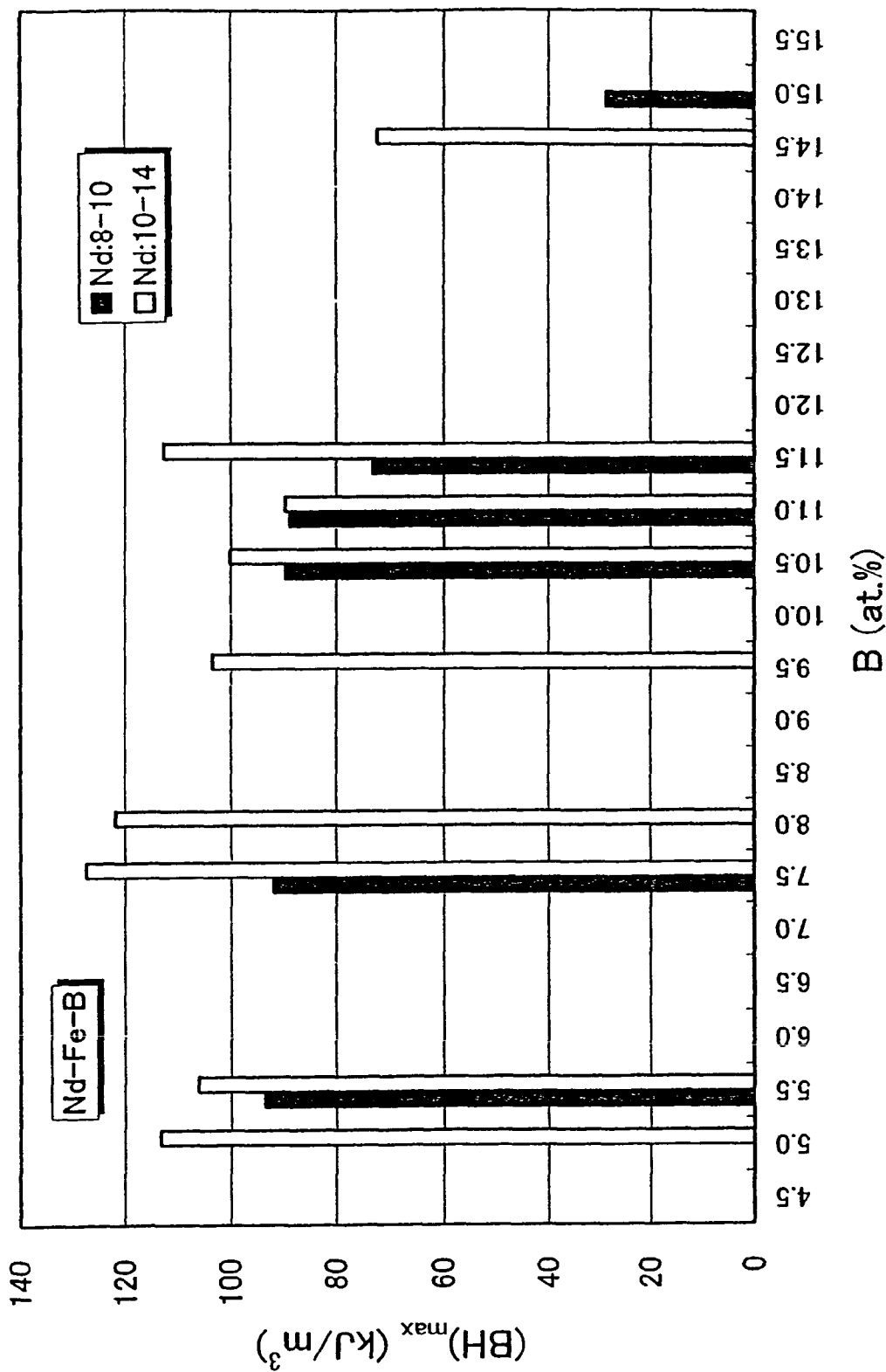
FIG. 1 is a graph showing a relationship between the maximum energy product $(BH)_{max}$ and the concentration of boron in an Nd—Fe—B nanocomposite magnet including no additive Ti, in which the white bars represent data about samples containing about 10 at % to about 14 at % of Nd, while the black bars represent data about samples containing about 8 at % to about 10 at % of Nd.

In a compound for a rare-earth bonded magnet according to preferred embodiments of the present invention, the rare-earth alloy powder included therein (which will be referred to herein as a "magnet powder" simply) includes at least about 2 mass % of Ti-containing powder for a nanocomposite magnet (which will be referred to herein as a "Ti-containing nanocomposite magnet powder").

The Ti-containing nanocomposite magnet powder has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C and always includes B; R is at least one rare-earth element substantially excluding La and Ce; M is at least one metal element selected from the group consisting of Ti, Zr and Hf and always includes Ti; and the mole fractions x, y, z and m satisfy the inequalities of: 10 at %<x≦20 at %; 6 at %≦y<10 at %; 0.1 at %≦z≦12 at %; and 0≦m≦0.5, respectively. The Ti-containing nanocomposite magnet powder includes at least two ferromagnetic crystalline phases, in which hard magnetic phases have an average crystal grain size of about 10 nm to about 200 nm, soft magnetic phases have an average crystal grain size of about 1 nm to about 100 nm, and the average crystal grain size of the soft magnetic phases is smaller than the average crystal grain size of the hard magnetic phases. In the general formula representing the composition of the Ti-containing nanocomposite magnet powder, the mole fractions x, y, z and m preferably satisfy the inequalities of 10 at %<x<17 at %, 7 at %≦y≦9.3 at % and 0.5 at %≦z≦6 at %, respectively. More preferably, 8≦y≦9.0 is satisfied. It should be noted that if 15 at %<x≦20 at %, then 3.0 at %<z<12 at % is preferably satisfied.

The Ti-containing nanocomposite magnet powder included in the compound of preferred embodiments of the present invention has the composition and structure described above. Accordingly, in the Ti-containing nanocomposite magnet powder, the hard and soft magnetic phases thereof are coupled together through magnetic exchange interactions. Thus, although the magnet powder includes a rare-earth element at a relatively low mole fraction, the magnet powder still exhibits excellent magnetic properties that are at least comparable to, or even better than, those of a conventional rapidly solidified magnet powder. Furthermore, the magnet powder has superior magnetic properties (of which the coercivity $H_{cJ}$ is particularly high) compared to those of a conventional nanocomposite magnet powder including an $Fe_3B$ phase as a main phase. Specifically, the Ti-containing nanocomposite magnet powder included in the compound of preferred embodiments of the present invention achieves a maximum energy product $(BH)_{max}$ of at least about 70 kJ/m$^3$, a coercivity $H_{cJ}$ of at least about 700 kA/m and a remanence $B_r$ of at least about 0.7 T, and may have a maximum energy product $(BH)_{max}$ of about 90 kJ/m$^3$ or more, a coercivity $H_{cJ}$ of about 800 kA/m or more and a remanence $B_r$ of about 0.8 T or more (see Table 3 to be described later). The Ti-containing nanocomposite magnet powder can easily achieve a coercivity $H_{cJ}$ of about 480 kA/m or more, which has been hard to achieve for the conventional nanocomposite magnet powder. Thus, even a compound including only the Ti-containing nanocomposite magnet powder can also be used in a broad variety of applications (e.g., various types of motors).

As described above, the Ti-containing nanocomposite magnet powder exhibits magnetic properties that are at least comparable to, or even better than, those of the conventional rapidly solidified magnet powder. Thus, a compound including the Ti-containing nanocomposite magnet powder instead of the conventional rapidly solidified magnet powder (e.g., MQ powder) can exhibit magnetic properties that are at least comparable to, or even better than, those of the conventional compound. Naturally, the compound may include, as its magnet powder, either the Ti-containing nanocomposite magnet powder alone or a mixture also including the conventional rapidly solidified magnet powder and/or the conventional nanocomposite magnet powder. Also, to achieve any of various other advantages such as cost reduction, the compound of various preferred embodiments of the present invention may further include a ferrite magnet powder, an Sm—Fe—N based magnet powder, or any other magnet powder.

As will be described later by way of illustrative examples, the compound of various preferred embodiments of the present invention includes at least 2 mass % of Ti-containing nanocomposite magnet powder in the overall magnet powder, thus exhibiting excellent compactibility and flowability in an injection molding or extrusion molding process. As a result, a bonded magnet with excellent magnetic properties can be obtained relatively easily, and other effects are also achieved. More preferably, at least about 5 mass % of the magnet powder in the compound is the Ti-containing nanocomposite magnet powder.

As will be described in detail later, due to the action of Ti, the Ti-containing nanocomposite magnet powder included in the compound of preferred embodiments of the present invention may also be obtained by quenching a molten alloy at a cooling rate (of $10^{2°}$ C./s to $10^{6°}$ C./s) that is lower than that of the conventional rapidly solidified magnet powder. For example, even when the roller surface velocity is approximately 15 m/s or less, an alloy with excellent magnetic properties can also be obtained. Accordingly, even if a (thin-strip) rapidly solidified alloy is formed thicker (e.g., to a thickness of about 60 μm or more) than the conventional one by a strip casting process, the metal structure described above can also be obtained. The strip casting process promises good mass productivity. Thus, a Ti-containing nanocomposite magnet powder exhibiting stabilized magnetic properties can be manufactured at a relatively low cost.

If a rapidly solidified alloy with a thickness of about 60 μm to about 300 μm, for example, is formed by a strip casting process and then pulverized by a pin disk mill, for example, such that the magnet powder has a mean particle size of about 70 μm, then a powder, consisting of particles with aspect ratios of about 0.3 to about 1.0, can be obtained relatively easily. Also, the rapidly solidified alloy for the Ti-containing nanocomposite magnet powder is made up of smaller crystal grains than the conventional rapidly solidified alloy. Thus, the former rapidly solidified alloy is easily broken in random directions, thus making powder particles having an isometric shape (i.e., having an aspect ratio close to one) relatively easily. Accordingly, by controlling the conditions of the pulverization process, a powder consisting of particles with aspect ratios of at least about 0.4 can also be obtained easily.

Alternatively, the Ti-containing nanocomposite magnet powder may also be prepared by an atomization process (e.g., a gas atomization process), which results in an even lower cooling rate (of $10^{2°}$ C./s to $10^{4°}$ C./s) than the strip casting process. According to an atomization process, a Ti-containing nanocomposite magnet powder having a mean particle size of about 1 μm to about 100 μm and an aspect ratio close to one (i.e., spherical) can be directly obtained from a molten alloy. Thus, the atomization process, requiring no fine pulverization process, is superior in mass productivity to even the strip casting process.

Compared to a compound including the conventional rapidly solidified magnet powder with aspect ratios of less than about 0.3, the compound including the Ti-containing nanocomposite magnet powder, consisting of particles with aspect ratios of at least about 0.3 (more preferably, at least about 0.4), exhibits superior compactibility and flowability. By mixing at least about 2 mass % of Ti-containing nanocomposite magnet powder, having aspect ratios of about 0.3 to about 1.0, with respect to the overall magnet powder in the compound, the flowability is improvable. To further improve the flowability, the magnet powder in the compound preferably includes at least about 5 mass % of Ti-containing nanocomposite magnet powder with aspect ratios of about 0.3 or more.

In the Ti-containing nanocomposite magnet powder, the rare-earth element R is included at a relatively low mole fraction, small boride phases are dispersed so as to surround the $R_2Fe_{14}B$ phase, and those boride phases include a greater amount of Ti than any other phase, because Ti exhibits high affinity for boron. Thus, the Ti-containing nanocomposite magnet powder is superior to the conventional rapidly solidified magnet powder in oxidation resistance.

The Ti-containing nanocomposite magnet powder exhibits excellent oxidation resistance, and is not oxidized easily even at a temperature at which the compound is compacted (e.g., about 300° C.) as will be described in detail later with reference to Table 1. Also, even in the process step of preparing the compound including the Ti-containing nanocomposite magnet powder, the compound is not affected by the oxidation of the magnet powder easily. Instead, the compound maintains the excellent magnetic properties of the Ti-containing nanocomposite magnet powder. In addition, as will be described later for specific examples, the compound itself also exhibits excellent oxidation resistance. When the Ti-containing nanocomposite magnet powder and the conventional rapidly solidified magnet powder and/or the conventional nanocomposite magnet powder are used as a mixture, the compound is preferably prepared using a magnet powder, which has had its mixing ratio adjusted so as to have an oxygen content of less than about 0.24 mass % when left in the air for one hour at a heating temperature of about 300° C. More preferably, the compound is prepared so as to have an oxygen content of about 0.20 mass % or less when left in the air for one hour at a heating temperature of about 350° C.

Furthermore, since the Ti-containing nanocomposite magnet powder exhibits excellent oxidation resistance, resins with high melting or softening points (e.g., polyimides, liquid crystal polymers and high-molecular-weight-grade resins), which are hard to use in the prior art, and metals having higher melting points than the conventional ones may also be used as binders. For example, even when a thermoplastic resin having a softening point of about 180° C. or more (or even about 250° C. or more as in polyphenylene sulfide resin) is used, a compound to be injection molded, exhibiting excellent magnetic properties and compactibility, can be obtained. It should be noted that the softening point of a resin is herein obtained by a Vicat softening point test (described in JIS K6870, for example) no matter whether the resin is crystalline or amorphous. Also, even when a thermosetting resin is used, the resin can be cured at a higher setting temperature than the conventional one. Furthermore, since the magnet powder itself exhibits excellent anticorrosiveness, the magnet performance deteriorates extremely slightly even when the thermosetting process is carried out in the air. That is to say, there is no need to carry out the thermosetting process in an inert atmosphere, and therefore, the process cost can be significantly decreased. Furthermore, since such heat-resistant resins can be used, a heating/degassing process, which is carried out to minimize the emission of an unwanted gas from a resin coating for an HDD, for example, can be performed at a higher temperature. Thus, a bonded magnet that can be used more effectively in an HDD, for example, can be obtained.

By using such a resin having a higher softening point or a higher setting temperature than the conventional one, the properties of the bonded magnet (e.g., heat resistance and mechanical properties) can be improved. To ensure sufficient thermal oxidation resistance, when the mixture of the Ti-containing nanocomposite magnet powder and the conventional rapidly solidified magnet powder and/or the conventional nanocomposite magnet powder is used, the compound is preferably prepared so as to increase its mass due to oxidation by no greater than about 0.26 mass % when left in the air for about 10 minutes at approximately 400° C.

The conventional rapidly solidified magnet powder includes the rare-earth element R at a relatively high mole fraction, and is oxidizable relatively easily. Thus, the smaller the particle size, the morn significantly the magnetic properties are deteriorated due to the oxidation of the surface of the powder particles. In contrast, in the Ti-containing nanocomposite magnet powder, the magnetic properties thereof are deteriorated due to oxidation to a much lesser degree, and even relatively small particles (e.g., with particle sizes of about 53 µm or less) show almost no deterioration in magnetic properties due to oxidation. Accordingly, in the magnet powder included in the compound, the powder particles having particle sizes of about 53 µm or less are preferably those of the Ti-containing nanocomposite magnet powder.

Also, considering the packability of the magnet powder, the magnet powder preferably includes those powder particles with particle sizes of at most about 53 µm at about 10 mass % or more, and more preferably at about 20 mass % or more. Furthermore, a compound for use to make a high-density compact preferably includes a magnet powder including at least about 8 mass % of powder particles with particle sizes of about 38 µm or less. Even when powder particles with particle sizes of about 53 µm or less are included at about 20 mass % or more in the Ti-containing nanocomposite magnet powder, the magnet powder for a bonded magnet never exhibits deteriorated magnetic properties. Compared with a magnet powder for a bonded magnet, including the same amount of conventional rapidly solidified magnet powder with particle sizes of about 53 µm or less, the magnetic properties are rather improved.

A magnet powder for a bonded magnet is normally made up of particles with a maximum particle size of about 500 µm or less (typically about 300 µm or less). To improve the packability, the magnet powder preferably includes a rather high percentage of particles with particle sizes of about 53 µm or less (or about 38 µm or less, in particular). In the conventional rapidly solidified magnet powder, however, particles with relatively small particle sizes exhibit inferior magnetic properties as described above. Thus, to improve the magnetic properties, the packability has to be sacrificed. Conversely, to improve the packability, the magnetic properties have to be sacrificed.

In contrast, in the Ti-containing nanocomposite magnet powder, even particles with small particle sizes also exhibit excellent magnetic properties. Thus, even when the magnet powder prepared includes small particles (e.g., with particle sizes of about 53 µm or less) at a relatively high percentage, the magnetic properties do not deteriorate. For example, even if a magnet powder having a particle size distribution as disclosed in Japanese Laid-Open Publication No. 63-155601 is prepared, there is no need to sacrifice the magnetic properties. It should be noted that the particle size distribution may be controlled by classifying the Ti-containing nanocomposite magnet powder, obtained by the method described above, depending on the necessity.

When a compound is prepared by using a magnet powder including the Ti-containing nanocomposite magnet powder, not only the compactibility but also the magnetic properties of the resultant bonded magnet can be improved effectively (this is also true even when the Ti-containing nanocomposite magnet powder is mixed with the conventional rapidly solidified magnet powder). This effect is achieved not just because of the difference in magnetic properties between the Ti-containing nanocomposite magnet powder and the conventional rapidly solidified magnet powder but also because the deterioration in magnetic properties, which is usually caused due to the oxidation of the conventional rapidly solidified magnet powder in the compound, can be minimized by using the Ti-containing nanocomposite magnet powder. Specifically, the deterioration is minimized because the compound preparing process step and compacting process step can be carried out at lower temperatures when the Ti-containing nanocomposite magnet powder is used. That is to say, in the compound of preferred embodiments of the present invention, the Ti-containing nanocomposite magnet powder itself does exhibit excellent oxidation resistance. In addition, the unwanted oxidation of the conventional rapidly solidified magnet powder, which is used in combination with the Ti-containing nanocomposite magnet powder during the manufacturing process of the bonded magnet and which exhibits inferior oxidation resistance, can also be minimized.

Furthermore, the compound including the Ti-containing nanocomposite magnet powder exhibits excellent compactibility and flowability. Thus, the load on an apparatus for use in a kneading process (such as a kneader) can be lightened. As a result, the productivity of the compound increases and the manufacturing cost decreases. Furthermore, the resin and the magnet powder can be kneaded (or mixed) together well enough. Thus, a compound with good anticorrosiveness, in which the surface of the magnet powder particles is well coated with the resin, can be obtained. Also, the amount of impurities to enter the compound during the kneading process can be decreased as well. Furthermore, since the kneading and compacting process steps can be carried out at lower temperatures, the deterioration of the resin can be minimized during the kneading and compacting process steps. To further improve the wettability, kneadability and bond strength between the resin and the magnet powder, a coupling agent is preferably added. The coupling agent may be added either in advance to the surface of the magnet powder or during the process step of mixing the magnet powder with the resin. By adding the coupling agent, the kneading torque can be decreased and the effects of the present invention are achieved more fully.

To make full use of the excellent magnetic properties, oxidation resistance, and improved compactibility and flowability of the Ti-containing nanocomposite magnet powder at the same time, at least about 70 mass % of the overall magnet powder is preferably the Ti-containing nanocomposite magnet powder. Most preferably, only the Ti-containing nanocomposite magnet powder should be used.

The compound of preferred embodiments of the present invention exhibits good compactibility. Thus, the gap percentage of the compact can be reduced and a bonded magnet with an increased magnet powder packability can be obtained. Also, when a thermosetting resin is used as the resin binder and when the mixture is compacted by a compression process, a bonded magnet with a magnet powder packability of about 80 vol % or more can be obtained easily. On the other hand, when a thermoplastic resin is used as the resin binder and when the mixture is compacted by an injection molding process, a bonded magnet with a magnet powder packability of about 60 vol % or more can be obtained easily. In this manner, a bonded magnet with a higher packability can be obtained. As a result, a bonded magnet, exhibiting magnetic properties superior to the conventional ones, is provided.

Hereinafter, a compound for a rare-earth bonded magnet according to preferred embodiments of the present invention will be described in further detail.

Ti-containing Nanocomposite Magnet Powder

The Ti-containing nanocomposite magnet powder to be included as at least a portion of the compound for a rare-earth bonded magnet according to preferred embodiments of the present invention is formed by rapidly cooling and solidifying a melt of an Fe—R—B alloy containing Ti. This rapidly solidified alloy includes crystalline phases. However, if necessary, the alloy is heated and further crystallized.

The present inventors discovered that when Ti was added to an iron-based rare-earth alloy with a composition defined by a particular combination of mole fraction ranges, the nucleation and growth of an α-Fe phase, often observed while the melt is cooled and obstructing the expression of excellent magnetic properties (e.g., high coercivity and good loop squareness of the demagnetization curve among other things), could be minimized and the crystal growth of an $R_2Fe_{14}B$ compound phase, contributing to hard magnetic properties, could be advanced preferentially and uniformly.

Unless Ti is added, the α-Fe phase easily nucleates and grows faster and earlier than an $Nd_2Fe_{14}B$ phase. Accordingly, when the rapidly solidified alloy is thermally treated to be crystallized, the α-Fe phase with soft magnetic properties will have grown excessively and no excellent magnetic properties (e.g., $H_{cJ}$ and loop squareness, in particular) will be achieved.

In contrast, where Ti is added, the nucleation and growth kinetics of the α-Fe phase would be slowed down, i.e., it would take a longer time for the α-Fe phase to nucleate and grow. Thus, the present inventors believe that the $Nd_2Fe_{14}B$ phase would start to nucleate and grow before the α-Fe phase has nucleated and grown coarsely. For that reason, the $Nd_2Fe_{14}B$ phase can be grown sufficiently and distributed uniformly before the α-Fe phase grows too much. Furthermore, it is believed that Ti is hardly included in the $Nd_2Fe_{14}B$ phase, but present profusely in the iron-based boride or in the interface between the $Nd_2Fe_{14}B$ phase and the iron-based boride phase, thus stabilizing the iron-based boride.

That is to say, the Ti-containing nanocomposite magnet powder for use in the compound of preferred embodiments of the present invention can have a nanocomposite structure in which Ti contributes to significant reduction in grain size of the soft magnetic phases (including the iron-based boride and α-Fe phases), uniform distribution of the $Nd_2Fe_{14}B$ phase and increase in volume percentage of the $Nd_2Fe_{14}B$ phase. As a result, compared to the situation where no Ti is added, the coercivity and magnetization (or remanence) increase and the loop squareness of the demagnetization curve improves, thus contributing to achieving excellent magnetic properties in the resultant bonded magnet.

Hereinafter, the Ti-containing nanocomposite magnet powder for use in the compound of preferred embodiments of the present invention will be described in further detail.

The Ti-containing nanocomposite magnet powder included at least in the compound of preferred embodiments of the present invention is preferably represented by the general formula: $(Fe_{1-m}T_m)_{100-x-y-z}Q_xR_yM_z$, where T is at least one element selected from the group consisting of Co and Ni; Q is at least one element selected from the group consisting of B (boron) and C (carbon) and always includes B; R is at least one rare-earth element substantially excluding La and Ce; and M is at least one metal element selected from the group consisting of Ti, Zr and Hf and always includes Ti.

The mole fractions x, y, z and m preferably satisfy the inequalities of: 10 at %<x≦20 at %; 6 at %≦y<10 at %; 0.1 at %≦z≦12 at %; and 0≦m≦0.5, respectively.

The Ti-containing nanocomposite magnet powder includes a rare-earth element at as small a mole fraction as less than about 10 at %. However, since Ti has been added, the magnet powder achieves the unexpected results of keeping, or even increasing, the magnetization (remanence) $B_r$ and improving the loop squareness of the demagnetization curve thereof compared to the situation where no Ti is added.

In the Ti-containing nanocomposite magnet powder, the soft magnetic phases have a very small grain size. Accordingly, the respective constituent phases are coupled together through exchange interactions. For that reason, even though soft magnetic phases such as iron-based boride and α-Fe phases are present along with the hard magnetic $R_2Fe_{14}B$ compound phase, the alloy as a whole can exhibit excellent squareness at the demagnetization curve thereof.

The Ti-containing nanocomposite magnet powder preferably includes iron-based borides and α-Fe phases with a saturation magnetization equal to, or even higher than, that of the $R_2Fe_{14}B$ compound phase. Examples of those iron-based borides include $Fe_3B$ (with a saturation magnetization of about 1.5 T) and $Fe_{23}B_6$ (with a saturation magnetization of about 1.6 T). In this case, the $R_2Fe_{14}B$ phase has a saturation magnetization of about 1.6 T when R is Nd, and the α-Fe phase has a saturation magnetization of about 2.1 T.

Normally, where the mole fraction x of B is greater than about 10 at % and the mole fraction y of the rare-earth element R is about 5 at % to about 8 at %, $R_2Fe_{23}B_3$ is produced. However, even when a material alloy with such a composition is used, the addition of Ti as is done in preferred embodiments of the present invention can produce $R_2Fe_{14}B$ phase and soft magnetic iron-based boride phases such as $Fe_{23}B_6$ and $Fe_3B$, instead of the unwanted $R_2Fe_{23}B_3$ phase. That is to say, when Ti is added, the percentage of the $R_2Fe_{14}B$ phase can be increased and the iron-based boride phases produced contribute to increasing the magnetization.

The present inventors discovered via experiments that only when Ti was added, the magnetization did not decrease but rather increased as opposed to any other metal element additive such as V, Cr, Mn, Nb or Mo. Also, when Ti was added, the loop squareness of the demagnetization curve was much better than that obtained by adding any of these elements.

Furthermore, these effects achieved by the additive Ti are particularly significant where the concentration of B is greater than about 10 at %. Hereinafter, this point will be described with reference to FIG. 1.

Figure 2:
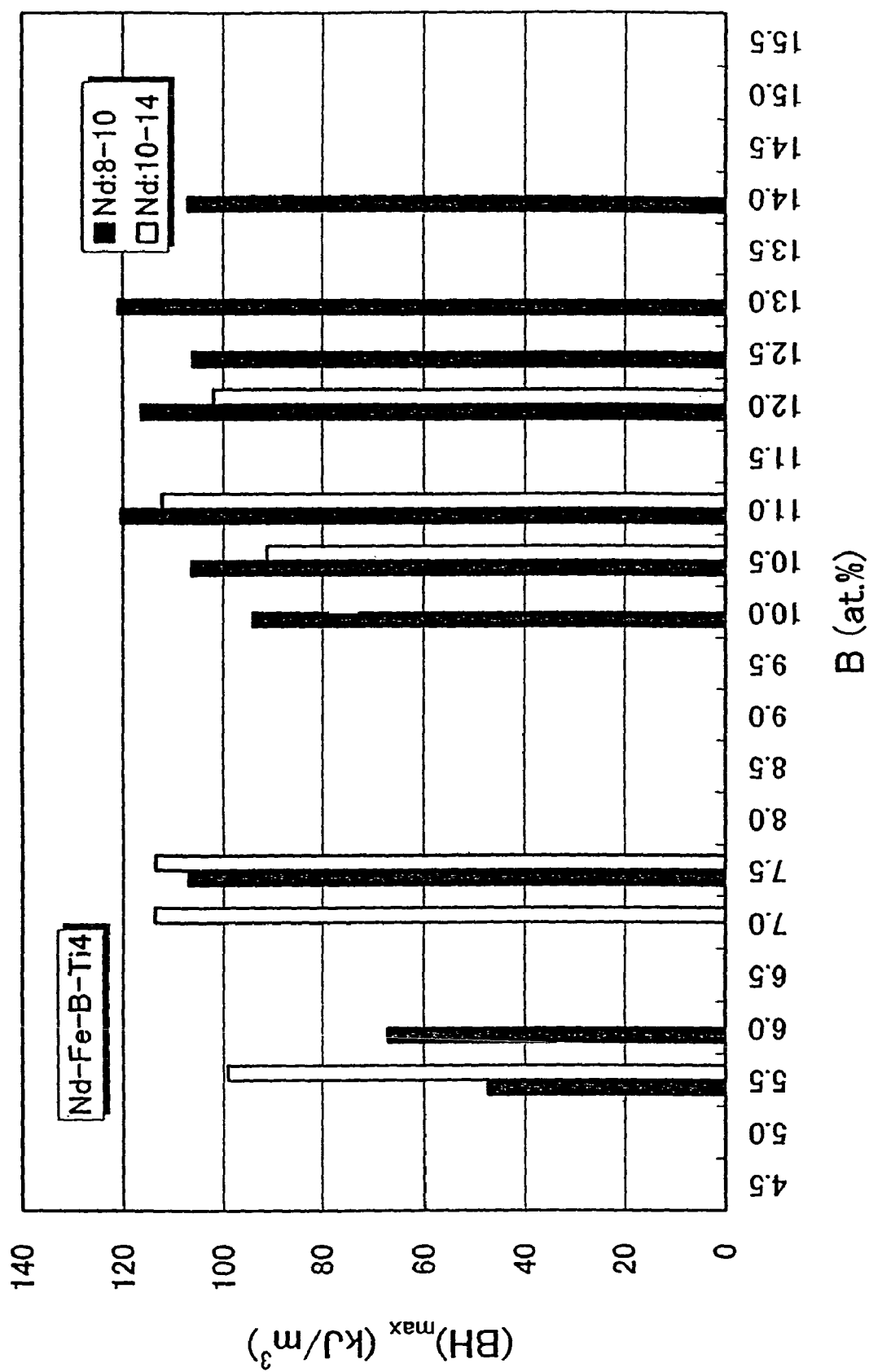
FIG. 2 is a graph showing a relationship between the maximum energy product $(BH)_{max}$ and the concentration of boron in an Nd—Fe—B nanocomposite magnet including additive Ti, in which the white bars represent data about samples containing about 10 at % to about 14 at % of Nd, while the black bars represent data about samples containing about 8 at % to about 10 at % of Nd.

FIG. 1 is a graph showing a relationship between the maximum energy product $(BH)_{max}$ and the concentration of B in an Nd—Fe—B magnet alloy to which no Ti is added. In FIG. 1, the white bars represent data about samples containing about 10 at % to about 14 at % of Nd, while the black bars represent data about samples containing about 8 at % to less than about 10 at % of Nd. On the other hand, FIG. 2 is a graph showing a relationship between the maximum energy product $(BH)_{max}$ and the concentration of B in an Nd—Fe—B magnet alloy to which Ti is added. In FIG. 2, the white bars represent data about samples containing about 10 at % to about 14 at % of Nd, while the black bars represent data about samples containing about 8 at % to less than about 10 at % of Nd.

As can be seen from FIG. 1, once the concentration of B exceeds about 10 at %, the samples including no Ti exhibit decreased maximum energy products $(BH)_{max}$ no matter how much Nd is contained therein. Where the content of Nd is about 8 at % to 10 at %, this decrease is particularly noticeable. This tendency has been well known in the art and it has been widely believed that any magnet alloy, including an $Nd_2Fe_{14}B$ phase as its main phase, should not contain more than about 10 at % of B. For instance, U.S. Pat. No. 4,836,868 discloses a working example in which B has a concentration of about 5 at % to about 9.5 at %. This patent teaches that the concentration of B is preferably about 4 at % to less than about 12 at %, more preferably about 4 at % to about 10 at %.

In contrast, as can be seen from FIG. 2, the samples including the additive Ti show increased maximum energy products $(BH)_{max}$ in a certain range where the B concentration is greater than about 10 at %. This increase is particularly remarkable where the Nd content is about 8 at % to about 10 at %.

Thus, preferred embodiments of the present invention have successfully overcome and reversed the conventional misbelief that a B concentration of greater than about 10 at % degrades the magnetic properties and achieves the unexpected effects described above just by adding Ti. As a result, a magnet powder, contributing to advantageous features of the compound of preferred embodiments of the present invention described above, can be obtained.

Next, a method of making the Ti-containing nanocomposite magnet powder, at least included in the compound for a rare-earth bonded magnet of preferred embodiments of the present invention, will be described.

Rapidly Solidified Alloy for Ti-containing Nanocomposite Magnet Powder

A melt of the iron-based alloy with the composition represented by the general formula: $(Fe_{1-m}T_m)_{100-x-y-z}Q_xR_yM_z$ (where x, y, z and m satisfy 10 at %<x≦20 at %, 6 at %≦y<10 at %, 0.1 at %≦z≦12 at % and 0≦m≦0.5, respectively) is rapidly cooled within an inert atmosphere, thereby preparing a rapidly solidified alloy including an $R_2Fe_{14}B$ compound phase at about 60 volume % or more. The average crystal grain size of the $R_2Fe_{14}B$ compound phase in the rapidly solidified alloy can be about 80 nm or less, for example. If necessary, this rapidly solidified alloy may be heat-treated. Then, the amorphous phases remaining in the rapidly solidified alloy can be crystallized.

In a preferred embodiment in which a melt spinning process or a strip casting process is carried out by using a chill roller, the molten alloy is rapidly cooled within an atmosphere having a pressure of about 1.3 kPa or more. Then, the molten alloy is not just rapidly cooled through the contact with the chill roller but also further cooled appropriately due to the secondary cooling effects caused by the atmospheric gas even after the solidified alloy has left the chill roller.

According to the results of experiments the present inventors carried out, while the rapid cooling process is performed, the atmospheric gas should have its pressure controlled preferably at about 1.3 kPa or more but the atmospheric pressure (=101.3 kPa) or less, more preferably about 10 kPa to about 90 kPa, and even more preferably about 20 kPa to about 60 kPa.

Where the atmospheric gas has a pressure falling within any of these preferred ranges, the surface velocity of the chill roller is preferably about 4 m/s to about 50 m/s. This is because if the roller surface velocity is lower than about 4 m/s, then the $R_2Fe_{14}B$ compound phase, included in the rapidly solidified alloy, will have excessively large crystal grains. In that case, the $R_2Fe_{14}B$ compound phase will further increase its grain size when thermally treated, thus possibly deteriorating the resultant magnetic properties.

According to the experimental results the present inventors obtained, the roller surface velocity is more preferably about 5 m/s to about 30 m/s, even more preferably about 5 m/s to about 20 m/s.

When a material alloy having the composition of the Ti-containing nanocomposite magnet powder included in the compound of preferred embodiments of the present invention is rapidly cooled and solidified, the resultant rapidly solidified alloy has either a structure in which almost no α-Fe phase with an excessively large grain size precipitates but a microcrystalline $R_2Fe_{14}B$ compound phase exists instead or a structure in which the microcrystalline $R_2Fe_{14}B$ compound phase and an amorphous phase coexist. Accordingly, when such a rapidly solidified alloy is thermally treated, a high-performance nanocomposite magnet, in which soft magnetic phases such as iron-based boride phases are dispersed finely or distributed uniformly on the grain boundary between the hard magnetic phases, will be obtained. As used herein, the "amorphous phase" means not only a phase in which the atomic arrangement is sufficiently disordered but also a phase including embryos for crystallization, extremely small crystalline regions (with a size of several nanometers or less), and/or atomic clusters. More specifically, the "amorphous phase" herein means any phase of which the crystal structure cannot be defined by an X-ray diffraction analysis or a TEM observation.

In the prior art, even when one tries to obtain a rapidly solidified alloy including 60 volume % or more of $R_2Fe_{14}B$ compound phase by rapidly cooling a molten alloy with a composition that is similar to that of the Ti-containing nanocomposite magnet powder included in the compound of the present invention but that includes no Ti, the resultant alloy will have a structure in which a lot of α-Fe phase has grown coarsely. Thus, when the alloy is heated and crystallized after that, the α-Fe phase will increase its grain size excessively. Once soft magnetic phases such as the α-Fe phase have grown too much, the magnetic properties of the alloy deteriorate significantly, thus making it virtually impossible to produce a quality bonded magnet out of such an alloy.

Particularly with a material alloy containing B at a relatively high percentage like the Ti-containing nanocomposite magnet powder included in the compound of preferred embodiments of the present invention, even if the molten alloy is preferably cooled at a low rate, crystalline phases cannot be produced so easily according to the conventional method. This is because the B-rich molten alloy highly likely creates an amorphous phase. For that reason, in the prior art, even if one tries to make a rapidly solidified alloy including about 60 volume % or more of $R_2Fe_{14}B$ compound phase by decreasing the cooling rate of the melt sufficiently, not only the $R_2Fe_{14}B$ compound phase but also the α-Fe phase or its precursor will precipitate a lot. Thus, when that alloy is heated and crystallized after that, the α-Fe phase will further grow to deteriorate the magnetic properties of the alloy seriously.

Thus, it was widely believed that the best way of increasing the coercivity of a material alloy for a nanocomposite magnet powder was cooling a melt at an increased rate to amorphize most of the rapidly solidified alloy first and then forming a highly fine and uniform structure by heating and crystallizing the amorphous phases. This is because in conventional methods, it was taken for granted that there was no other alternative but crystallizing the amorphous phases through an easily controllable heat treatment process to obtain a nanocomposite magnet having an alloy structure in which crystalline phases of very small sizes are dispersed.

Based on this popular belief, W. C. Chan et al., reported a technique of obtaining $Nd_2Fe_{14}B$ and α-Fe phases with grain sizes on the order of several tens nm. According to Chan's technique, La, which excels in producing the amorphous phases, is added to a material alloy. Next, the material alloy is melt quenched to obtain a rapidly solidified alloy mainly composed of the amorphous phases. And then the alloy is heated and crystallized. See W. C. Chan et al., "The Effects of Refractory Metals on the Magnetic Properties of α-Fe/$R_2Fe_{14}B$-type Nanocomposites", IEEE Trans. Magn. No. 5, INTERMAG. 99, Kyongju, Korea, pp. 3265–3267, 1999. This article also teaches that adding a refractory metal element such as Ti in a very small amount (e.g., 2 at %) improves the magnetic properties and that the mole fraction of Nd, rare-earth element, is preferably increased from 9.5 at % to 11.0 at % to reduce the grain sizes of the $Nd_2Fe_{14}B$ and α-Fe phases. The refractory metal is added to prevent borides such as $R_2Fe_{23}B_3$ and $Fe_3B$ from being produced and to make a material alloy for a magnet powder consisting essentially of $Nd_2Fe_{14}B$ and α-Fe phases only.

In contrast, in the Ti-containing nanocomposite magnet powder included in the compound of preferred embodiments of the present invention, the additive Ti minimizes the nucleation of the α-Fe phase during the rapid solidification process. In addition, the additive Ti also produces soft magnetic phases such as iron-based borides and yet minimizes the grain growth thereof during the heat treatment process for crystallization. As a result, a magnet powder having excellent magnetic properties can be obtained.

That is to say, even though the material alloy includes a rare-earth element at a relatively low percentage (i.e., 9 at % or less), a magnet powder, exhibiting high magnetization (or remanence) and coercivity and showing excellent loop squareness at its demagnetization curve, can be obtained.

As described above, the coercivity of the material alloy for the Ti-containing nanocomposite magnet powder is increased by making the $Nd_2Fe_{14}B$ phase nucleate and grow faster and earlier in the cooling process so that the $Nd_2Fe_{14}B$ phase increases its volume percentage and yet by minimizing the grain coarsening of the soft magnetic phases. Also, the magnetization thereof increases because the additive Ti can produce a boride phase (e.g., ferromagnetic iron-based borides) from the B-rich non-magnetic amorphous phases existing in the rapidly solidified alloy and can increase the volume percentage of the ferromagnetic phases in the heated and crystallized alloy.

The material alloy obtained in this manner is preferably heated and crystallized depending on the necessity to form a structure with three or more crystalline phases including $R_2Fe_{14}B$ compound, boride and α-Fe phases. The heat treatment is preferably conducted with its temperature and duration controlled in such a manner that the $R_2Fe_{14}B$ compound phase will have an average crystal grain size of about 10 nm to about 200 nm and that the boride and α-Fe phases will have an average crystal grain size of about 1 nm to about 100 nm. The $R_2Fe_{14}B$ compound phase normally has an average crystal grain size of about 30 nm or more, which may be about 50 nm or more depending on the conditions. On the other hand, the soft magnetic phases, such as boride and α-Fe phases, often have an average crystal grain size of about 30 nm or less and typically several nanometers at most.

Figure 3:
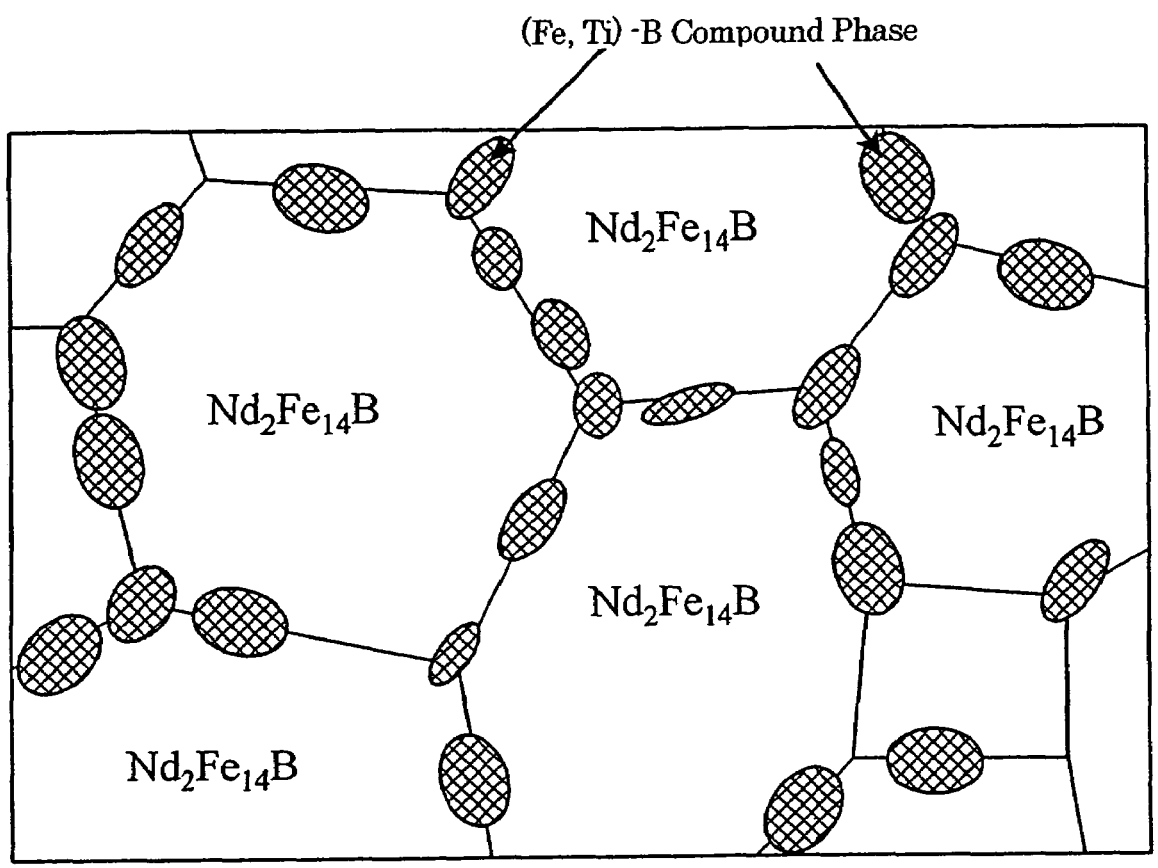
FIG. 3 schematically illustrates an $R_2Fe_{14}B$ compound phase and an (Fe, Ti)-B phase in the magnet of a preferred embodiment of the present invention.

In the material alloy for the Ti-containing nanocomposite magnet powder, the $R_2Fe_{14}B$ compound phase (hard magnetic phase) has a greater average crystal grain size than the soft magnetic phases such as α-Fe and iron-based boride phases. FIG. 3 schematically illustrates the metal structure of this material alloy. As shown in FIG. 3, fine soft magnetic phases are distributed on the grain boundary of relatively large $R_2Fe_{14}B$ compound phases. Even though the $R_2Fe_{14}B$ compound phase has a relatively large average crystal grain size, the soft magnetic phases have a sufficiently small average crystal grain size because the crystal growth thereof has been minimized. Accordingly, these constituent phases are magnetically coupled together through exchange interactions and the magnetization directions of the soft magnetic phases are constrained by the hard magnetic phase. Consequently, the alloy as a whole can exhibit excellent loon squareness at its demagnetization curve.

In the manufacturing process described above, borides are easily produced. The reason is believed to be as follows. When a solidified alloy, mostly composed of the $R_2Fe_{14}B$ compound phase, is made, the amorphous phases existing in the rapidly solidified alloy should contain an excessive amount of B. Accordingly, when the alloy is heated and crystallized, that B will bond to other elements easily, thus nucleating and growing in profusion. However, if that B bonds to other elements and produces compounds with low magnetization, then the alloy as a whole will have decreased magnetization.

The present inventors discovered and confirmed via experiments that only when Ti was added, the magnetization did not decrease but rather increased as opposed to any other metal element additive such as V, Cr, Mn, Nb or Mo. Also, the additive M (Ti, in particular) improved the loop squareness of the demagnetization curve far better than any of the elements cited above did. Accordingly, the present inventors believe that Ti plays a key role in minimizing the production of borides with low magnetization. Particularly when relatively small amounts of B and Ti are included in the material alloy for use to prepare the Ti-containing nanocomposite magnet powder, iron-based boride phases with ferromagnetic properties will easily grow while the alloy is heat-treated. In that case, B included in the non-magnetic amorphous phases would be absorbed into the iron-based borides. As a result, the non-magnetic amorphous phases, remaining even in the alloy that has been heated and crystallized, decrease their volume percentage but the ferromagnetic crystalline phase increases its volume percentage instead, thus increasing the remanence $B_r$.

Hereinafter, this point will be further discussed with reference to FIG. 4.

Figure 4:
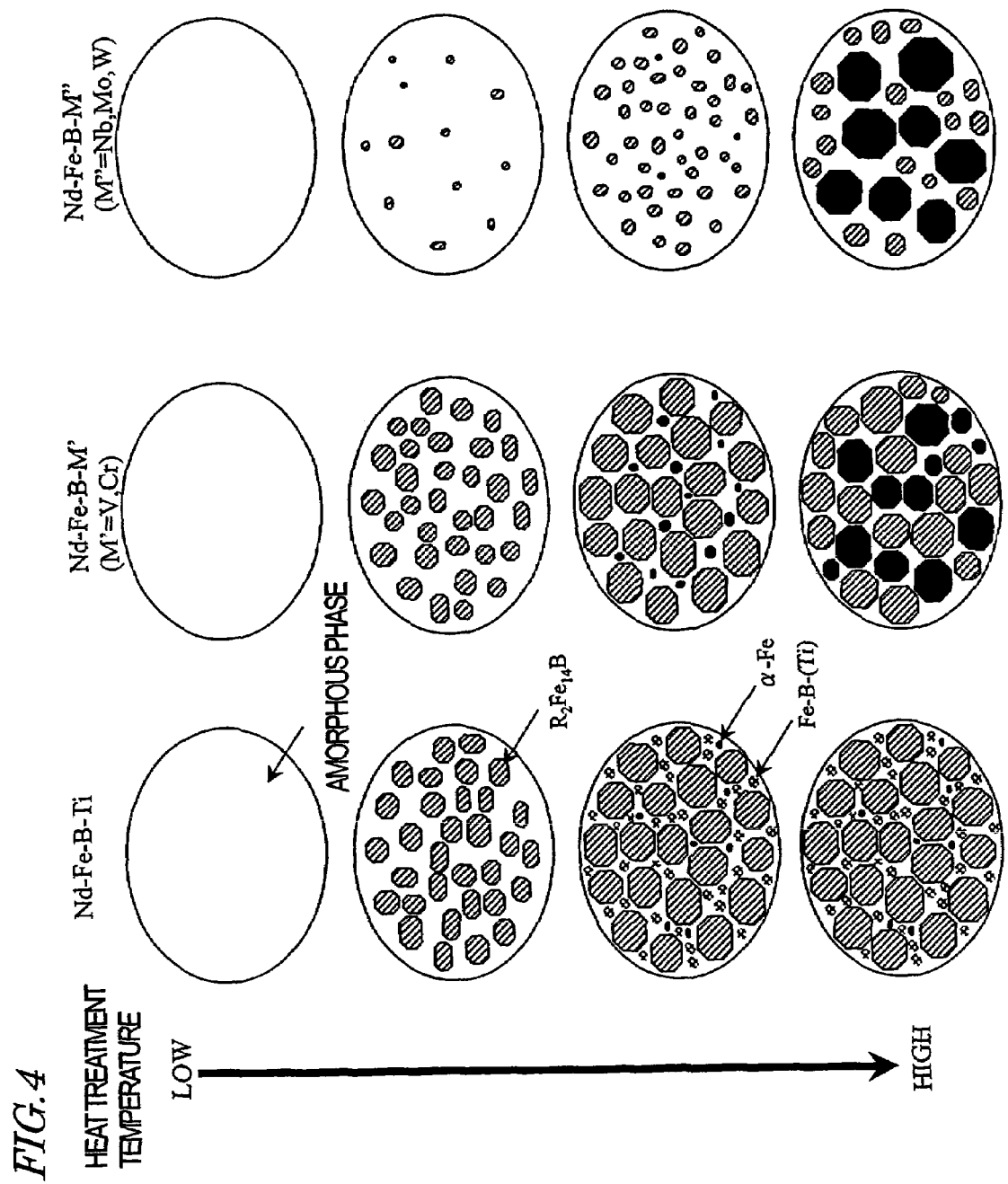
FIG. 4 schematically illustrates how rapidly solidified alloys change their microstructures during the crystallization processes thereof in a situation where Ti is added and in situations where Nb or another metal element is added instead of Ti.

FIG. 4 schematically illustrates how rapidly solidified alloys change their microstructures during the crystallization processes thereof in a situation where Ti is added and in situations where Nb or another metal element is added instead of Ti. Where Ti is added, the grain growth of the respective constituent phases is minimized even in a temperature range exceeding the temperature at which the $\alpha$-Fe phase grows rapidly. As a result, excellent hard magnetic properties can be maintained. In contrast, where any of the other metal elements (e.g., Nb, V, Cr, etc.) is added, the grain growth of the respective constituent phases advances remarkably and the exchange interactions among those phases weakens in the relatively high temperature range in which the $\alpha$-Fe phase grows rapidly. As a result, the resultant demagnetization curves have decreased loop squareness.

First, the situation where Nb, Mo or W is added will be described. In this case, if the alloy is thermally treated in a relatively low temperature range where no $\alpha$-Fe phase precipitates, then good hard magnetic properties, including superior loop squareness of the demagnetization curve, are achievable. In an alloy that was heat-treated at such a low temperature, however, $R_2Fe_{14}B$ microcrystalline phases would be dispersed in the non-magnetic amorphous phases, and the alloy does not have the nanocomposite magnet structure and would not exhibit high magnetization. Also, if the alloy is heat-treated at a higher temperature, then the $\alpha$-Fe phase nucleates and grows out of the amorphous phases. Unlike the situation where Ti is added, the $\alpha$-Fe phase grows rapidly and increases its grain size excessively. As a result, the exchange interactions among the constituent phases weaken and the loop squareness of the demagnetization curve deteriorates significantly.

On the other hand, where Ti is added, a nanocomposite structure, including microcrystalline $R_2Fe_{14}B$, iron-based boride, $\alpha$-Fe and amorphous phases, can be obtained by heat-treating the alloy, and the respective constituent phases are dispersed finely and uniformly. Also, the addition of Ti minimizes the grain growth of the $\alpha$-Fe phase.

Where V or Cr is added, any of these additive metal elements is coupled anti-ferromagnetically with Fe to form a solid solution, thus decreasing the magnetization significantly. The additive V or Cr cannot minimize the heat-treatment-induced grain growth sufficiently, either, and deteriorates the loop squareness of the demagnetization curve.

Thus, only when Ti is added, the grain coarsening of the $\alpha$-Fe phase can be minimized appropriately and iron-based borides with ferromagnetic properties can be obtained. Furthermore, Ti, as well as B and C, plays an important role as an element that delays the crystallization of Fe initial crystals (i.e., $\alpha$-Fe that will be transformed into $\alpha$-Fe) during the melt quenching process and thereby facilitates the production of a supercooled liquid. Accordingly, even if the melt of the alloy is rapidly cooled and solidified at a relatively low cooling rate of about $10^{2\circ}$ C./s to about $10^{5\circ}$ C./s, a rapidly solidified alloy, in which the $\alpha$-Fe phase has not precipitated too much and the microcrystalline $R_2Fe_{14}B$ and amorphous phases coexist, can be obtained. This greatly contributes to cost reduction because this means that a strip casting process, particularly suitable for mass production, can be selected from various melt quenching techniques.

The strip casting process is a highly productive and cost-effective method for obtaining a material alloy by rapidly cooling a molten alloy. This is because in the strip casting process, the flow rate of the melt does not have to be controlled using a nozzle or orifice but the melt may be poured directly from a tundish onto a chill roller. To amorphize the melt of an R—Fe—B rare earth alloy in a cooling rate range achievable even by the strip casting process, normally B should be added at about 10 at % or more. In the prior art, however, if B is added that much, then not just non-magnetic amorphous phases but also an $\alpha$-Fe phase and/or a soft magnetic $Nd_2Fe_{23}B_3$ phase will grow preferentially to have excessively large grain sizes when the rapidly solidified alloy is thermally treated and crystallized. Then, no uniform microcrystalline structure can be obtained. As a result, the volume percentage of ferromagnetic phases decreases, the magnetization drops, and the volume percentage of the $Nd_2Fe_{14}B$ phase also decreases. Consequently, the coercivity decreases noticeably. However, if Ti is added, then the excessive grain growth of the $\alpha$-Fe phase is minimized as described above. As a result, the magnetization increases more than expected.

It should be noted that a rapidly solidified alloy, including the $Nd_2Fe_{14}B$ phase at a high volume percentage, could improve the resultant magnetic properties more easily than a rapidly solidified alloy including the amorphous phases at a high volume percentage. Accordingly, the volume percentage of the $Nd_2Fe_{14}B$ phase to the overall rapidly solidified alloy is preferably about 50 volume % or more, more specifically about 60 volume % or more, which value was obtained by Mössbauer spectroscopy.

Hereinafter, a preferred embodiment, in which a melt spinning process or a strip casting process (which is one of roller methods) is adopted to prepare an alloy for a Ti-containing nanocomposite magnet powder according to the present invention, will be described more specifically.

Melt Quenching Machine

Figure 5A:
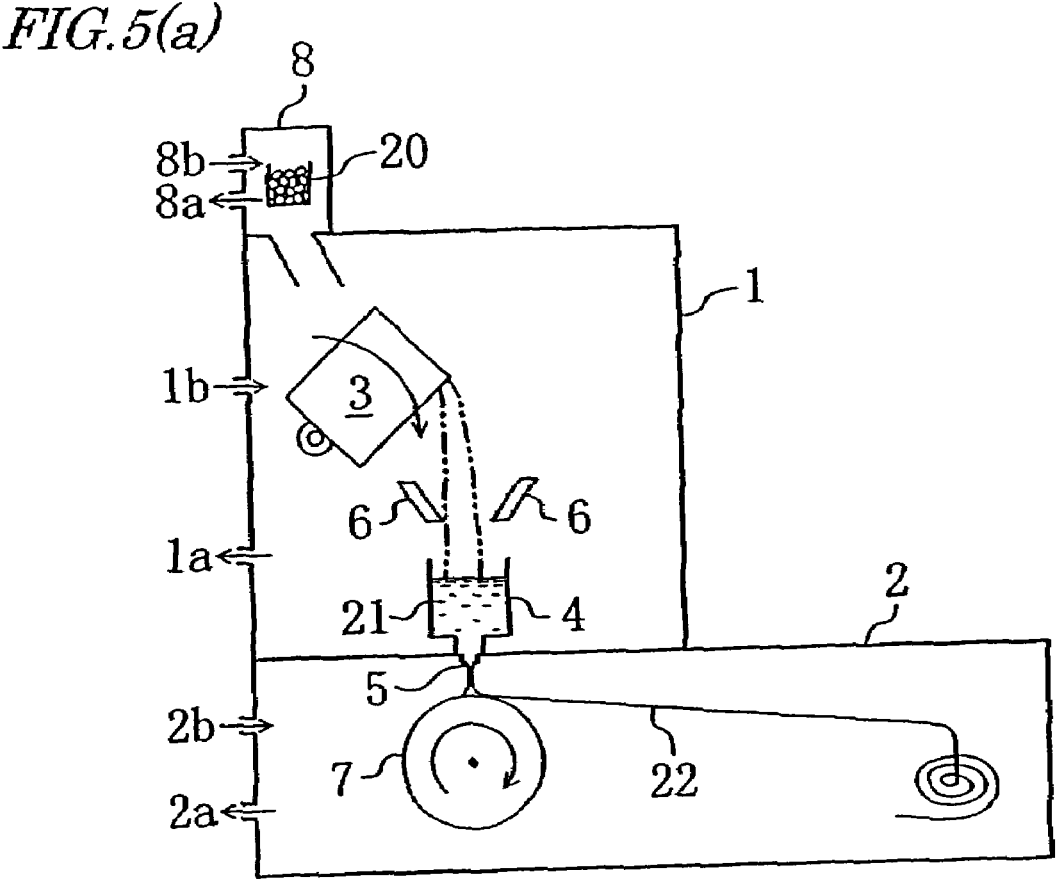
FIG. 5(a) is a cross-sectional view illustrating an overall arrangement of a machine for use to make a rapidly solidified alloy for the iron-based rare-earth alloy magnet of a preferred embodiment of the present invention.
Figure 5B:
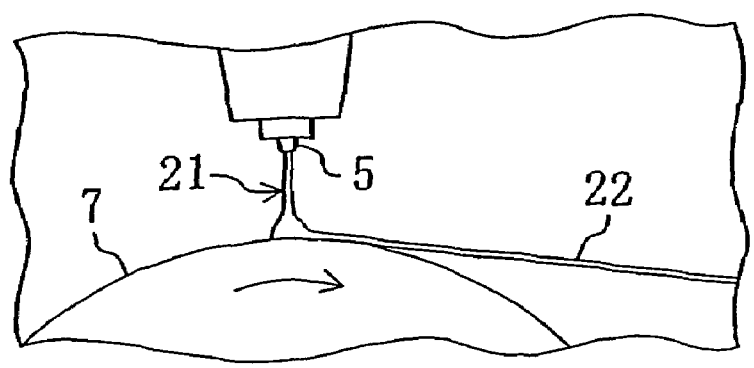
FIG. 5(b) illustrates a portion of the machine, where a melt is cooled and rapidly solidified, on a larger scale.

In this preferred embodiment, a material alloy is prepared by using a melt quenching machine such as that shown in FIGS. 5(a) and 5(b). The alloy preparation process is performed within an inert atmosphere to prevent the material alloy, which includes rare-earth element R and Fe that are easily oxidizable, from being oxidized. The inert gas may be either a rare gas of helium or argon, for example, or nitrogen. The rare gas of helium or argon is preferred to nitrogen, because nitrogen reacts with the rare-earth element R relatively easily.

The machine shown in FIG. 5(a) includes material alloy melting and quenching chambers 1 and 2, in which a vacuum or an inert atmosphere is maintained at an adjustable pressure. Specifically, FIG. 5(a) illustrates an overall arrangement of the machine, while FIG. 5(b) illustrates a portion of the machine on a larger scale.

As shown in FIG. 5(a), the melting chamber 1 includes: a melt crucible 3 to melt, at an elevated temperature, a material 20 that has been mixed to have a desired magnet alloy composition; a reservoir 4 with a teeming nozzle 5 at the bottom; and a mixed material feeder 8 to supply the mixed material into the melt crucible 3 while maintaining an airtight condition. The reservoir 4 stores the melt 21 of the material alloy therein and is provided with a heater (not shown) to maintain the temperature of the melt teemed therefrom at a predetermined level.

The quenching chamber 2 includes a rotating chill roller 7 for rapidly cooling and solidifying the melt 21 that has been dripped through the teeming nozzle 5.

In this machine, the atmosphere and pressure inside the melting and quenching chambers 1 and 2 are controllable within prescribed ranges. For that purpose, atmospheric gas inlet ports 1b, 2b and 8b and outlet ports 1a, 2a and 8a are provided at appropriate positions of the machine. In particular, the gas outlet port 2a is connected to a pump to control the absolute pressure inside the quenching chamber 2 within a range of about 30 kPa to the normal pressure (i.e., atmospheric pressure).

The melt crucible 3 may define a desired tilt angle to pour the melt 21 through a funnel 6 into the reservoir 4. The melt 21 is heated in the reservoir 4 by the heater (not shown).

The teeming nozzle 5 of the reservoir 4 is positioned on the boundary wall between the melting and quenching chambers 1 and 2 to drip the melt 21 in the reservoir 4 onto the surface of the chill roller 7, which is located under the nozzle 5. The orifice diameter of the teeming nozzle 5 may be about 0.5 mm to about 2.0 mm, for example. If the viscosity of the melt 21 is high, then the melt 21 cannot flow through the teeming nozzle 5 easily. In this preferred embodiment, however, the pressure inside the quenching chamber 2 is preferably kept lower than the pressure inside the melting chamber 1. Accordingly, an appropriate pressure difference is created between the melting and quenching chambers 1 and 2, and the melt 21 can be teemed smoothly.

To achieve a good thermal conductivity, the chill roller 7 may be made of Al alloy, Cu alloy, carbon steel, brass, W, Mo or bronze. However, the roller 7 is preferably made of Cu, Fe or an alloy including Cu or Fe, because such a material realizes a sufficient mechanical strength at a reasonable cost. Also, if the chill roller is made of a material other than Cu or Fe, the resultant rapidly solidified alloy cannot peel off the chill roller easily and might be wound around the roller. The chill roller 7 may have a diameter of about 300 mm to about 500 mm, for instance. The water-cooling capability of a water cooler provided inside the chill roller 7 is calculated and adjusted based on the latent heat of solidification and the volume of the melt teemed per unit time.

The machine shown in FIGS. 5(a) and 5(b) can rapidly solidify 10 kg of material alloy in 10 to 20 minutes, for example. The rapidly solidified alloy obtained in this manner is in the form of an alloy thin strip (or alloy ribbon) 22 with a thickness of about 10 µm to about 300 µm and a width of about 2 mm to about 3 mm, for example.

In this process step, the alloy thin strip has its thickness adjusted at about 60 µm to about 300 µm. Next, the rapidly solidified alloy is thermally treated and crystallized if necessary, and then pulverized, thereby obtaining a powder including at least about 70 mass % of particles with aspect ratios (i.e., the ratio of the minor axis size to the major axis size) of about 0.3 to about 1.0 and at least 10 mass % of particles with particle sizes of about 53 µm or less with respect to the overall powder particles. By adjusting the thickness of the alloy thin strip and pulverizing it in this manner, almost all of the powder particles can have aspect ratios of about 0.3 to about 1.0. It should be noted that the particle size is herein measured by classifying the powder with a standard sieve JIS Z8801.

Melt Quenching Process

First, the melt 21 of the material alloy, which is represented by the general formula described above, is prepared and stored in the reservoir 4 of the melting chamber 1 shown in FIG. 5(a). Next, the melt 21 is dripped through the teeming nozzle 5 onto the water-cooled roller 7 to contact with, and be rapidly cooled and solidified by, the chill roller 7 within a low-pressure Ar atmosphere. In this case, an appropriate rapid solidification technique, making the cooling rate controllable precisely, should be adopted.

In this preferred embodiment, the melt 21 is preferably cooled and solidified at a rate of approximately $1 \times 10^{2\circ}$ C./s to $1 \times 10^{8\circ}$ C./s, more preferably approximately $1 \times 10^{4\circ}$ C./s to $1 \times 10^{6\circ}$ C./s.

A period of time during which the melt 21 is quenched by the chill roller 7 is equivalent to an interval between a point in time the alloy contacts with the outer circumference of the rotating chill roller 7 and a point in time the alloy leaves the roller 7. In this period of time, the alloy has its temperature decreased to be a supercooled liquid. Thereafter, the supercooled alloy leaves the chill roller 7 and travels within the inert atmosphere. While the thin-strip alloy is traveling, the alloy has its heat dissipated into the atmospheric gas. As a result, the temperature of the alloy further drops. In this preferred embodiment, the pressure of the atmospheric gas is about 30 kPa to the atmospheric pressure. Thus, the heat of the alloy can be dissipated into the atmospheric gas even more effectively, and the $Nd_2Fe_{14}B$ compound can nucleate and grow finely and uniformly in the alloy. It should be noted that unless an appropriate amount of element M such as Ti has been added to the material alloy, then the α-Fe phase nucleates and grows faster and earlier in the rapidly solidified alloy, thus deteriorating the resultant magnetic properties.

In this preferred embodiment, the surface velocity of the roller is preferably adjusted to fall within the range of about 2 m/s to about 30 m/s and the pressure of the atmospheric gas is preferably about 30 kPa or more to increase the secondary cooling effects caused by the atmospheric gas. In this manner, a rapidly solidified alloy, including at least about 60 volume % of $R_2Fe_{14}B$ compound phase with an average crystal grain size of as small as about 80 nm or less, is prepared.

A melt spinning process, in which the flow rate of the molten alloy to be supplied onto the surface of the chill roller is controlled by using the nozzle or orifice, is adopted as an exemplary melt quenching process to make the Ti-containing nanocomposite magnet powder for use in the compound of preferred embodiments of the present invention. Alternatively, a strip casting process using no nozzle or orifice or any of various methods may also be used. Also, the single roller method described above may be replaced with a twin roller method that uses a pair of chill rollers.

Among these rapid cooling techniques, the strip casting method results in a relatively low cooling rate, i.e., about $10^{2°}$ C./s to about $10^{5°}$ C./s. In this preferred embodiment, by adding an appropriate volume of Ti to the material alloy, a rapidly solidified alloy, most of which has a structure including no Fe initial crystals, can be obtained even by the strip casting process. The process cost of the strip casting method is about half or less of any other melt quenching process. Accordingly, to prepare a large quantity of rapidly solidified alloy, the strip casting method is much more effective than the melt spinning method, and is suitably applicable to mass production. However, if no element M is added to the material alloy or if Cr, V, Mn, Mo, Ta and/or W are/is added thereto instead of element Ti, then a metal structure including a lot of Fe initial crystals will be produced even in the rapidly solidified alloy prepared by the strip casting process. Consequently, the desired metal structure cannot be obtained.

Also, in the melt spinning or strip casting process, the thickness of the resultant alloy is controllable by adjusting the surface velocity of the roller. If an alloy having a thickness of about 60 μm to about 300 μm (typically in a thin strip shape) is prepared by adjusting the surface velocity of the roller, then the alloy has the nanocrystalline structure described above, and can be easily divided into powder particles having various orientations through a pulverization process. As a result, powder particles having an isometric shape (i.e., having an aspect ratio close to one) can be obtained easily. That is to say, the powder particles obtained will not be elongated in a particular orientation but will have an isometric (or quasi-spherical) shape.

On the other hand, if the alloy is made thinner than about 60 μm by increasing the surface velocity of the roller, then the metal structure of the alloy tends to be aligned perpendicularly to the roller contact surface as in the conventional rapidly solidified magnet. In that case, the alloy is easily divided in that orientation, and the powder particles obtained by the pulverization process are likely elongated parallelly to the surface of the alloy. As a result, powder particles having an aspect ratio of less than about 0.3 are obtained often.

Figure 6A:
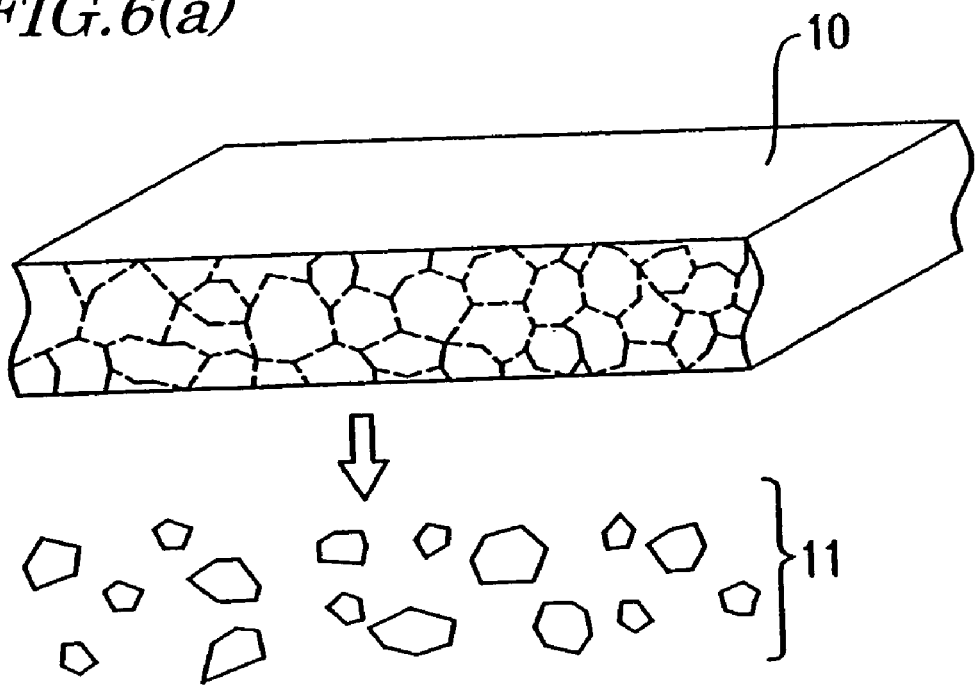
FIG. 6(a) is a perspective view schematically illustrating an alloy yet to be pulverized and pulverized powder particles for preferred embodiments of the present invention.
Figure 6B:
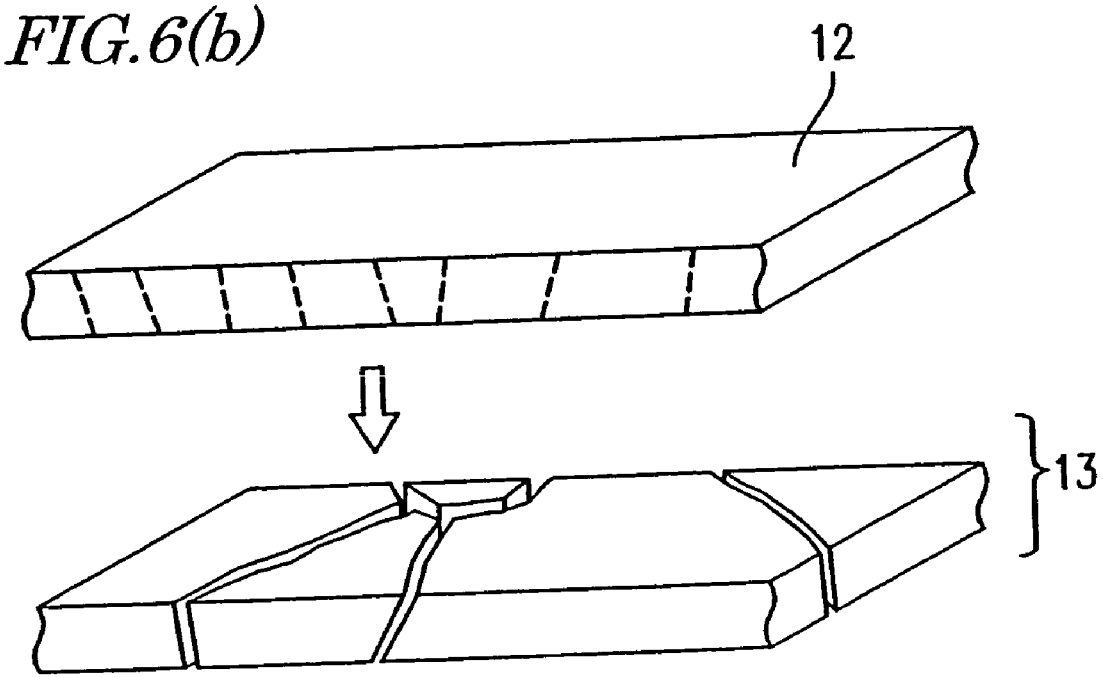
FIG. 6(b) is a perspective view schematically illustrating an alloy yet to be pulverized and pulverized powder particles for the prior art.

FIG. 6(a) schematically illustrates an alloy 10 that is yet to be subjected to a pulverization process and powder particles 11 obtained by the pulverization process in a method of making a magnet powder according to this preferred embodiment. On the other hand, FIG. 6(b) schematically illustrates an alloy thin strip 12 that is yet to be subjected to a pulverization process and powder particles 13 obtained by the pulverization process in a conventional method of making a rapidly solidified magnet powder.

As shown in FIG. 6(a), in this preferred embodiment, the alloy 10 yet to be subjected to the pulverization process is made up of isometric crystals with small crystal grain sizes, and is likely divided in random orientations to produce isometric powder particles 11 easily. On the other hand, the conventional rapidly solidified alloy is likely divided substantially perpendicularly to the surface of the alloy thin strip 12 as shown in FIG. 6(b), thus producing flat and elongated particles 13.

In this manner, by controlling the roller surface velocity within the range of about 2 m/s to about 20 m/s (more preferably about 5 m/s to about 17 m/s and even more preferably about 8 m/s to about 15 m/s) and by adjusting the thickness of the alloy thin strip within the range of about 60 μm to about 300 μm, a powder having an aspect ratio of at least about 0.3 (preferably about 0.4 to about 1.0) and exhibiting excellent magnetic properties can be obtained.

Heat Treatment

In this preferred embodiment, the rapidly solidified alloy is thermally treated within an argon atmosphere. Preferably, the alloy is heated at a temperature rise rate of about 0.08° C./s to about 20° C./s, retained at a temperature of about 550° C. to about 850° C. for approximately 30 seconds to 20 minutes, and then cooled to room temperature. This heat treatment results in nucleation and/or crystal growth of metastable phases in a remaining amorphous phase, thus forming a nanocomposite microcrystalline structure. According to this preferred embodiment, the microcrystalline $Nd_2Fe_{14}B$ phase already accounts for at least about 60 volume % of the as-cast alloy that has just started being thermally treated. Thus, α-Fe and other crystalline phases will not increase their sizes too much and the respective constituent phases other than the microcrystalline $Nd_2Fe_{14}B$ phase (i.e., soft magnetic phases) will be dispersed finely and uniformly.

If the heat treatment temperature is lower than about 550° C., then a lot of amorphous phases may remain even after the heat treatment and the resultant coercivity may not reach the desired level depending on the conditions of the rapid cooling process. On the other hand, if the heat treatment temperature exceeds about 850° C., the grain growth of the respective constituent phases will advance too much, thus decreasing the remanence $B_r$ and deteriorating the loop squareness of the demagnetization curve. For these reasons, the heat treatment temperature is preferably about 550° C. to about 850° C., more preferably about 570° C. to about 820° C.

In this preferred embodiment, the atmospheric gas causes secondary cooling effects so that a sufficient amount of $Nd_2Fe_{14}B$ compound phase crystallizes uniformly and finely in the rapidly solidified alloy. Accordingly, even if the rapidly solidified alloy is not heat-treated for crystallization purposes, the rapidly solidified alloy itself can exhibit sufficient magnetic properties. That is to say, the heat treatment for crystallization is not an indispensable process. However, to further improve the magnetic properties, the heat treatment is preferably conducted. In addition, even though the heat treatment is carried out at lower temperatures than the conventional process, the magnetic properties are still improvable sufficiently.

To prevent the alloy from being oxidized, the heat treatment is preferably conducted within an inert atmosphere. The heat treatment may also be performed within a vacuum of about 0.1 kPa or less.

It should be noted that when carbon is added to the material alloy, the oxidation resistance of the magnet powder further increases. If a sufficient amount of C has been added thereto, then the rapidly solidified alloy may be heat-treated in the air.

The rapidly solidified alloy yet to be heat-treated may include metastable phases such as $Fe_3B$, $Fe_{23}B_6$ and $R_2Fe_{23}B_3$ phases in addition to the $R_2Fe_{14}B$ compound and amorphous phases. In that case, when the heat treatment is finished, the $R_2Fe_{23}B_3$ phase will have disappeared due to the action of the additive Ti. Instead, crystal grains of an iron-based boride (e.g., $Fe_{23}B_6$), exhibiting a saturation magnetization that is equal to, or even higher than, that of the $R_2Fe_{14}B$ phase, or $\alpha$-Fe phase can be grown.

Even though the Ti-containing nanocomposite magnet powder included in the compound of preferred embodiments of the present invention includes soft magnetic phases such as the $\alpha$-Fe phase, the grain growth of the soft magnetic phases has been minimized by the additive Ti and the magnet has the desired nanocrystalline structure. Accordingly, the soft and hard magnetic phases are magnetically coupled together through exchange interactions and the magnet powder can exhibit excellent magnetic properties.

After the heat treatment, the $R_2Fe_{14}B$ compound phase needs to have an average crystal grain size of less than about 300 nm, which is a single magnetic domain size. The $R_2Fe_{14}B$ compound phase preferably has an average crystal grain size of about 10 nm to about 200 nm, more preferably about 20 nm to about 150 nm and even more preferably about 20 nm to about 100 nm. On the other hand, if the boride and $\alpha$-Fe phases have an average crystal grain size of more than about 100 nm, then the exchange interactions among the respective constituent phases weaken, thus deteriorating the loop squareness of the demagnetization curve and decreasing $(BH)_{max}$. Nevertheless, if the average crystal grain size of these phases is less than about 1 nm, then a high coercivity cannot be achieved. In view of these considerations, the soft magnetic phases, such as the boride and $\alpha$-Fe phases, preferably have an average crystal grain size of about 1 nm to about 100 nm, more preferably about 50 nm or less, and even more preferably about 30 nm or less.

It should be noted that the thin strip of the rapidly solidified alloy may be coarsely cut or coarsely pulverized before being subjected to the heat treatment. When the heat treatment is finished, the resultant alloy coarse powder (or thin strip) is further pulverized to obtain a magnet powder. In this manner, the Ti-containing nanocomposite magnet powder can be prepared.

Pulverization Process

A rare-earth alloy powder with a maximum particle size of about 500 μm or less, more particularly about 300 μm or less, is preferably used to make a compound for a rare-earth bonded magnet according to preferred embodiments of the present invention. When the powder is compacted, the powder preferably has a mean particle size of about 50 μm to about 200 μm, more preferably about 100 μm to about 150 μm.

The aspect ratio of the magnet powder influences the flowability of the compound. The Ti-containing nanocomposite magnet powder to be included at about 2 mass % or more in the compound of preferred embodiments of the present invention preferably has an aspect ratio of about 0.3 to about 1.0. It is naturally possible to mix the magnet powder with another Ti-containing nanocomposite magnet powder with an aspect ratio of less than about 0.3. To obtain a compound with even better flowability, at least about 70% of the magnet powder preferably has an aspect ratio of about 0.3 to about 1.0. More preferably, the compound should be prepared with a magnet powder, of which about 70 mass % or more is the Ti-containing nanocomposite magnet powder with an aspect ratio of about 0.3 to about 1.0. It is naturally possible to mix the magnet powder with another magnet powder, such as an MQ powder, of which the powder particles have an aspect ratio of less than about 0.3.

Figure 7A:
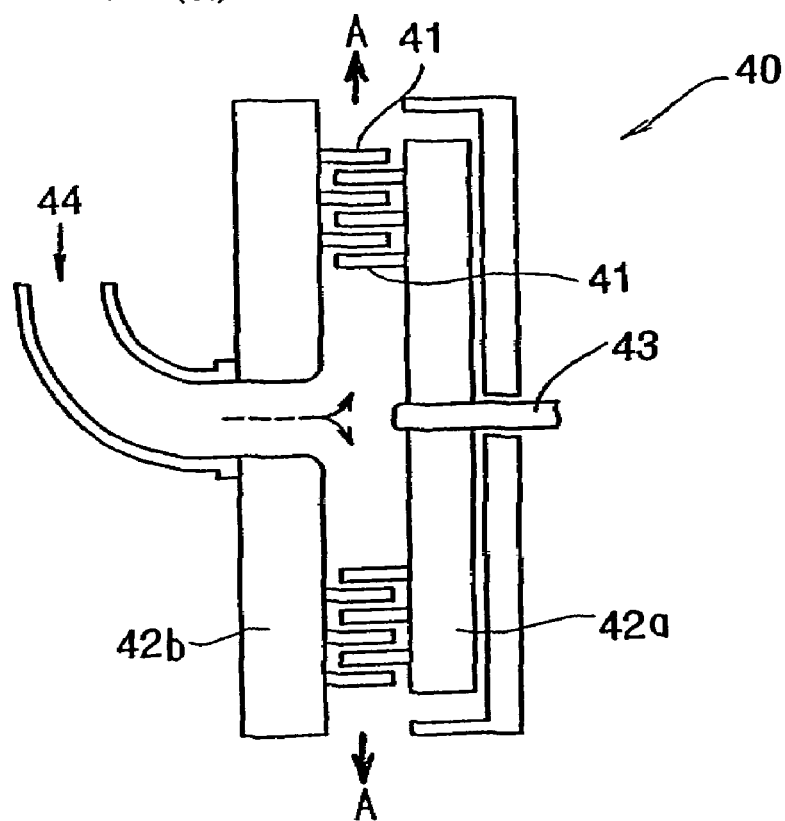
FIG. 7(a) is a view showing the configuration of a pin mill for use in a preferred embodiment of the present invention.
Figure 7B:
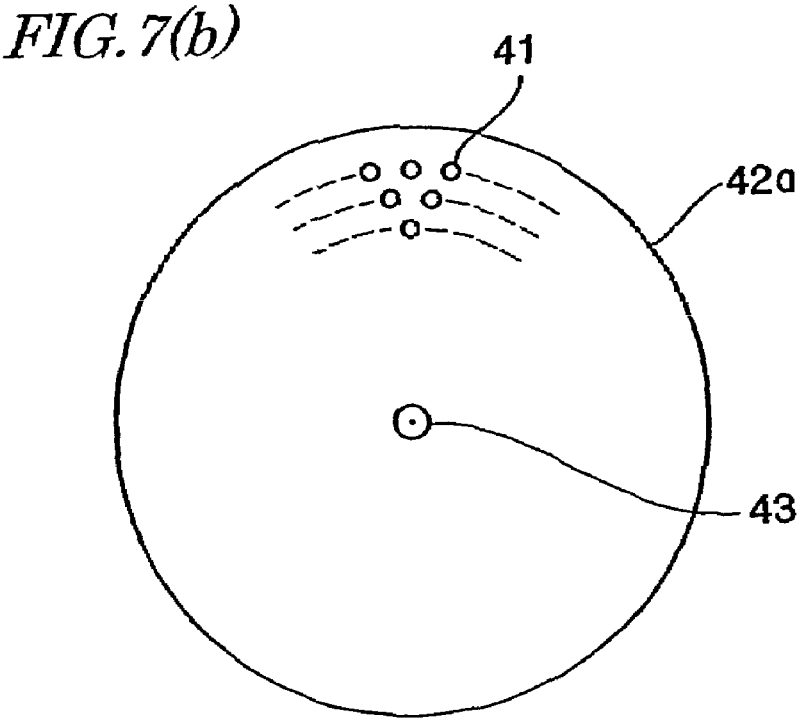
FIG. 7(b) is a view showing the arrangement of pins in the pin mill shown in FIG. 7(a).

The Ti-containing nanocomposite magnet powder having such an aspect ratio can be obtained by getting an alloy thin strip with a thickness of about 60 μm to about 300 μm pulverized by a pin disk mill such as that shown in FIG. 7(a), for example. FIG. 7(a) is a cross-sectional view illustrating an exemplary pin mill for use in this embodiment. This pin mill 40 is a pin disk mill. The mill 40 includes two disks 42a and 42b that are arranged so as to face each other. On one side of each of these disks 42a and 42b, multiple pins 41 are arranged so as not to collide against each other. At least one of these disks 42a and 42b rotate(s) at a high velocity. In the example illustrated in FIG. 7(a), the disk 42a rotates around a shaft 43. FIG. 7(b) illustrates a front view of the disk 42a that is supposed to rotate. On the disk 42a shown in FIG. 7(b), the pins 41 are arranged to form a plurality of concentric circles. The pins 41 are also arranged in a similar concentric pattern on the fixed disk 42b.

A workpiece to be pulverized by the pin disk mill is loaded through an inlet port 44 into the space between the two disks, collides against the pins 41 on the rotating and fixed disks 42a and 42b and is pulverized due to the impact. A powder, formed by this pulverization, is blown off in the direction indicated by the arrows A and then collected to a predetermined position finally.

In the pin mill 40 of this preferred embodiment, the disks 42a and 42b, supporting the pins 41 thereon, are made of a stainless steel, for example, while the pins 41 are made of a cemented carbide material such as carbon steel, a ceramic, or sintered tungsten carbide (WC). Examples of other preferred cemented carbide materials include TiC, MoC, NbC, TaC and $Cr_3C_2$. Each of these cemented carbide materials is a sintered body obtained by combining a carbide powder of a Group IVa, Va or VIa metal element with Fe, Co, Ni, Mo, Cu, Pb or Sn or an alloy thereof.

By performing the pulverization process with this pin mill under such conditions that the mean particle size becomes about 100 μm or less, a powder of which the particles have an aspect ratio of about 0.3 to about 1.0 can be obtained. Also, powder particles with particle sizes of about 53 μm or less or about 38 μm or less can be obtained by classifying them.

The more finely the material alloy is pulverized, the closer to 1.0 the aspect ratio tends to be. And the closer to 1.0 the aspect ratio becomes, the more significantly the fill density improves. Thus, the aspect ratio is preferably about 0.4 to about 1.0, more preferably about 0.5 to about 1.0, and most preferably about 0.6 to about 1.0. As will be described later, the Ti-containing nanocomposite magnet powder for use in preferred embodiments of the present invention exhibits excellent oxidation resistance. Thus, even when a powder having a high aspect ratio is prepared by pulverizing the alloy to such a small size, the magnetic properties thereof hardly deteriorate, which is very advantageous.

The pin mill that can be used effectively in this preferred embodiment is not limited to the pin disk mill in which the pins are arranged on the disks. Alternatively, the pin mill may also have its pins arranged on cylinders. When a pin mill is used, a powder having a particle size distribution that is close to the normal distribution can be obtained, the mean particle size can be adjusted easily, and high mass productivity is achieved advantageously.

Atomization Process

The Ti-containing nanocomposite magnet powder for use in preferred embodiments of the present invention may be made by an atomization process, which achieves a lower cooling rate than the strip casting process (see Japanese Patent Application No. 2001-231560 that was filed by the applicant of the present application).

To make the Ti-containing nanocomposite magnet powder by an atomization process from a molten alloy having the composition described above, a gas atomization process, a centrifugal atomization process, a rotational electrode process, a vacuum process, an impact process or any other suitable process may be adopted. When the centrifugal atomization process or the rotational electrode process is adopted, the cooling rate is preferably increased by blowing a gas at a high pressure.

Hereinafter, a preferred embodiment that adopts a gas atomization process will be described with reference to FIGS. 8(a) and 8(b).

Figure 8A:
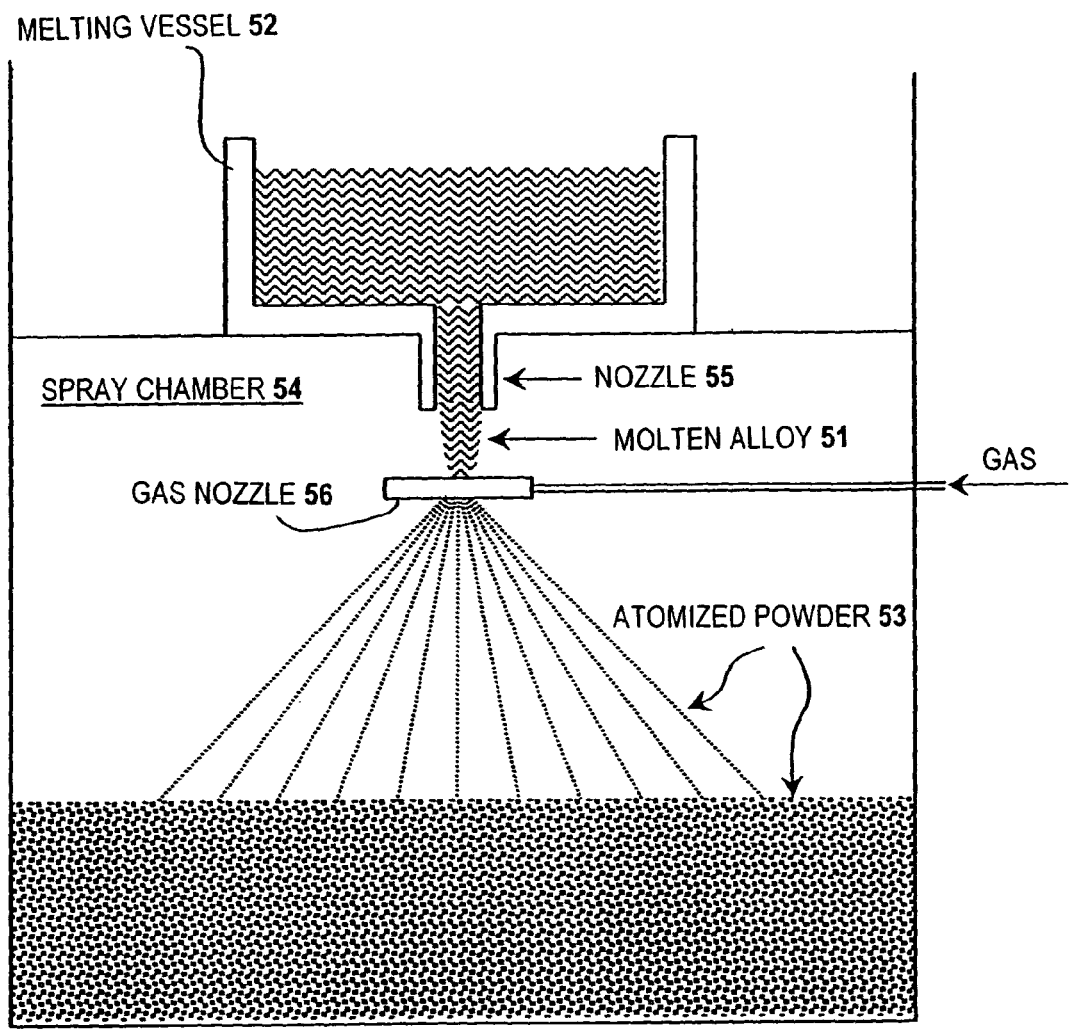
FIG. 8(a) is a view showing the configuration of a gas atomization system for use in a preferred embodiment of the present invention.
Figure 8B:
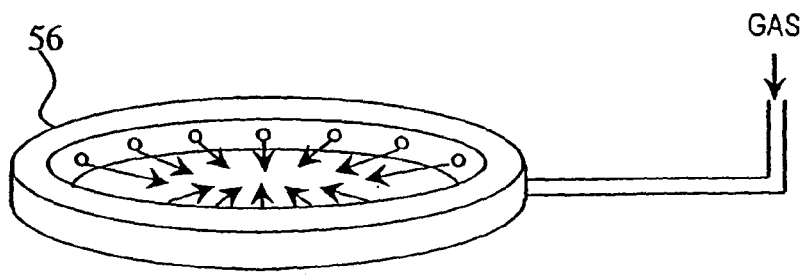
FIG. 8(b) is a perspective view illustrating a gas nozzle for use in this system.

FIG. 8(a) shows an exemplary configuration for a gas atomization system to be preferably used in this preferred embodiment. The system shown in FIG. 8(a) includes: a melting vessel 52 to melt an alloy by a high frequency heating or resistance heating process and store the resultant molten alloy 51 therein; and a spray chamber 54 in which a magnet powder (or atomized powder) 53 is formed by a gas atomization process. The melting chamber, in which the melting vessel 52 is provided, and the spray chamber 54 are preferably filled with an inert atmosphere (of argon or helium).

At the bottom of the melting vessel 52, a melt nozzle (with a nozzle diameter of about 0.5 mm to about 3.0 mm) 55 is provided such that the molten alloy 51 is ejected through the melt nozzle 55 into the spray chamber 54. A ringlike gas nozzle 56 such as that shown in FIG. 8(b) is provided under the melt nozzle 55. A cooling gas is ejected strongly toward the center of the ring through a plurality of holes of this ringlike gas nozzle 56. As a result, a great number of small droplets of the molten alloy are formed and rapidly cooled while being deprived of the heat by the surrounding gas. Then the rapidly cooled and solidified metal droplets are collected as the magnet powder 53 at the bottom of the gas atomization system.

When such a gas atomization system is used, the particle size distribution of the powder can be controlled by adjusting the viscosity of the molten alloy and the energy of the spray gas.

It should be noted that when a molten alloy having a poor ability to create amorphous phases is rapidly cooled and solidified by a gas atomization process, powder particles with an amorphous or microcrystalline structure cannot be obtained unless the atomization process is carried out under such conditions as to form powder particles with particle sizes of about 20 µm or less, for example. This is because the smaller the particle sizes of the powder particles to be obtained, the greater the ratio of the surface area to the volume of the respective particles and the higher the cooling effects. In the prior art, the greater the particle size, the lower the cooling rate of inside portions of particles. As a result, a crystal structure with an excessively large size is formed and the resultant magnetic properties deteriorate. When such a phenomenon occurs, the magnetic properties deteriorate significantly in a nanocomposite magnet powder, in particular.

In contrast, according to this preferred embodiment, even if the powder particle sizes are as large as about 20 µm to about 100 µm, the inside portions of the powder particles can also be rapidly cooled uniformly and at a sufficiently high rate. Thus, a nanocomposite magnet powder exhibiting excellent magnetic properties can be obtained.

Heat Treatment

Thereafter, the magnet powder, obtained by using the gas atomization system described above, is preferably thermally treated within an inert atmosphere of argon (Ar), for example. The temperature increase rate of the heat treatment process is preferably about 0.08° C./s to about 20° C./s. Specifically, the magnet powder is preferably maintained at a temperature of about 500° C. to about 800° C. for a period of time of about 30 seconds to about 60 minutes, and then cooled to room temperature. By carrying out this heat treatment process, an almost completely crystalline structure can be obtained even if some amorphous phases are left in the powder particles as a result of the gas atomization process.

The heat treatment atmosphere is preferably an inert gas such as Ar gas or $N_2$ gas to minimize the oxidation of the alloy. Alternatively, the heat treatment may also be carried out within a vacuum of about 1.3 kPa or less.

It should be noted that if carbon is added to the material alloy, the oxidation resistance of the magnet powder can be further increased. If a sufficient amount of C has been added to the material alloy, then the atomized powder may be heat-treated in the air. Also, the magnet powder of this preferred embodiment already has a spherical shape when crystallized by the atomization process, and is not subjected to any mechanical pulverization process thereafter. Accordingly, the surface area of the magnet powder per unit mass is far smaller than that of a known mechanically pulverized powder. Thus, the magnet powder is not oxidizable so easily even when exposed to the air during the heat treatment process or any other process.

Alternatively, the Ti-containing nanocomposite magnet powder for use in preferred embodiments of the present invention may also be prepared by a rapid cooling process as a combination of the melt spinning process and the gas atomization process described above, for example.

Why This Composition is Preferred

The Ti-containing nanocomposite magnet powder for use in the compound of various preferred embodiments of the present invention has a composition represented by the general formula: $(Fe_{1-m}T_m)_{100-x-y-z}Q_xR_yM_z$, where T is at least one element selected from the group consisting of Co and Ni; Q is at least one element selected from the group consisting of B and C and always includes B; R is at least one rare-earth element substantially excluding La and Ce; M is at least one metal element selected from the group consisting of Ti, Zr and Hf and always includes Ti; and the mole fractions x, y, z and m satisfy the inequalities of: 10 at %<x≦20 at %; 6 at %≦y<10 at %; 0.1 at %≦z≦12 at %; and 0≦m≦0.5, respectively.

Q is either B (boron) only or a combination of B and C (carbon). The atomic percentage ratio of C to Q is preferably about 0.25 or less.

If the mole fraction x of Q is about 10 at % or less and if the rapid cooling rate is as low as about $10^{2o}$ C./s to about $10^{5o}$ C./s, then it is difficult to make a rapidly solidified alloy in which the $R_2Fe_{14}B$ crystalline phase and amorphous phase coexist. In that case, $H_{cJ}$ will not reach 700 kA/m even when the resultant rapidly solidified alloy is thermally treated thereafter. Thus, it is difficult to make a magnet powder having an aspect ratio of about 0.3 to about 1.0 and exhibiting excellent magnetic properties by adopting a relatively low roller surface velocity in a melt spinning process or a strip casting process. In addition, a strip casting process or an atomization process cannot be adopted in that case, even though these processes count among most cost-effective techniques in various melt quenching processes. As a result, the manufacturing cost of the magnet powder increases unintentionally. On the other hand, if the mole fraction x of Q exceeds about 20 at %, then the volume percentage of the amorphous phases, remaining even in the alloy that has been heated and crystallized, increases. Meanwhile, the percentage of the α-Fe phase, which has a higher saturation magnetization than any other constituent phase, decreases and the remanence $B_r$ drops. In view of these considerations, the mole fraction x of Q is preferably greater than about 10 at % but about 20 at % or less, more preferably greater than about 10 at % but about 17 at % or less. Even more preferably, x is greater than about 10 at % but about 14 at % or less, because the iron-based boride phase can be nucleated efficiently and $B_r$ can be increased in that range. It should be noted that if 15 at %<x≦20 at %, then 3.0 at %<z<12 at % is preferably satisfied.

R is at least one element to be selected from the group consisting of the rare-earth elements (including Y). Preferably, R includes substantially no La and substantially no Ce, because the presence of La or Ce decreases the coercivity and the loop squareness of the demagnetization curve. However, there is no problem of degrading the magnetic properties if very small amounts (i.e., about 0.5 at % or less) of La and Ce are included as inevitable impurities. Therefore, the term "substantially no La (Ce)" or "substantially excluding La (Ce)" means that the content of La (Ce) is about 0.5 at % or less.

More particularly, R preferably includes Pr or Nd as an indispensable element, a portion of which may be replaced with Dy and/or Tb. If the mole fraction y of R is less than about 6 at %, then compound phases having the microcrystalline $R_2Fe_{14}B$ structure, which contribute to expressing coercivity, do not crystallize sufficiently and a coercivity $H_{cJ}$ of about 700 kA/m or more cannot be obtained. On the other hand, if the mole fraction y of R is equal to or greater than about 10 at %, then the percentages of the iron-based borides and α-Fe with ferromagnetic properties both decrease. At the same time, the anticorrosiveness and oxidation resistance of the magnet powder also decrease, thus diminishing the effects to be achieved by preferred embodiments of the present invention. For these reasons, the mole fraction y of the rare earth element R is preferably about 6 at % to less than about 10 at % (e.g., 6 at % to 9.5 at %), more preferably about 7 at % to about 9.3 at %, and even more preferably about 8 at % to about 9.0 at %.

The additive metal element M includes Ti as an indispensable element, and may further include Zr and/or Hf. To achieve the above-described effects, Ti is indispensable. The additive Ti increases the coercivity $H_{cJ}$, remanence $B_r$ and maximum energy product $(BH)_{max}$ and improves the loop squareness of the demagnetization curve.

If the mole fraction z of the metal element M is less than about 0.1 at %, then the above effects are not achieved fully even though Ti is added. Thus, z is preferably at least about 0.5 at %. Nevertheless, if the mole fraction z of the metal element M exceeds about 12 at %, then the volume percentage of the amorphous phases, remaining even in the alloy that has been heated and crystallized, increases and the remanence $B_r$ likely drops. In view of these considerations, the mole fraction z of the metal element M is preferably about 0.1 at % to about 12 at %. The lower limit of a more preferable z range is about 0.5 at % and the upper limit thereof is about 8.0 at %. The lower limit of an even more preferable z range is about 1.0 at % and the upper limit thereof is about 6.0 at %.

Also, the higher the mole fraction x of Q, the more likely the amorphous phases including Q (e.g., B) are formed. For that reason, the mole fraction z of the metal element M is preferably set relatively high. Then, soft magnetic iron-based borides with high magnetization can be nucleated and the grain growth of the iron-based borides produced can be minimized. More particularly, the respective mole fractions are preferably adjusted so as to satisfy z/x≦0.1, more preferably z/x≦0.15.

It should be noted that the metal element M always includes Ti as an indispensable element because Ti performs particularly beneficial actions. In this case, the (atomic) ratio of Ti to the overall metal elements M is preferably at least about 70%, more preferably about 90% or more.

The balance of the material alloy, other than the elements described above, may be Fe alone. Alternatively, at least one transition metal element T, selected from the group consisting of Co and Ni, may be substituted for a portion of Fe, because the desired hard magnetic properties are achievable in that case also. However, if more than about 50% of Fe is replaced with T (i.e., m>0.5), then a high remanence $B_r$ of about 0.7 T or more cannot be obtained. For that reason, the percentage of Fe replaced is preferably from about 0% to about 50% (i.e., 0≦m≦0.5). Also, by substituting Co for a portion of Fe, the loop squareness of the demagnetization curve improves and the Curie temperature of the $R_2Fe_{14}B$ phase increases, thus increasing the thermal resistance. The percentage of Fe that is replaceable with Co is preferably about 0.5% to about 40%. Also, the magnetic properties are not affected even when Al, Si, Cu, Ga, Ag, Pt, Au, Pb, V, Cr, Mn, Nb, Mo and/or W are included at a small volume percentage. However, its mole fraction is preferably about 2 at % or less.

Oxidation Resistance of Magnet Powder

Hereinafter, the oxidation resistance of the Ti-containing nanocomposite magnet powder for use in the compound for a rare-earth bonded magnet according to preferred embodiments of the present invention will be described in comparison with a conventional rapidly solidified magnet powder.

In the following description, the Ti-containing nanocomposite magnet powder will be compared with conventional rapidly solidified magnet powders MQP-B and MQP-O (each of which is available from Magnequench Inc. (MQI) and has a maximum particle size of about 300 μm or less). A sample of the Ti-containing nanocomposite magnet powder was prepared in the following manner.

First, a rapidly solidified alloy (including about 9 at % of Nd, about 11 at % of B, about 3 at % of Ti, about 2 at % of Co and Fe as the balance and having an average thickness of about 70 μm and a standard deviation σ of about 13 μm) that had been made as in Example 1 to be described later was pulverized to about 850 μm or less. Then, the resultant powder was fed at a rate of about 20 g/min into a hoop belt furnace having a soaking zone with a length of about 500 mm and running at a belt feeding speed of about 100 mm/min within an argon atmosphere that had a temperature maintained at approximately 680° C. In this manner, the powder was thermally treated to obtain a magnet powder. Then, the magnet powder was pulverized using the pin disk mill described above so as to have a particle size distribution in which powder particles with aspect ratios of about 0.4 to about 1.0 were included at about 30 volume percent. A Ti-containing nanocomposite magnet powder sample NCP-0 was obtained in this manner.

Table 1 shows the contents of oxygen and the magnetic properties of the respective magnet powders that were left in the air for an hour at various temperatures (i.e., about 23° C., about 300° C. and about 350° C.). The magnetic properties were measured using a vibrating sample magnetometer. The results shown in Table 1 were obtained not only at about 23° C. but also after the powders had been left in the air for an hour at about 300° C. and about 350° C., respectively.

As shown in Table 1, when MQP-B was left in the air for an hour at about 300° C., the oxygen contained therein increased to about 0.67 mass %. If the powder MQP-B was left in the air for an hour at about 350° C., the oxygen content reached about 1.93 mass %. On the other hand, when MQP-O was left in the air for an hour at about 300° C., the oxygen contained therein increased to about 0.24 mass %. And if the powder MQP-O was left in the air for an hour at about 350° C., the oxygen content reached about 0.59 mass %.

In contrast, even if the Ti-containing nanocomposite magnet powder NCP-0 was left in the air for an hour at about 300° C., the oxygen contained therein was as low as about 0.10 mass %. Also, even if the powder NCP-0 was left in the air for an hour at about 350° C., the oxygen content barely reached about 0.20 mass %. Thus, it can be seen that the nanocomposite magnet powder is superior in oxidation resistance compared to the conventional rapidly solidified magnet powders.

Figure 9:
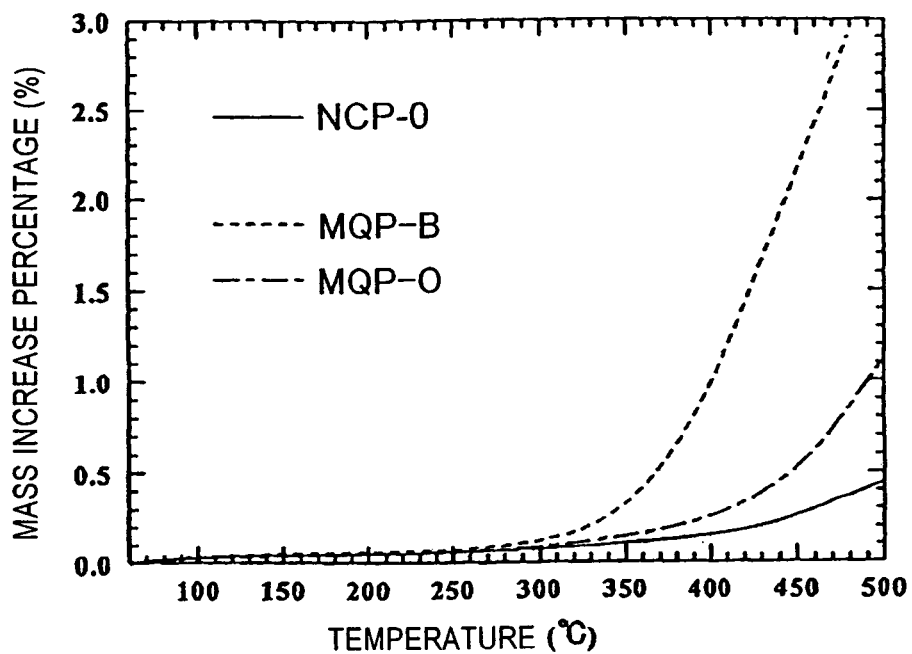
FIG. 9 is a graph showing the mass increase percentages of a Ti-containing nanocomposite magnet powder according to a preferred embodiment of the present invention and conventional rapidly solidified magnet powders with the heat applied thereto.

FIG. 9 shows the mass increase percentages of the respective magnet powders that were measured with a thermobalance. These powders were heated in the air at a heating rate of about 10° C./min. As can be seen from FIG. 9, even when heated in the air and oxidized, the Ti-containing nanocomposite magnet powder NCP-0 increased its mass far less than MQP-B or MQP-O did. Thus, the nanocomposite magnet powder NCP-0 has excellent oxidation resistance.

Next, looking at the magnetic properties shown in Table 1, it can be seen that MQP-B exhibited significantly deteriorated magnetic properties when oxidized. For example, when the magnet powder MQP-B was left in the air for an hour at about 300° C., $(BH)_{max}$ thereof decreased to about 65% of that of the powder that had been left in the air for an hour at about 23° C. And after the magnet powder MQP-B had been left in the air for an hour at about 350° C., $(BH)_{max}$ thereof decreased to about 30%. As for the magnet powder MQP-O, when it was left in the air for an hour at about 350° C., $(BH)_{max}$ thereof decreased to less than about 80% of that of the powder that had been left in the air for an hour at about 23° C. In contrast, even if the Ti-containing nanocomposite magnet powder NCP-0 was left in the air for an hour at about 350° C., $(BH)_{max}$ thereof decreased to about 90% of that of the powder that had been left in the air for an hour at about 23° C.

As can be seen, the Ti-containing nanocomposite magnet powder exhibits excellent oxidation resistance. Thus, even while a bonded magnet is produced from this magnet powder (e.g., while a compound is being prepared and/or thermally cured), the magnet powder is not oxidized easily. Accordingly, the anticorrosion treatment, which is necessary for conventional rapidly solidified magnet powder (e.g., MQP-B, in particular) to prevent the magnet powder from being oxidized, can be simplified or even omitted for the Ti-containing nanocomposite magnet powder. Also, when the conventional rapidly solidified magnet powder is used, the magnet powder should be heated and cured within a vacuum or an inert gas atmosphere (e.g., Ar gas) so as not to be oxidized. However, this Ti-containing nanocomposite magnet powder may be heated and cured even in the air. That is to say, by using the Ti-containing nanocomposite magnet powder, the manufacturing process of a bonded magnet can be simplified and the manufacturing cost thereof can be cut down. Furthermore, the conventional rapidly solidified magnet powder has too low oxidation resistance to be applied to making an injection-molded bonded magnet by performing the process step of compounding the powder with a resin binder or molding the mixture at a temperature of about 250° C. to about 300° C. In contrast, by using this Ti-containing nanocomposite magnet powder, a bonded magnet can be formed by performing an injection molding process on a compound including the magnet powder. When the mixture of the Ti-containing nanocomposite magnet powder and the conventional rapidly solidified magnet powder and/or the conventional nanocomposite magnet powder is used, the magnet powder preferably has its mixing ratio adjusted in such a manner as to have an oxygen content of about 0.24 mass t or less even after the powder has been left in the air for an hour at a temperature of about 300° C. to fully achieve the beneficial effects brought about by the excellent oxidation resistance of this Ti-containing nanocomposite magnet powder. More preferably, the magnet powder should be prepared to have an oxygen content of about 0.2 mass % or less in such a situation. Considering the magnetic properties required for bonded magnets for various types of rotating machines or actuators, for example, the magnetic properties of a magnet powder suitably applicable to these compounds for bonded magnets preferably include $B_r$ of about 0.7 T or more, $(BH)_{max}$ of about 80 kJ/m³ or more and $H_{cJ}$ of about 600 kA/m or more in the end. If the magnet powder with this oxidation resistance is used, these magnetic properties are realizable even though the magnet powder is slightly oxidized while a compound and a bonded magnet are being produced.

TABLE 1

| Powder | Temperature (° C.) | $(BH)_{max}$ (kJ/m³) | $B_r$ (T) | $H_{cJ}$ (kA/m) | $O_2$ (%) |
|---|---|---|---|---|---|
| NCP-0 | 23 | 107.0 | 0.802 | 1009.7 | 0.02 |
| | 300 | 103.1 | 0.790 | 989.3 | 0.10 |
| | 350 | 96.1 | 0.774 | 1006.8 | 0.20 |
| MQP-B | 23 | 122.0 | 0.899 | 732.6 | 0.04 |
| | 300 | 79.3 | 0.762 | 686.7 | 0.67 |
| | 350 | 38.2 | 0.546 | 635.8 | 1.93 |
| MQP-O | 23 | 113.0 | 0.818 | 1007.6 | 0.04 |
| | 300 | 105.7 | 0.802 | 999.0 | 0.24 |
| | 350 | 88.5 | 0.744 | 977.4 | 0.59 |

The Ti-containing nanocomposite magnet powder for use in the compound of preferred embodiments of the present invention is characterized in that the magnetic properties thereof lightly depend on the particle size due to its composition and structural features. The Ti-containing nanocomposite magnet powder includes a rare-earth element R at a relatively low mole fraction and has no R-rich grain boundary phases. In addition, fine crystal grains of a boride phase are dispersed around an $R_2Fe_{14}B$ phase. Furthermore, since Ti has a high affinity for boron, the boride phase includes a greater amount of Ti than any other phase. Consequently, the Ti-containing nanocomposite magnet powder is superior in oxidation resistance to conventional rapidly solidified magnet powders.

The conventional rapidly solidified magnet powder includes a relatively large amount of rare-earth element R and is easily oxidizable. Thus, the smaller the size of powder particles, the more significantly the magnetic properties thereof deteriorate due to the oxidation of the powder particles at the surface. For example, the following Table 2 shows the size-by-size magnetic properties of MQP-B magnet powders that were classified with a standard sieve JIS Z8801. In MQP-B (with a maximum particle size of about 300 μm or less), for example, powder particles with sizes of about 75 μm or less (or about 53 μm or less, in particular) exhibited deteriorated magnetic properties as shown in Table 2. For example, the remanence $B_r$ (about 0.79 T) of powder particles with sizes of about 53 μm or less was less than about 90% of the highest remanence $B_r$ (about 0.90 T) of powder particles with sizes of greater than about 125 μm and equal to or smaller than about 150 μm. As for $(BH)_{max}$, the average $(BH)_{max}$ of powder particles with sizes of about 53 μm or less (i.e., a simple average between $(BH)_{max}$ of powder particles with sizes of about 38 μm or less and that of powder particles with sizes of greater than about 38 μm and equal to or smaller than about 53 μm) was about 85.5 kJ/m³. This value was less than about 75% of the average $(BH)_{max}$ (about 114.6 kJ/m³) of powder particles with sizes of greater than about 150 μm and equal to or smaller than about 212 μm (i.e., a simple average between $(BH)_{max}$ of powder particles with sizes of greater than about 150 μm and equal to or smaller than about 180 μm and that of powder particles with sizes of greater than about 180 μm and equal to or smaller than about 212 μm).

In contrast, the magnetic properties of the Ti-containing nanocomposite magnet powder deteriorate to a lesser degree due to oxidation and do not depend on the particle size so heavily. For example, the following Table 3 shows the particle size distribution and size-by-size magnetic properties of the nanocomposite magnet powder NCP-0 that were measured a standard sieve JIS Z8801. In the nanocomposite magnet powder NCP-0 (with a maximum particle size of about 300 μm or less), the magnetic properties hardly depend on the particle size and are generally excellent as shown in Table 3. For example, the remanence $B_r$ (about 0.829 T) of powder particles with sizes of about 53 μm or less was about 98% or more of the highest remanence $B_r$ (about 0.845 T) of powder particles with sizes of greater than about 106 μm and equal to or smaller than about 125 μm. As for $(BH)_{max}$, the average $(BH)_{max}$ of powder particles with sizes of about 53 μm or less was about 104.6 kJ/m³. This value was about 98% or more of the average $(BH)_{max}$ (about 106.6 kJ/m³) of powder particles with sizes of greater than about 150 μm and equal to or smaller than about 212 μm. Ti-containing nanocomposite magnet powders with various compositions had their magnetic properties evaluated in a similar manner. As a result, in most of the compositions, the average $(BH)_{max}$ of nanocomposite magnet powder particles with sizes of about 53 μm or less was about 90% or more of the average $(BH)_{max}$ of powder particles with sizes of greater than about 150 μm and equal to or smaller than about 212 μm. And in many of the compositions, the former $(BH)_{max}$ was about 95% or more of the latter $(BH)_{max}$.

TABLE 2

| Particle | MQP-B | | |
|---|---|---|---|
| Size (μm) | $(BH)_{max}$ (kJ/m³) | $H_{cJ}$ (kA/m) | $B_r$ (T) |
| ≦38 | 83.7 | 744 | 0.79 |
| 38<, ≦53 | 87.2 | 752 | 0.79 |
| 53<, ≦75 | 94.2 | 739 | 0.82 |
| 75<, ≦106 | 108.3 | 748 | 0.84 |
| 106<, ≦125 | 111.5 | 754 | 0.86 |
| 125<, ≦150 | 116.8 | 741 | 0.90 |
| 150<, ≦180 | 115.7 | 750 | 0.88 |
| 180<, ≦212 | 113.4 | 763 | 0.85 |
| 212<, ≦250 | 110.1 | 755 | 0.87 |
| 250< | 112.9 | 752 | 0.88 |

TABLE 3

| Particle | NCP-0 | | | |
|---|---|---|---|---|
| Size (μm) | Mass % | $(BH)_{max}$ (kJ/m³) | $H_{cJ}$ (kA/m) | $B_r$ (T) |
| ≦38 | 9.36 | 104.5 | 854.66 | 0.830 |
| 38<, ≦53 | 6.83 | 104.77 | 844.00 | 0.829 |
| 53<, ≦75 | 12.34 | 107.16 | 853.39 | 0.831 |
| 75<, ≦106 | 19.76 | 110.67 | 859.75 | 0.837 |
| 106<, ≦125 | 12.23 | 112.64 | 866.12 | 0.845 |
| 125<, ≦150 | 15.24 | 111.63 | 864.21 | 0.843 |
| 150<, ≦180 | 9.42 | 105.64 | 896.30 | 0.820 |
| 180<, ≦212 | 8.89 | 107.61 | 849.41 | 0.831 |
| 212<, ≦250 | 4.27 | 99.67 | 851.16 | 0.814 |
| 250< | 1.65 | 88.44 | 844.64 | 0.800 |

As can be seen, the Ti-containing nanocomposite magnet powder exhibits magnetic properties that are at least comparable to, or even better than, those of the conventional rapidly solidified magnet powders. Thus, this nanocomposite magnet powder may be used as a magnet powder of a compound for a rare-earth bonded magnet instead of the conventional rapidly solidified magnet powder (e.g., MQ powder). Furthermore, various compounds with excellent properties described above can be obtained by using the Ti-containing nanocomposite magnet powder. Naturally, a magnet powder for a bonded magnet may consist essentially of the Ti-containing nanocomposite magnet powder alone. However, significant effects are also achievable even when not all of the MQ powder but only powder particles with sizes of about 53 μm or less are replaced with the Ti-containing nanocomposite magnet powder.

Hereinafter, it will be described with reference to the experimental results how the fill density is improved by mixing fine powder particles with sizes of about 53 μm or less or with sizes of about 38 μm or less.

First, nanocomposite magnet powder samples NCP-1 through NCP-5 with various particle size distributions as shown in Table 4 were prepared. The magnet powder NCP-1 was obtained by getting the material alloy thereof pulverized by a power mill using a 0.5 mm φ screen, while the other magnet powders NCP-2 through NCP-5 were obtained by rotating the pin mill at 3,000 rpm, 4,000 rpm 5,000 rpm and 8,000 rpm, respectively. The tap densities of these magnet powder samples NCP-1 through NCP-5 as measured with a tap denser are shown in Table 5, in which the mass percentage of powder particles with sizes of about 53 μm or less and the mass percentage of powder particles with sizes of greater than about 250 μm are also shown for each of the magnet powder samples.

As can be seen from the results shown in Table 5, the samples NCP3, NCP4 and NCP5 including particles with sizes of about 53 μm or less at about 10 mass % or more (more exactly, about 9.5 mass % or more) have tap densities of about 4.2 g/cm³ or more. Thus, these magnet powder samples show excellent fill densities. Generally speaking, the fill density of a magnet powder as evaluated by the tap density thereof correlates to the fill density of a compound powder for a bonded magnet. That is to say, if a compound powder is prepared using a magnet powder with a high fill density, then the compound powder also has a high fill density. Accordingly, when a magnet powder, including about 10 mass % or more of nanocomposite magnet powder particles with sizes of about 53 μm or less, is used, a compound powder for a bonded magnet exhibits improved fill density and flowability. As a result, a compact of quality is obtained.

TABLE 4

| Particle Size (μm) | Mass % | | | | |
|---|---|---|---|---|---|
| | NCP-1 | NCP-2 | NCP-3 | NCP-4 | NCP-5 |
| ≦38 | 2.37 | 2.05 | 4.86 | 8.88 | 17.99 |
| 38<, ≦53 | 1.91 | 2.54 | 4.64 | 7.42 | 20.90 |
| 53<, ≦75 | 4.90 | 5.17 | 11.80 | 16.36 | 26.92 |
| 75<, ≦106 | 11.57 | 13.87 | 23.08 | 26.30 | 23.60 |
| 106<, ≦125 | 7.30 | 11.11 | 13.49 | 12.56 | 5.59 |
| 125<, ≦150 | 12.29 | 14.10 | 16.26 | 13.40 | 3.37 |
| 150<, ≦180 | 13.47 | 17.53 | 10.67 | 7.90 | 1.15 |
| 180<, ≦212 | 17.37 | 17.64 | 9.08 | 4.09 | 0.37 |
| 212<, ≦250 | 16.84 | 8.80 | 3.49 | 1.76 | 0.09 |
| 250<, ≦300 | 9.26 | 4.34 | 1.56 | 0.77 | 0.03 |
| 300< | 2.72 | 2.87 | 1.03 | 0.50 | 0.00 |

TABLE 5

| Sample No. | Mass % | | Tap Density (g/cm³) |
|---|---|---|---|
| | ≦53 μm | 250 μm< | |
| NCP-1 | 4.30 | 12.00 | 4.01 |
| NCP-2 | 4.59 | 7.21 | 4.12 |
| NCP-3 | 9.50 | 2.59 | 4.28 |
| NCP-4 | 16.30 | 1.27 | 4.25 |
| NCP-5 | 38.90 | 0.00 | 4.33 |

Furthermore, to increase the compact density, the magnet powder preferably includes powder particles with sizes of about 38 μm or less. Ti-containing nanocomposite magnet powders NCP-11 through NCP-16 having the particle size distributions shown in Table 6 were prepared and then mixed with about 2 mass % of epoxy resin to obtain respective compounds. Then, the respective compounds were pressed and compacted at a compaction pressure of approximately 980 MPa (=10 t/cm²), thereby forming compacts for a bonded magnet. The densities of the respective compacts for a bonded magnet and the mass percentages of powder particle with sizes of about 38 μm or less in the magnet powders for the respective compounds are shown in FIG. 10.

TABLE 6

| Particle Size (μm) | Mass % | | | | | |
|---|---|---|---|---|---|---|
| | NCP-11 | NCP-12 | NCP-13 | NCP-14 | NCP-15 | NCP-16 |
| ≦38 | 2.1 | 4.9 | 9.4 | 11.6 | 15.0 | 18.0 |
| 38<, ≦53 | 2.5 | 4.6 | 6.8 | 11.0 | 23.2 | 20.9 |
| 53<, ≦75 | 5.2 | 11.8 | 12.3 | 14.4 | 26.0 | 26.9 |
| 75<, ≦106 | 13.9 | 23.1 | 19.8 | 20.3 | 22.4 | 23.6 |
| 106<, ≦125 | 11.1 | 13.5 | 12.2 | 13.5 | 6.1 | 5.6 |
| 125<, ≦150 | 14.1 | 16.3 | 15.2 | 10.4 | 2.9 | 3.4 |
| 150<, ≦180 | 17.5 | 10.7 | 9.4 | 9.0 | 2.2 | 1.2 |
| 180<, ≦212 | 17.6 | 9.1 | 8.9 | 6.9 | 1.7 | 0.4 |
| 212<, ≦250 | 8.8 | 3.5 | 4.3 | 2.1 | 0.5 | 0.1 |
| 250<, ≦300 | 4.3 | 1.6 | 1.7 | 0.8 | 0.1 | 0.0 |
| 300< | 2.9 | 1.0 | 0.0 | 0.1 | 0.0 | 0.0 |

Figure 10:
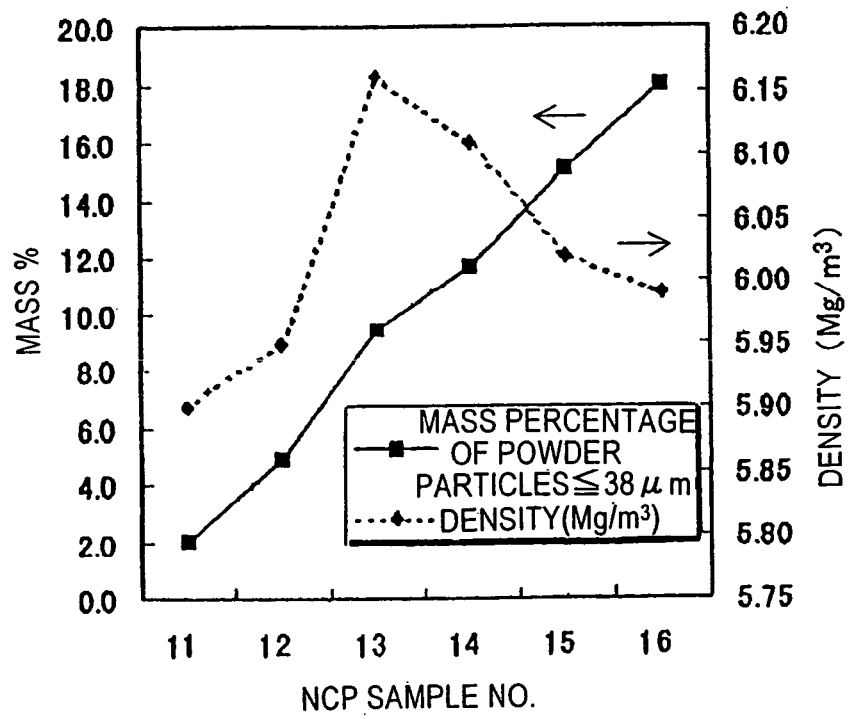
FIG. 10 is a graph showing the densities of compacts for a bonded magnet, which were made of Ti-containing nanocomposite magnet powders with mutually different particle size distributions.

As can be seen from FIG. 10, the density of a compact decreases when the mass percentage of powder particles with sizes of 38 μm or less is too low or too high. The present inventors discovered and confirmed via experiments that a magnet powder, including powder particles with sizes of about 38 μm or less at about 8 mass % or more, is preferably used to achieve a sufficiently high compact density. It should be noted, however, that if a magnet powder used includes powder particles with sizes of about 38 μm or less at more than about 16 mass %, then the compactibility thereof decreases. That is to say, a quality compact of a high density cannot be obtained.

The relationship between the particle size of a magnet powder and the compactability has been described with respect to a compound to be compacted. However, the same statement is also applicable to a compound to be compacted by any other technique such as injection molding or extrusion molding.

Methods for Producing Compound and Magnetic Body

A magnet powder for a bonded magnet, including the Ti-containing nanocomposite magnet powder described above, is compounded with a binder of a resin, for example, thereby producing a compound for a bonded magnet.

A compound to be injection molded is produced by compounding the magnet powder with a thermoplastic resin using a known kneading machine such as a kneader or an extruder. On the other hand, a compound to be compacted is produced by mixing the magnet powder with a thermosetting resin, which has been diluted with a solvent, for example, and then removing the solvent from the mixture. If necessary, the resultant magnet powder-resin mixture is disintegrated to a predetermined particle size. By adjusting the disintegrating and other conditions, the mixture may be formed into granulated powder. Also, the powder material obtained by the pulverization process may be granulated, too.

To improve the anticorrosiveness of the magnet powder, the magnet powder may have its surface treated by a known process (e.g., conversion-coating process) in advance. Also, to further improve the anticorrosiveness of the magnet powder, the wettability of the magnet powder with the resin and the compactibility of the compound, any of various coupling agents, including silane, titanate, aluminate and zirconate agents, is preferably used. Also, ceramic ultra-fine particles of colloidal silica or a lubricant such as zinc stearate, calcium stearate or amide stearate is preferably used because the lubricity of the compound with the kneading or compacting machine and the flowability thereof can be both improved in that case. Furthermore, thermal stabilizer, fire retardant or plasticizer may also be used.

A compound for a magnet may be molded by any of various molding methods and may be used in any of numerous applications. Thus, depending on the intended application, the type of the resin binder and the compounding ratio of the magnet powder may be determined appropriately. Examples of usable resins include thermosetting resins such as epoxy, phenol and melamine resins, thermoplastic resins such as polyamides (including nylon 66, nylon 6 and nylon 12), polyethylene, polypropylene, polyvinyl chloride, polyester and polyphenylene sulfide, rubbers or elastomers and denatured, copolymers and mixtures thereof. In particular, compounds can be obtained relatively easily by using high-melting resins with softening points of about 180° C. or more (e.g., nylon 6 and polyphenylene sulfide), which have been difficult to use at an industrial scale.

Furthermore, when the Ti-containing nanocomposite magnet powder is used, the compactibility and flowability are improvable. Accordingly, high-viscosity resins, which have been difficult to use in the prior art, may also be used. Furthermore, the magnet powder is not oxidizable easily. Thus, high-temperature resins (e.g., polyimides, liquid crystal polymers and high-molecular-weight-grade polymers), which cannot be used in the prior art due to their high melting or softening points, may also be used. As a result, the properties of the resultant bonded magnet (e.g., thermal resistance thereof) improve.

Also, a thermosetting resin that cures at a higher temperature than the prior art may be used, too. Furthermore, even a mixture of a thermosetting resin and a thermoplastic resin may be used also. For example, as disclosed by F. Yamashita in "Applications of Rare-earth Magnets to the Small Motor Industry", pp. 100–111, Proceedings of the Seventeenth International Workshop, Rare Earth Magnets and their Applications, August 2002, Newark, Delaware, USA, Edited by G. C. Hadjipanayis and M. J. Bonder, Rinton Press (which will be referred to herein as "Document Yamashita"), a material obtained by dispersing a powder of a thermoplastic resin in a thermosetting resin (e.g., epoxy resin) may be used.

Examples of preferred forming techniques include compacting, rolling, calendaring, extruding and injection molding. These forming techniques may be used in combination, too. For example, as described in the Document authored by Yamashita cited above, compacting and rolling may be used in combination.

Among these forming techniques, the compound can be formed only in a relatively simple shape according to the compacting, rolling or extruding technique. In these techniques, however, the compound does not have to show so high a flowability during the forming process. Thus, the magnet powder can be included in the compound at a higher percentage. Since the compound of preferred embodiments of the present invention includes the Ti-containing nanocomposite magnet powder, the magnet powder percentage can be increased to more than about 80%, for example, which is much higher than that achieved by a conventional technique, and can also reach as high as about 90% at the maximum. However, if the magnet powder percentage is increased excessively, then the resin binder for binding the magnet powder particles together tightly enough might be in an insufficient amount, thus possibly decreasing the mechanical strength of the resultant bonded magnet or dropping the magnet powder particles during the use of the magnet. For these reasons, the magnet powder percentage is preferably at most about 85%. Also, where the compound of preferred embodiments of the present invention is compacted, the total volume of voids formed on the surface of the resultant compact can be reduced. As a result, a coating to be formed on the surface of the compact if necessary is not seriously affected, e.g., creation of pin holes can be minimized.

Preferred embodiments of the present invention provide a compound with good flowability. Accordingly, such a compound can be injection-molded effectively enough. Also, the compound can be molded into a complex shape, which has been difficult to realize when a compound including the conventional rapidly solidified magnet powder is used. Also, the magnet powder can be compounded at a higher percentage (e.g., greater than about 65%) than the conventional compound, thus improving the magnetic properties of the resultant magnet body. Furthermore, the Ti-containing nanocomposite magnet powder included in the compound of preferred embodiments of the present invention has excellent oxidation resistance. For that reason, even if the compound is injection-molded at a relatively high temperature with a thermoplastic resin or elastomer with a relatively high softening point, the resultant magnetic properties will not deteriorate. It should be noted that depending on the intended application, the surface of the bonded magnet is preferably covered with a coating by a resin coating or a plating technique.

The effects described above are achievable not just when the compound is injection-molded but also when the compound is subjected to either a rolling process or a multi-stage forming process, including compacting and rolling, to form a sheetlike bonded magnet. This is because the compound of preferred embodiments of the present invention also exhibits good flowability even in that situation.

Applications of Bonded Magnet

As described above, the inventive compound for a bonded magnet has higher fill density (or compactibility) and thermal resistance as compared to a compound including a conventional rapidly solidified magnet powder (e.g., MQP-B produced by Magnequench Inc.). Thus, when the compound of preferred embodiments of the present invention is used, a bonded magnet, exhibiting excellent magnetic properties that are at least comparable to, or even better than, those of a bonded magnet made from the conventional rapidly solidified magnet powder, can be formed. Accordingly, the bonded magnet of preferred embodiments of the present invention can find various applications effectively.

Hereinafter, an application of the bonded magnet to a stepping motor will be described with reference to FIG. 11.

Figure 11:
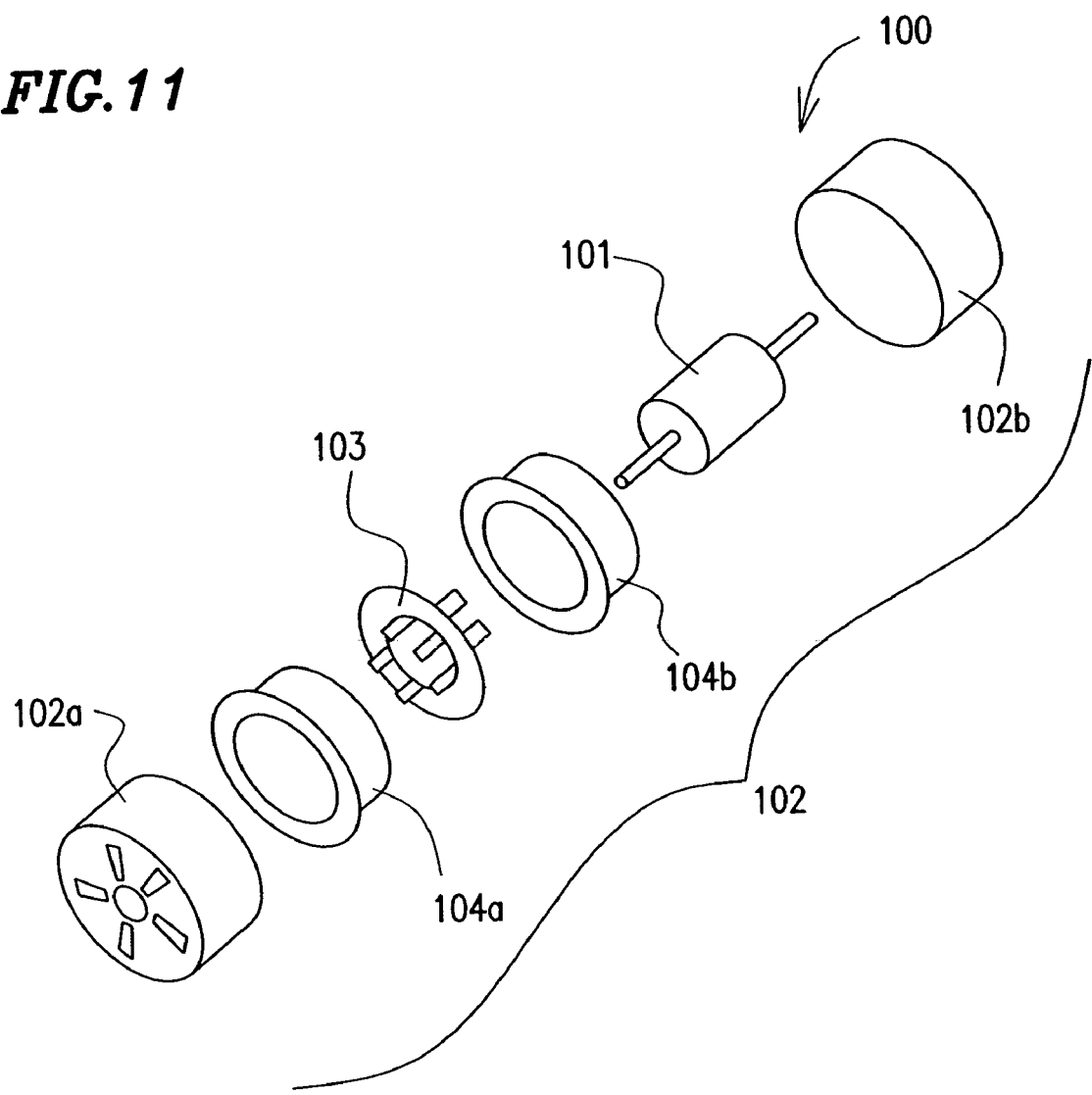
FIG. 11 is an exploded perspective view schematically illustrating the construction of a stepping motor 100 including a permanent magnet rotor as a preferred embodiment of the present invention.

FIG. 11 is an exploded perspective view schematically illustrating the construction of a stepping motor 100 including a permanent magnet rotor. The stepping motor 100 includes a rotor 101 and a stator portion 102 that surrounds the rotor 101. The rotor 101 includes bonded magnets that have been uniformly magnetized at 10 poles around its outer circumference with an outer diameter of about 8 mm. The stator portion 102 includes: outer yokes 102a and 102b; two inner yokes 103 that have been bonded to the backs of the outer yokes 102a and 102b, respectively; and magnetizing coils 104a and 104b interposed between the inner yokes 103. This stepping motor 100 is a so-called "PM-type pulse motor", in which the rotor 101 is displaced by one step angle by the magnetomotive force of the magnetizing coils 104a and 104b that corresponds to one pulse current.

The bonded magnets included in the rotor 101 are formed by using the compound of preferred embodiments of the present invention with the excellent fill density (or compactibility). Thus, the bonded magnets exhibit excellent magnetic properties that are at least comparable to, or even better than, those of bonded magnets made from the conventional rapidly solidified magnet powder. In addition, these bonded magnets also excel in mechanical properties (e.g., much less likely chip), thus ensuring sufficient reliability. Furthermore, these bonded magnets also have good thermal resistance.

A stepping motor including such bonded magnets made from the compound of preferred embodiments of the present invention is a high-performance motor of a small size that can ensure sufficient reliability. Thus, such a stepping motor can be used effectively in an office automation appliance such as a printer or a disc drive, a camera, or an audiovisual appliance including a camcorder.

The rotor 101 may be produced by any of various methods. For example, the rotor 101 may be formed by compacting a compound including a thermosetting resin or by injection-molding or extruding a compound including a thermoplastic resin. Hereinafter, an exemplary method for producing the rotor 101 will be described with reference to FIG. 12.

Figure 12A:
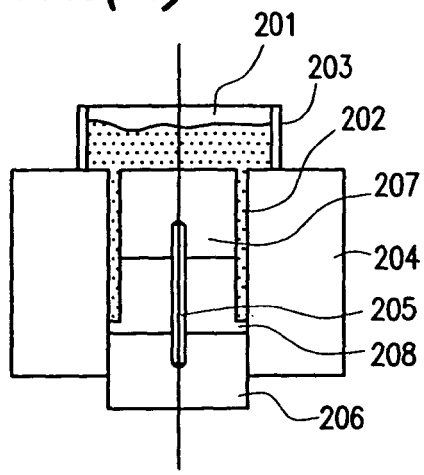
FIGS. 12(a) through 12(d) are views showing a bonded-magnet-integrated rotor 200 and a compacting process thereof in accordance with a preferred embodiment of the present invention.
Figure 12B:
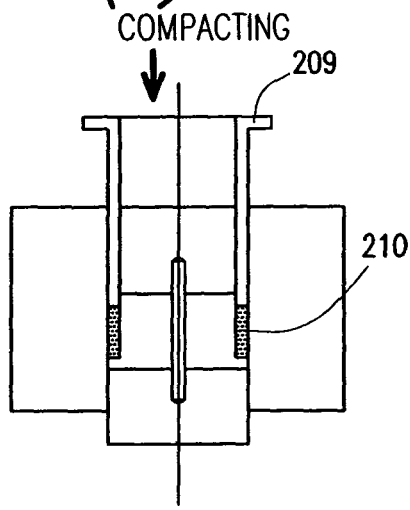
Figure 12C:
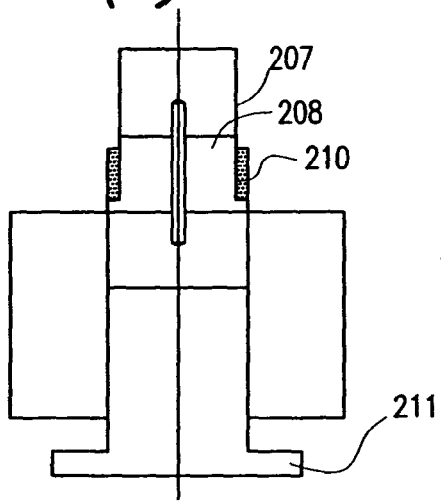
Figure 12D:
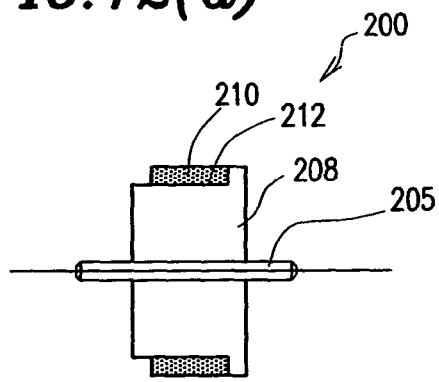

For example, where a compound including a thermosetting resin as a binder is used, the rotor 200 shown in FIG. 12(d), including a bonded magnet as its integral part, can be produced through the compacting process steps shown in FIGS. 12(a) through 12(c).

The rotor 200 shown in FIG. 12(d) includes a rotor shaft 205, a yoke 208 surrounding the shaft 205, and a bonded magnet 210. The bonded magnet 210 is adhered to the surface 212 of the yoke 208.

The rotor 200 may be produced by the manufacturing process steps shown in FIGS. 12(a) through 12(c).

First, as shown in FIG. 12(a), while a feeder box 203 containing a powder compound 201 is being slid on the upper surface of a die 204, a cavity 202 is filled with the compound 201. The yoke 208, including the rotor shaft 205 fitted in tightly at the center thereof, has been inserted into the die 204. An auxiliary member 207 is provided thereon so as to cover the rotor shaft 205. That is to say, the cavity 202 is defined between the die 204 and these members 207 and 208.

Next, as shown in FIG. 12(b), the compound 201 is pressed and compacted via an upper punch 209, for example, thereby physically bonding the yoke 208 and the compacted compound 201 together.

Thereafter, as shown in FIG. 12(c), the rotor compact is unloaded from the die 204. The auxiliary member 207 is easily removable from the rotor shaft 205 and yoke 208. As a result, the rotor shaft 205, yoke 208 and bonded magnet 210 have been integrated together. At this point in time, however, the bonded magnet 210 is still a powder compact of the compound and the thermosetting resin included in the compound has not cured yet.

Subsequently, to cure the bonded magnet 210 and to increase the bonding strength at the interface 212 between the yoke 208 and bonded magnet 210, the compound is cured at a predetermined temperature. The curing temperature and time may be determined appropriately according to the type of the resin used.

The compound of preferred embodiments of the present invention includes the magnet powder with excellent thermal resistance, and can be cured effectively at a higher temperature than the conventional compound. Accordingly, the bonded magnet 210 obtained in this manner exhibits much better thermal resistance, mechanical properties and adhesive strength than the conventional ones. Furthermore, in the compound of preferred embodiments of the present invention, the magnet powder itself has excellent anticorrosiveness. Thus, even if the thermosetting process is carried out in the air, the resultant magnet properties deteriorate only slightly. That is to say, there is no need to carry out the thermosetting process in an inert atmosphere, thus greatly reducing the process cost.

According to this compacting method, while the ring-shaped bonded magnet 210 is being formed, the bonded magnet 210 can be bonded with the yoke 208 and rotor shaft 205 together. Thus, the rotor 200 can be obtained at a high productivity.

In the example described above, the powder compact is cured after having been unloaded from the die 204. Alternatively, the compact may be cured in the die 204 by providing a heating mechanism for the die 204. That is to say, the compound may be cured while being pressed. Furthermore, the bonded-magnet-integrated rotor does not have to be formed by the compacting process but may also be formed by an injection-molding process.

Also, the compound of preferred embodiments of the present invention exhibits a higher fill density (i.e., compactibility and/or flowability) than a compound including the conventional rapidly solidified magnet powder. Thus, even a small gap (with a width of about 2 mm, for example) can also be filled with the compound just as intended. Consequently, the compound of preferred embodiments of the present invention is effective to produce a magnet-embedded rotor 300 (see FIG. 13) for use in an IPM (interior permanent magnet) type motor.

Figure 13:
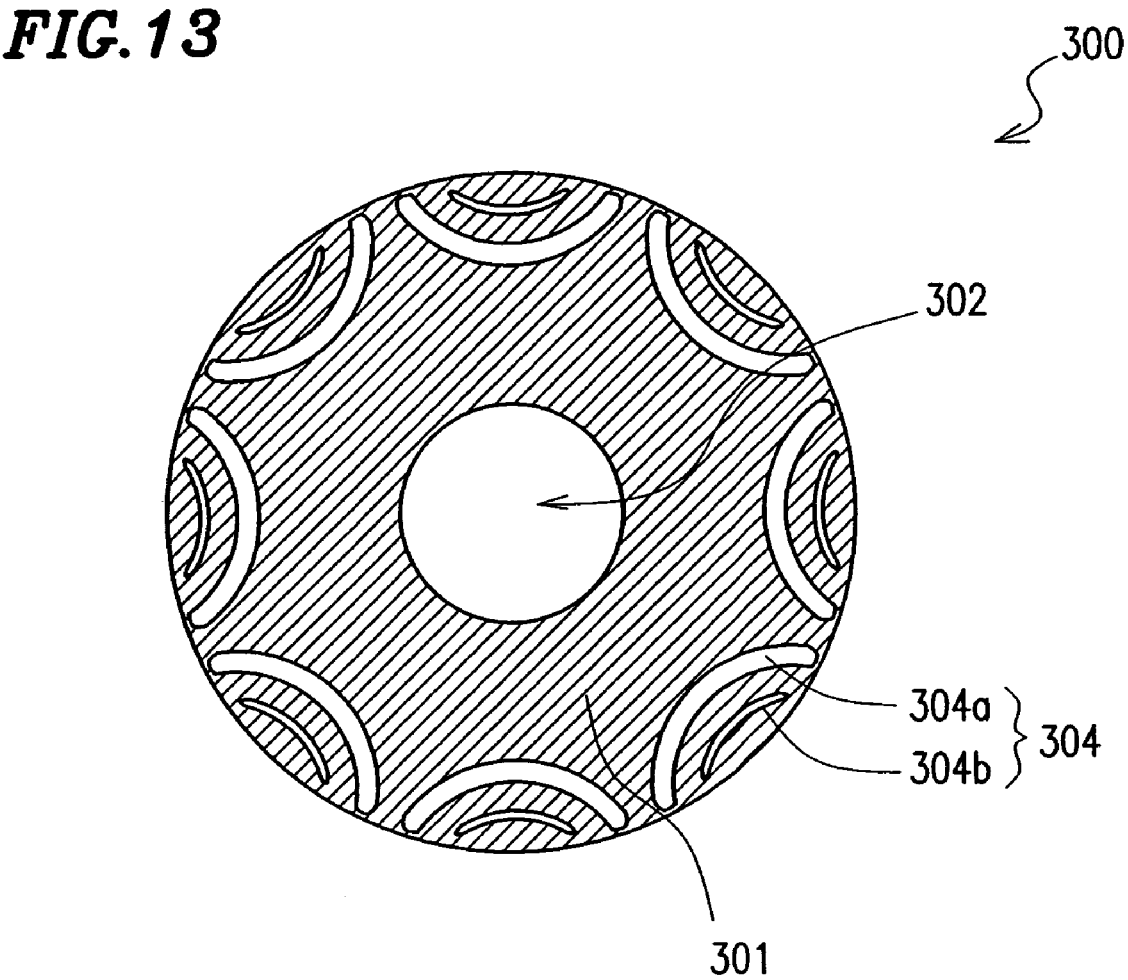
FIG. 13 is a schematic representation illustrating the configuration of a magnet-embedded rotor 300 according to another preferred embodiment of the present invention.

The magnet-embedded rotor 300 shown in FIG. 13 includes an iron core 301 (with a diameter of about 80 mm and a thickness of about 50 mm, for example), a rotating shaft slot 302 provided at the center of the iron core 301, and a plurality of arced magnet slots 304 arranged along the outer circumference of the iron core 301. In the illustrated example, eight arced magnet slots 304 are provided. Each of these slots 304 has a two-layer structure consisting of a first slot 304a with a width of about 3.5 mm, for example, and a second slot 304b with a width of about 1.8 mm, for example. These slots 304a and 304b are filled with the compound of preferred embodiments of the present invention, thereby forming bonded magnets. By combining this rotor 300 with a stator (not shown) in which S and N poles are arranged alternately so as to face the magnet slots 304 of the rotor 300, an IPM type motor can be obtained.

The bonded magnets may be formed by any of various techniques. For example, where a compound including a thermosetting resin is used, an in-slot compaction technique (see Japanese Laid-Open Publication No. 63-98108, for example) may be adopted. Also, where a compound including a thermoplastic resin is used, an extrusion or injection molding technique may be adopted. According to any of these techniques, the slots 304a and 304b can be filled with the compound of preferred embodiments of the present invention just as intended because the compound achieves a good fill density. Thus, bonded magnets, exhibiting excellent mechanical properties and thermal resistance and showing magnetic properties that are at least comparable to, or even better than, those of the conventional magnets, can be obtained. As a result, a higher-performance, higher-reliability IPM type motor of a smaller size can be produced.

Figure 14A:
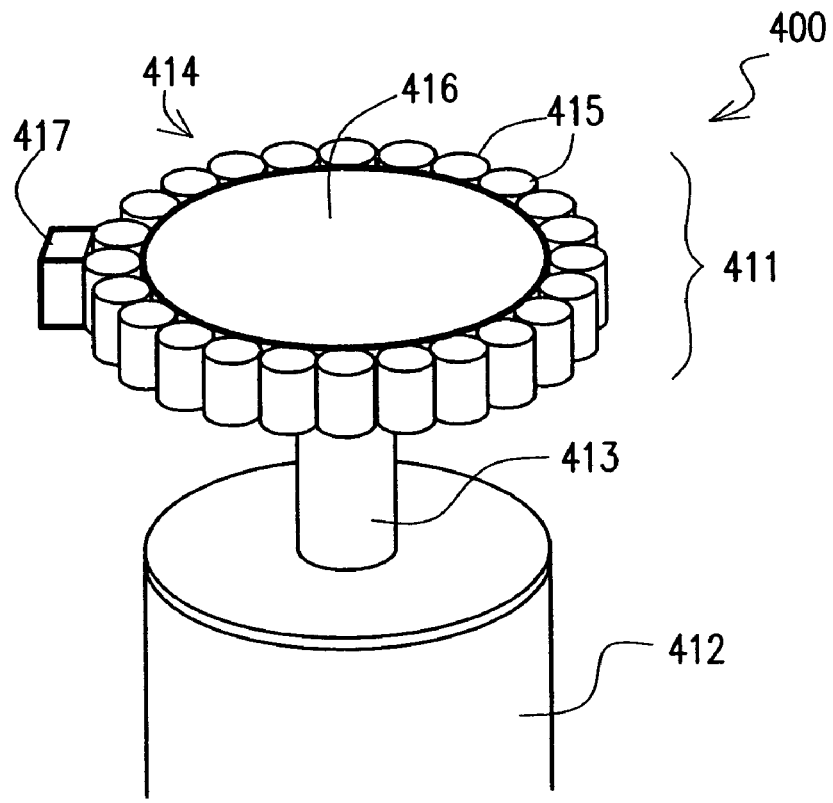
FIGS. 14(a) and 14(b) are views schematically illustrating the structure of a rotary encoder 411 according to still another preferred embodiment of the present invention.

The compound of preferred embodiments of the present invention is also effective to form bonded magnets for the angle sensor (or rotary encoder) 400 shown in FIG. 14(a).

The rotary encoder 411 shown in FIG. 14(a) includes a rotating shaft 413, a rotating drum 416 coupled to the rotating shaft 413, a rotor 414 that has been bonded to the outer circumference of the rotating drum 416 and includes a plurality of bonded magnets 415, and a sensor 417 attached to the outer circumference of the rotor 414. The sensor 417 may be of any type as long as the sensor 417 can detect variation in magnetic flux produced from the rotor 414. For example, the sensor 417 may be Hall device, magnetoresistance device or magnetoimpedance effect device. The rotating shaft 413 is also coupled to a motor 412. The sensor 417 is connected to an instrument (not shown).

Figure 14B:
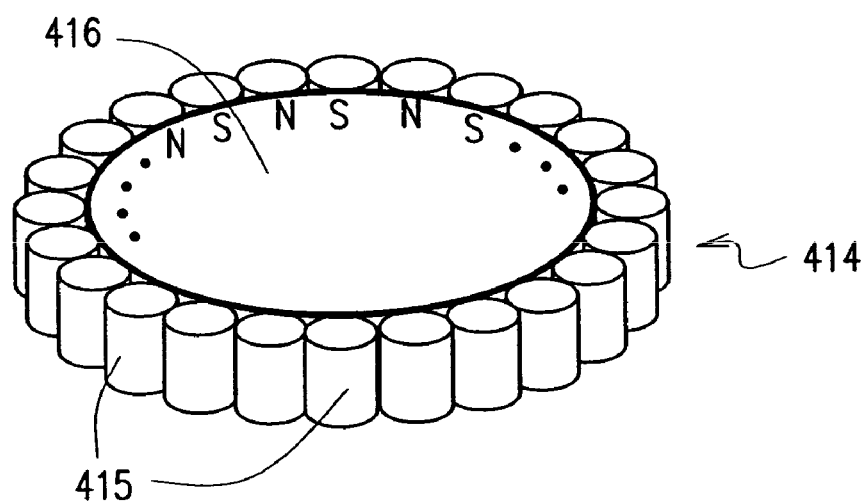

The bonded magnets 415, made of the compound of preferred embodiments of the present invention, may have a substantially cylindrical shape as shown in FIG. 14(b). Also, the bonded magnets 415 are arranged around the outer circumference of the rotating drum 416 so that the N and S poles thereof alternate with each other. The bonded magnets 415 may be bonded to the rotating drum 416 with an adhesive, for example. The rotating drum 416 may be made of a metal material, for example, and does not have to be made of a magnetic material.

This rotary encoder 400 operates in the following manner. As the rotating shaft 413 of the motor 412 rotates, the rotor 414 also rotates. In the meantime, the magnetic flux, produced from the bonded magnets 415 arranged around the outer circumference of the rotor 414 and then sensed by the sensor 417, changes its direction as the rotor 414 rotates. In response, the sensor 417 generates a signal representing such a variation in the direction of the magnetic flux (e.g., a variation in voltage or current) and outputs the signal to the instrument (not shown). In this manner, the quantity (i.e., the angle) of rotation of the motor 412 is measured.

The compound of preferred embodiments of the present invention achieves a good fill density (i.e., compactibility or flowability). Thus, bonded magnets, exhibiting excellent magnetic properties that are at least comparable to, or even better than, those of the conventional magnets and improved mechanical properties and thermal resistance, can be made of the compound. Consequently, a high-performance, high-reliability angle sensor of a small size can be obtained. The magnet of a rotary encoder does not have to be a number of magnets that are arranged as shown in FIGS. 14(a) and 14(b) but may also be a multipolar magnetized ring magnet provided along the outer circumference of the rotating drum 416.

Figure 15A:
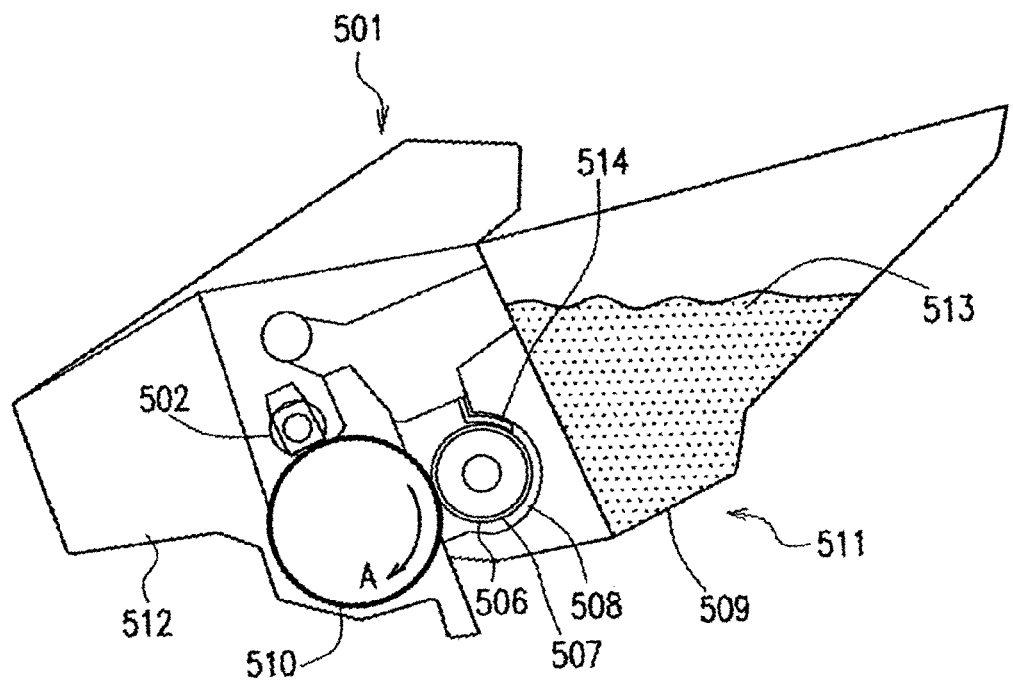
FIGS. 15(a) and 15(b) are cross-sectional views schematically illustrating the structure of an electrophotograph process cartridge 501, including a magnetic roller 507, according to yet another preferred embodiment of the present invention.
Figure 15B:
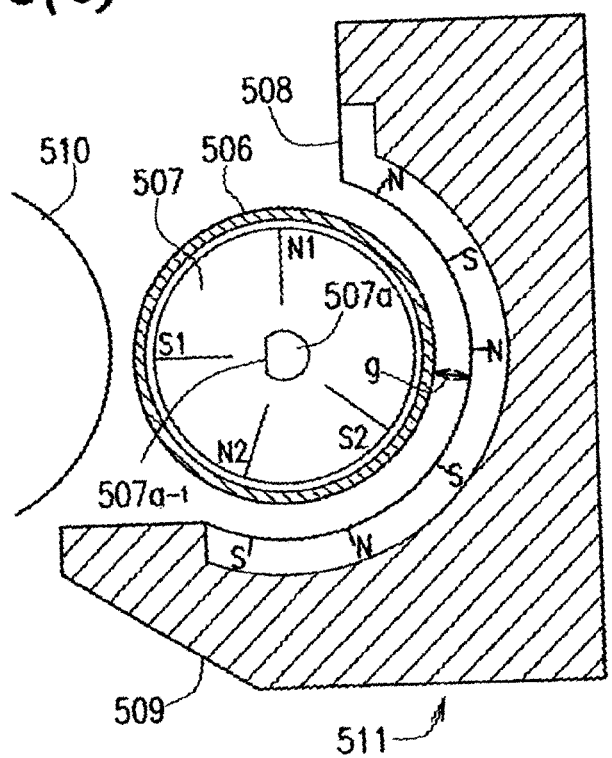

Furthermore, the compound of preferred embodiments of the present invention is also effective to make a bonded magnet for the magnetic roller illustrated in FIGS. 15(a) and 15(b).

FIG. 15(a) is a cross-sectional view schematically illustrating the structure of an electrophotograph process cartridge 501. The cartridge 501 includes a photosensitive drum 510 driven in the direction indicated by the arrow A, a charging roller 502 for charging the drum 510, a developer 511, and a cleaner 512. These members 510, 502, 511 and 512 are combined together within a single housing.

The developer 511 includes a developing container 509 in which toner 513 is stored. A developing sleeve 506 is provided in a rotatable state inside the opening of the developing container 509 so as to face the photosensitive drum 510. The developer 511 further includes an elastic blade 514, which contacts with the developing sleeve 506, thereby controlling the thickness of the toner 513 that is being deposited on, and transported by, the developing sleeve 506.

FIG. 15(b) is a cross-sectional view schematically illustrating the configuration of the developer 511 included in the process cartridge 501.

The developing sleeve 506 is made of a non-magnetic material and supported in a rotatable state by the developing container 509 via a bearing. A magnetic roller 507 with a diameter of about 8.5 mm, for example, is provided inside of the developing sleeve 506 with a diameter of about 10 mm, for example. The shaft 507a of the magnetic roller 507 has a notch 507a-1, which engages with the developing container 509 to secure the magnetic roller 507 to the container 509. The magnetic roller 507 has a developing pole S1 in front of the photosensitive drum 510 and three more poles S2, N1 and N2 at other positions.

A magnet 508 is arranged so as to surround the developing sleeve 506 and forms a magnetic curtain in the gap g between the developing sleeve 506 and the magnet 508. The magnetic curtain retains the toner in the gap, thereby preventing the toner leakage.

The magnetic roller 507 is made of the compound of preferred embodiments of the present invention, and exhibits excellent magnetic properties that are at least comparable to, or even better than, those of the conventional magnet. The roller 507 also excels in mechanical properties and thermal resistance. Accordingly, the magnetic roller 507 and developing sleeve 506 can be of smaller sizes than the conventional ones, and yet can exhibit improved performance. The magnetic roller made of the compound of preferred embodiments of the present invention is also applicable for use in a developer or developing cartridge for a photocopier or a laser beam printer.

Hereinafter, examples of preferred embodiments of the present invention will be described.

EXAMPLES NOS. 1 TO 3 AND COMPARATIVE EXAMPLE NO. 1

How to Prepare Magnet Powder

A material, which had been mixed to have an alloy composition including about 8.9 at % of Nd, about 12.6 at % of B, about 3.0 at % of Ti, about 1.4 at % of C, about 1.0 at % of Nb and Fe as the balance and a mass of about 5 kg, was introduced into a crucible and then inductively heated within an Ar atmosphere having a pressure maintained at about 50 kPa, thereby obtaining a molten alloy.

A rapidly solidified alloy was made from the molten alloy by a strip casting process. More specifically, the crucible was tilted to directly feed the molten alloy onto a pure copper chill roller, having a diameter of about 250 mm and rotating at a surface velocity of about 14 m/s, by way of a shoot, thereby rapidly cooling and solidifying the molten alloy. In feeding the melt onto the roller, the melt was branched into two flows on the shoot and the melt feeding rate was controlled to be about 1.3 kg/min per melt flow by adjusting the tilt angle of the crucible.

As for the rapidly solidified alloys obtained in this manner, the thicknesses of 100 cast flakes were measured with a micro meter. As a result, the rapidly solidified alloys had an average thickness of about 85 μm with a standard deviation σ of about 13 μm. Thereafter, the rapidly solidified alloy that had been obtained in this manner was pulverized to a size of about 850 μm or less and then was loaded at a feeding rate of about 20 g/min into a hoop belt furnace, running at a belt feeding speed of about 100 mm/min and having a soaking zone with a length of about 500 mm, within an argon atmosphere that had a temperature retained at about 780° C. In this manner, the powder was thermally treated to obtain a magnet powder.

The crystal structure of the resultant magnet powder was identified by a powder XRD analysis. As a result, the magnet powder turned out to be a Ti-containing nanocomposite magnet powder including an $Nd_2Fe_{14}B$ phase, an $Fe_{23}B_6$ phase and an α-Fe phase.

Thereafter, the resultant magnet powder was pulverized with a pin disk mill as already described with reference to FIGS. 7(a) and 7(b) to obtain a magnet powder having the particle size distribution shown in the following Table 7. It should be noted that the particle size distribution was obtained by classifying about 50 g of the powder with a standard sieve complying with JIS Z8801 and plotting the masses of powder particles with respective sizes.

TABLE 7

| Particle size (μm) | Mass % |
| --- | --- |
| ≦38 | 10.40 |
| 38<, ≦53 | 22.74 |
| 53<, ≦75 | 27.47 |
| 75<, ≦106 | 30.17 |
| 106<, ≦125 | 8.39 |
| 125<, ≦150 | 0.55 |
| 150< | 0.28 |

The aspect ratios of the resultant 100 magnet powder particles were obtained with a scanning electron microscope. As a result, all of those particles had aspect ratios of about 0.3 to about 1.0.

How to Prepare Compound

The Ti-containing nanocomposite magnet powder (with a true density of about 7.5 g/cm³) and an MQP-O powder on the market (with a true density of about 7.5 g/cm³), of which the particle size distribution had been almost equalized with that shown in Table 7 through classification, were mixed together at the volume percentages shown in the following Table 8.

TABLE 8

| | Ti-containing nanocomposite magnet powder | MQP-O |
| --- | --- | --- |
| Example 1 | 100% | — |
| Example 2 | 70% | 30% |
| Example 3 | 2% | 98% |
| Cmp. Ex. 1 | — | 100% |

The resultant mixtures were used as magnet powders for bonded magnets. These magnet powders for bonded magnets and Nylon 66 (with a true density of about 1.1 g/cm³) were kneaded together with a biaxial kneader, for example, thereby obtaining compounds for rare-earth bonded magnets as Examples Nos. 1 to 3 and Comparative Example No. 1. The volume percentage of the magnet powder in the resultant compound (i.e., the magnet powder percentage), which was obtained based on the true density (of about 5.0 g/cm³) of the resultant compound, was about 61%.

Evaluations

The compounds representing these examples and comparative example were subjected to the following evaluations.

Evaluation of Flowability

The melt flow rates (MFR) of the compounds representing Examples Nos. 1 to 3 and Comparative Example No. 1 were evaluated with a melt indexer. The evaluation conditions included a nozzle diameter of about 2.095 mm, an extrusion load of about 5 kgf, and melting temperatures of about 240° C., about 260° C. and about 280° C. It should be noted that the higher the MFR value of a compound, the better the flowability of the compound. The results are shown in the following Table 9.

Evaluation of Oxidation Resistance

Increases in mass due to oxidation (i.e., increase due to oxidation) were measured on about 5 g of compounds representing Examples Nos. 1 to 3 and Comparative Example No. 1, which had been left in the air for about 10 minutes at about 400° C. The increase due to oxidation is represented herein as a percentage obtained by (mass after leaving−mass before leaving)/(mass before leaving). The smaller the increase due to the oxidation of a compound, the better the oxidation resistance of the compound. The results are also shown in the following Table 9:

TABLE 9

| | MFR value (g/10 min.) | | | Increase (%) |
| --- | --- | --- | --- | --- |
| | 240° C. | 260° C. | 280° C. | Due to oxidation |
| Example 1 | 136 | 220 | 366 | 0.152 |
| Example 2 | 150 | 255 | 350 | 0.180 |
| Example 3 | 114 | 190 | 320 | 0.254 |
| Cmp. Ex. 1 | 67 | 115 | 190 | 0.261 |

Property Evaluation of Injection-Molded Body

The compounds representing Example No. 1 and Comparative Example No. 1 were injection-molded using a cavity with cross-sectional sizes of approximately 2 mm×10 mm and a height (or depth) of approximately 60 mm at the injection temperatures shown in the following Table 10, thereby obtaining bonded magnets having a flat and elongated shape. It should be noted that this cavity shape was adopted to replicate the slot shape of a rotor for use in the IPM motor described above.

Each of these bonded magnets was equally divided into three in the cavity depth direction to obtain three magnet pieces with dimensions of approximately 2 mm×10 mm×20 mm. These three magnet pieces will be referred to herein as "magnet pieces A, B and C", which are the closest to, the next closest to, and the least close to, the injection molding gate, respectively. A pulsed magnetic field of about 3.2 MA/m or more was applied to these magnet pieces parallelly to the shorter side (i.e., the 2 mm side) thereof, thereby magnetizing them. Thereafter, the magnetic properties thereof were measured with a BH tracer. The results are shown in the following Table 11.

TABLE 10

| | Injection Temperature (° C.) | Magnet Piece | $B_r$ (T) | $H_{cJ}$ (kA/m) | $(BH)_{max}$ (kJ/m³) |
| --- | --- | --- | --- | --- | --- |
| Example No. 1 | 260 | A | 0.500 | 994.2 | 49.4 |
| | | B | 0.496 | 994.0 | 48.4 |
| | | C | 0.497 | 997.5 | 48.9 |

TABLE 10-continued

| | Injection Temperature (° C.) | Magnet Piece | $B_r$ (T) | $H_{cJ}$ (kA/m) | $(BH)_{max}$ (kJ/m³) |
|---|---|---|---|---|---|
| | 350 | A | 0.495 | 989.7 | 47.0 |
| | | B | 0.493 | 990.3 | 47.1 |
| | | C | 0.496 | 990.4 | 47.5 |
| Cmp. Example No. 1 | 260 | A | 0.481 | 987.2 | 47.2 |
| | | B | 0.472 | 992.6 | 42.8 |
| | | C | 0.465 | 989.9 | 40.3 |
| | 350 | A | 0.433 | 993.1 | 40.7 |
| | | B | 0.425 | 984.2 | 37.8 |
| | | C | 0.414 | 988.8 | 35.1 |

As can be seen from the results shown in Table 9, the compound representing Example No. 3, including about 2 mass % of Ti-containing nanocomposite magnet powder, exhibited improved flowability as compared to the compound representing Comparative Example No. 1 including only the conventional MQP-O powder. Also, when the percentage of the Ti-containing nanocomposite magnet powder was increased to about 70%, the increase due to oxidation dropped to less than about 0.2 mass %. That is to say, the oxidation resistance was improved. Furthermore, looking at the MFR values at about 240° C. and about 260° C., the compound representing Example No. 2 showed the highest MFR values. Thus, it can be seen that to achieve a particularly high flowability at relatively low temperatures, the percentage of the Ti-containing nanocomposite magnet powder is preferably about 70 mass % or less.

The compound representing Example No. 1, including the Ti-containing nanocomposite magnet powder, showed excellent flowability and oxidation resistance. Thus, as can be seen from the results shown in Table 10, the compound representing Example No. 1 exhibited constant magnetic properties, no matter how close to the gate the magnet piece was. That is to say, the injection molding process could be carried out constantly even with a narrow cavity. In addition, even when the molding process was performed at about 350° C., no deterioration in magnetic properties due to the oxidation of the resultant bonded magnet was observed. Such an increase in oxidation resistance is believed to have been realized not just because of the oxidation resistance of the Ti-containing nanocomposite magnet powder itself for use in preferred embodiments of the present invention but also because the respective particles, making up the magnet powder, should have been sufficiently coated with the resin.

On the other hand, the compound representing Comparative Example No. 1 showed a lower flowability and a relatively high increase due to oxidation of more than about 0.26 mass % (i.e., inferior oxidation resistance). As also can be seen from the results shown in Table 10, the more distant from the gate the magnet piece was, the lower the magnetic properties thereof (i.e., the lower the fill density of the compound in the cavity). Furthermore, the magnet piece that was injection-molded at about 350° C. exhibited apparently lower magnetic properties than the magnet piece that was molded at about 260° C. Thus, it can be seen that the magnetic properties deteriorated due to the oxidation of the magnet powder.

EXAMPLE NO. 4 AND COMPARATIVE EXAMPLES NOS. 2 AND 3

How To Prepare Compound

A compound representing Example No. 4 was prepared using only the Ti-containing nanocomposite magnet powder (with a true density of about 7.5 g/cm³, see Table 7 for particle size distribution) that was used in the Examples Nos. 1 to 3 described above. On the other hand, compounds representing Comparative Examples Nos. 2 and 3 were prepared using a MQP-B powder (available from MQI Inc. and with a true density of about 7.6 g/cm³) and a MQP-O powder (available from MQI Inc. and with a true density of about 7.5 g/cm³), respectively.

More specifically, each of these magnet powders was mixed with about 2 mass % of epoxy resin, which had a true density of about 1.2 g/cm and which had been diluted with methyl ethyl ketone (where the mass percentage was calculated with respect to the resultant compound). Thereafter, the mixture was kneaded within an Ar atmosphere while the methyl ethyl ketone was being vaporized, thereby obtaining compounds for rare-earth bonded magnets representing Example No. 4 and Comparative Examples Nos. 2 and 3. The volume percentages of the rare-earth alloy powders in the compounds, which were obtained based on the true density (of about 6.9 g/cm³) thereof, were about 90% in the compounds representing Example No. 4 and Comparative Example No. 3 and 89% in the compound representing Comparative Example No. 2, respectively.

How to Prepare Bonded Magnet

Compressed bonded magnets, each having a diameter of about 10 mm and a height of about 7 mm, were made of the compounds representing Example No. 4 and Comparative Examples Nos. 2 and 3 with the compacting pressure adjusted such that each of the resultant magnets would have a density of about 5.9 g/cm³. Thereafter, the magnets were thermally treated at about 150° C. for one hour within an Ar gas atmosphere.

Evaluation

Figure 16A:
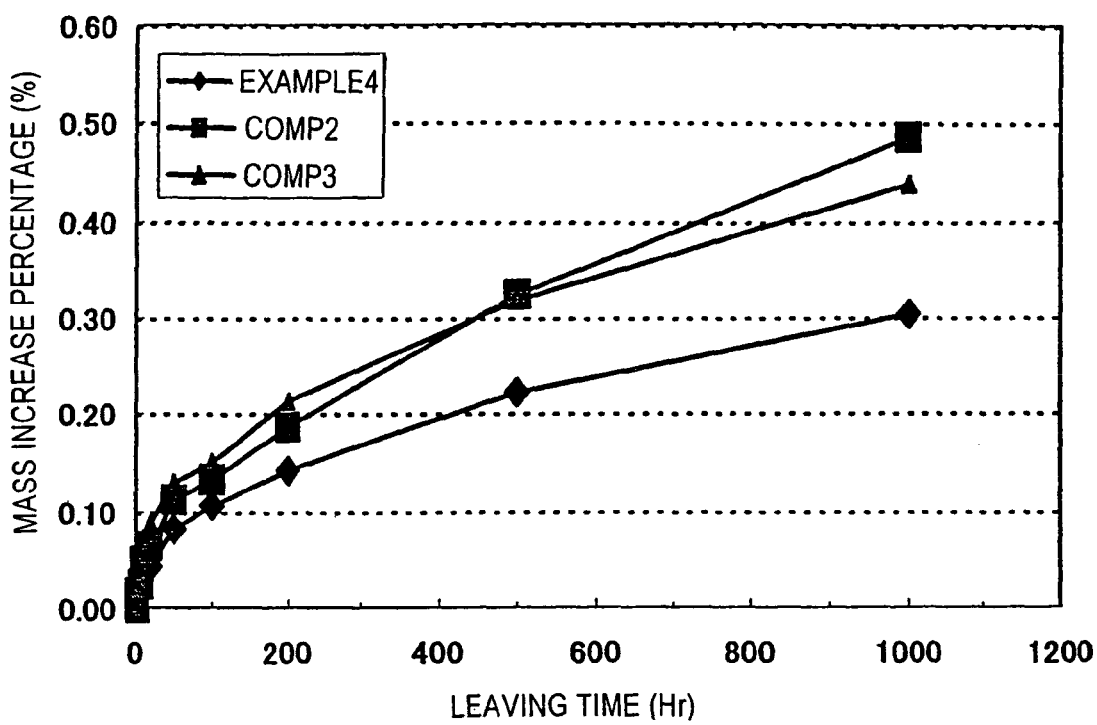
Figure 16B:
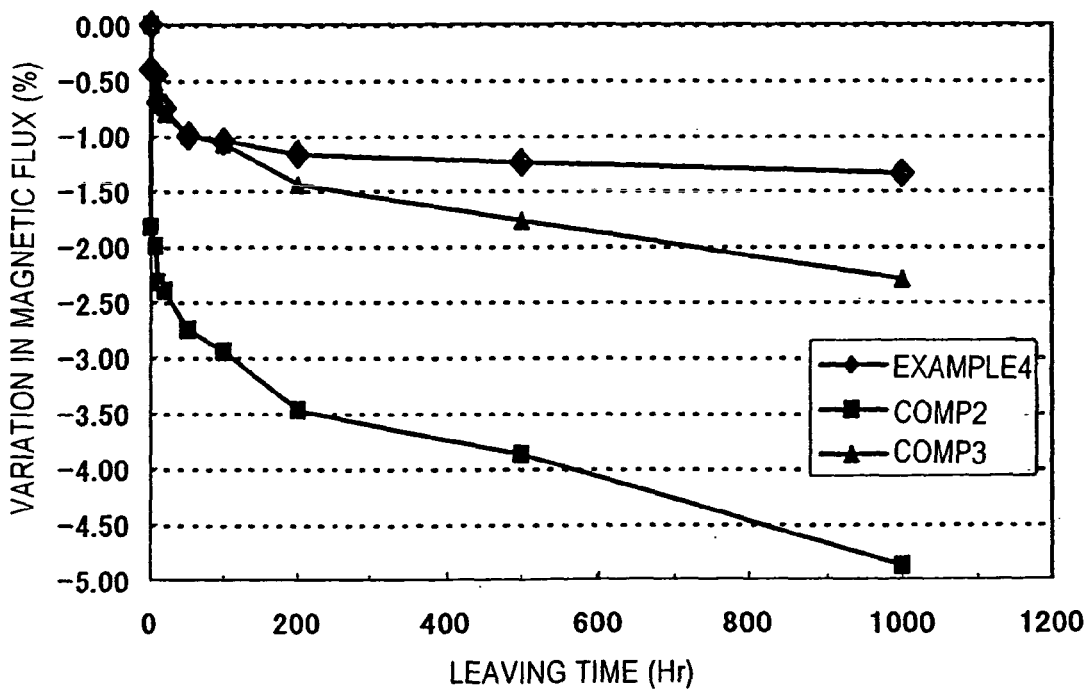

The anticorrosiveness of those bonded magnets, which had been made of the compounds representing Example No. 4 and Comparative Examples Nos. 2 and 3, was evaluated. More specifically, the bonded magnets, which had been magnetized with a pulsed magnetic field of about 3.2 MA/m or more (where n=3 in each of the example and comparative examples), were left in a high-temperature high-humidity environment with a temperature of about 80° C. and a relative humidity of about 90%, thereby obtaining mass increase percentages due to oxidation (i.e., {(mass after leaving−mass before leaving)÷(mass before leaving)}×100) and variations in magnetic flux (Φ open) (i.e., {(magnetic flux after leaving−magnetic flux before leaving)÷(magnetic flux before leaving)}×100). FIGS. 16(a) and 16(b) are graphs plotting the obtained results (where each set of data was averages at n=3) with respect to the time in which the magnet was left.

As a result of these experiments, it was discovered that the bonded magnet using the compound of preferred embodiments of the present invention (as represented by Example No. 4) allowed oxidation or deterioration in magnetic properties much less easily even under the high-temperature high-humidity environment than the bonded magnets using the compounds representing Comparative Examples Nos. 2 and 3 that included the conventional rapidly solidified alloy magnet powders such as the MQP-B and MQP-O.

EXAMPLE NO. 5 AND COMPARATIVE EXAMPLE NO. 4

How to Prepare Magnet Powder

A material, which had been mixed to have an alloy composition including about 8.5 at % of Nd, about 11.0 at % of B, about 2.5 at % of Ti, about 1.0 at % of C, about 2.0 at % of Co and Fe as the balance and a mass of about 5 kg, was introduced into a crucible and then inductively heated within an Ar atmosphere having a pressure maintained at about 50 kPa, thereby obtaining a molten alloy.

A rapidly solidified alloy was made from the molten alloy by a strip casting process. More specifically, the crucible was tilted to directly feed the molten alloy onto a pure copper chill roller, having a diameter of about 250 mm and rotating at a surface velocity of about 15 m/s, by way of a shoot, thereby rapidly cooling and solidifying the molten alloy. In feeding the melt onto the roller, the melt was branched into two flows on the shoot and the melt feeding rate was controlled to about 1.3 kg/min per melt flow by adjusting the tilt angle of the crucible.

As for the rapidly solidified alloys obtained in this manner, the thicknesses of 100 cast flakes were measured with a micro meter. As a result, the rapidly solidified alloys had an average thickness of about 85 μm with a standard deviation σ of about 11 μm. Thereafter, the rapidly solidified alloy that had been obtained in this manner was pulverized to a size of about 850 μm or less and then was loaded at a feeding rate of about 20 g/min into a hoop belt furnace, running at a belt feeding speed of about 100 mm/min and having a soaking zone with a length of about 500 mm, within an argon atmosphere that had a temperature retained at about 720° C. In this manner, the powder was thermally treated to obtain a magnet powder.

The crystal structure of the resultant magnet powder was identified by a powder XRD analysis. As a result, the magnet powder turned out to be a Ti-containing nanocomposite magnet powder including an $Nd_2Fe_{14}B$ phase, an $Fe_{23}B_6$ phase and an α-Fe phase.

Thereafter, the resultant magnet powder was pulverized with a pin disk mill as already described with reference to FIGS. 7(a) and 7(b) to obtain a magnet powder having the particle size distribution shown in the following Table 11. It should be noted that the particle size distribution was obtained by classifying about 50 g of the powder with a standard sieve complying with JIS Z8801 and plotting the masses of powder particles with respective sizes.

TABLE 11

| Particle size (μm) | Mass % |
|---|---|
| ≦38 | 9.48 |
| 38<, ≦53 | 10.90 |
| 53<, ≦75 | 20.51 |
| 75<, ≦106 | 41.14 |
| 106<, ≦125 | 15.10 |
| 125<, ≦150 | 2.84 |
| 150< | 0.03 |

The aspect ratios of the resultant 100 magnet powder particles were obtained with a scanning electron microscope. As a result, all of those particles had aspect ratios of about 0.3 to about 1.0. Also, $(BH)_{max}$ of the powder, measured with a vibrating sample magnetometer (VSM), was about 102 kJ/m³.

How to Prepare Compound

A compound representing Example No. 5 was prepared using about 94 mass % of the Ti-containing nanocomposite magnet powder (with a true density of about 7.5 g/cm³), about 0.75 mass % of titanate coupling agent (KR-TTS produced by Ajinomoto Fine-Techno Co., Inc.) as a coupling agent, about 0.5 mass % of amide stearate as a lubricant, and about 4.75 mass % of Nylon 12 resin powder (with a true density of about 1.1 g/cm³) as a thermoplastic resin. More specifically, the Ti-containing nanocomposite magnet powder being heated and stirred up was subjected to a coupling treatment by spraying the coupling agent toward the magnet powder. Thereafter, the Ti-containing nanocomposite magnet powder with the coupling agent was mixed with the lubricant and the thermoplastic resin, and then kneaded together by a continuous extrusion kneader at an extrusion temperature of about 170° C., thereby obtaining the compound.

A compound representing Comparative Example No. 4 was obtained by processing not the Ti-containing nanocomposite magnet powder but an MQP 13-9 powder on the market (with a true density of about 7.5 g/cm³ and $(BH)_{max}$ of about 104 kJ/m³, which is comparable to that of the Ti-containing nanocomposite magnet powder) by a method similar to that used for Example No. 5. In this case, the particle size distribution of the MQP 13-9 powder had been almost equalized with that shown in Table 11 through classification.

The compounds representing Example No. 5 and Comparative Example No. 4 were injection-molded at an injection temperature of about 250° C., thereby obtaining bonded magnets with a diameter of about 15 mm and a height of about 5 mm.

A pulsed magnetic field of about 3.2 MA/m or more was applied to the resultant bonded magnets, thereby magnetizing them. Thereafter, the magnetic properties thereof were measured with a BH tracer. As a result, the magnet that had been made of the compound representing Example No. 5 exhibited excellent magnetic properties (e.g., of which the $(BH)_{max}$ was as high as about 50.5 kJ/m³). On the other hand, the magnet that had been made of the compound representing Comparative Example No. 4 had a $(BH)_{max}$ of about 48.8 kJ/m³.

As can be seen from these results, although the compounds representing Example No. 5 and Comparative Example No. 4 used magnet powders with almost equivalent magnetic properties, a difference was still created between the resultant bonded magnets. It was also discovered that even when a magnet powder with a relatively low $(BH)_{max}$ of about 100 kJ/m³ was used, an injection-molded bonded magnet, exhibiting an excellent magnetic property of more than about 50 kJ/m³, could be easily obtained by mixing a coupling agent or a lubricant with the compound.

A bonded magnet exhibiting a superior magnetic property could be obtained from the compound representing Example No. 5 as compared with the compound representing Comparative Example No. 4 that had been made of a magnet powder with almost equivalent powder magnetic property. The reasons are believed to be as follows. Firstly, compared to the magnet powder used for Comparative Example No. 4, the Ti-containing nanocomposite magnet powder used for Example No. 5 had such composition and structure that should essentially cause a much lesser degree of oxidation during the kneading and injection molding processes. Also, the MQ powder used in Comparative Example No. 4 was further pulverized during the kneading process to newly expose other surfaces and further advance the oxidation unintentionally. In contrast, the Ti-containing nanocomposite magnet powder used for Example No. 5 exhibited excellent flowability during the kneading process and was much less likely pulverized unintentionally. In addition, sine the respective particles that made up the magnet powder were coated with the resin more completely, the oxidation should have been further reduced as a result.

The present invention provides a compound for a rare-earth bonded magnet, which can minimize the deterioration in magnetic properties due to the heat applied to form a bonded magnet by a compaction process, can improve the compactability including flowability, and can make a rare-earth bonded magnet with excellent magnetic properties and anticorrosiveness.

The compound of preferred embodiments of the present invention has excellent flowability, and can be used particularly effectively as a compound to be injection molded.

The present invention is not limited to each of the above-described preferred embodiments, and various modifications are possible within the range described in the claims. An embodiment obtained by appropriately combining technical means disclosed in each of the different preferred embodiments is included in the technical scope of the present invention.

What is claimed is:

1. A compound for a rare-earth bonded magnet, the compound comprising a rare-earth alloy powder and a binder,
    wherein the rare-earth alloy powder includes at least about 2 mass % of Ti-containing nanocomposite magnet powder particles, and
    the Ti-containing nanocomposite magnet powder particles have a composition represented by the general formula:

$(Fe_{1-m}T_m)_{100-x-y-z}Q_xR_yM_z$ where T is at least one element selected from the group consisting of Co and Ni; Q is at least one element selected from the group consisting of B and C and always includes B; R is at least one rare-earth element substantially excluding La and Ce; M is at least one metal element selected from the group consisting of Ti, Zr and Hf and always includes Ti; and the mole fractions x, y, z and m satisfy the inequalities of: 10 at %<x≦20 at %; 6 at %≦y<10 at %; 0.1 at %≦z≦12 at %; and 0≦m≦0.5, respectively,
    the Ti-containing nanocomposite magnet powder particles include at least two ferromagnetic crystalline phases, in which hard magnetic phases have an average crystal grain size of about 10 nm to about 200 nm, soft magnetic phases have an average crystal grain size of about 1 nm to about 100 nm, and the average crystal grain size of the soft magnetic phases is smaller than the average crystal grain size of the hard magnetic phases,
    the Ti-containing nanocomposite magnetic powder particles include an $R_2Fe_{14}B$ compound phase at 60 volume % or more, and
    the soft magnetic phase of the Ti-containing nanocomposite magnetic powder particles includes an iron-based boride phase.

2. The compound of claim 1, wherein the soft magnetic phases are present on a grain boundary between the hard magnetic phases.

3. The compound of claim 1, wherein the Ti-containing nanocomposite magnet powder particles have aspect ratios of about 0.3 to about 1.0.

4. The compound of claim 1, wherein the rare-earth alloy powder includes at least about 10 mass % of the Ti-containing nanocomposite magnet powder particles with particle sizes of about 53 μm or less.

5. The compound of claim 1, wherein the rare-earth alloy powder includes at least about 8 mass % of the Ti-containing nanocomposite magnet powder particles with particle sizes of about 38 μm or less.

6. The compound of claim 1, wherein the rare-earth alloy powder includes at least about 70 mass % of the Ti-containing nanocomposite magnet powder particles.

7. The compound of claim 1, wherein the rare-earth alloy powder consists essentially of the Ti-containing nanocomposite magnet powder particles.

8. The compound of claim 1, wherein the rare-earth alloy powder has an oxygen content of less than about 0.24 mass % when left in the air for an hour at a heating temperature of about 300° C.

9. The compound of claim 1, wherein when left in the air at about 400° C. for approximately 10 minutes, the compound increases its mass by less than about 0.26 mass % due to oxidation.

10. The compound of claim 1, wherein the binder includes a thermoplastic resin.

11. The compound of claim 10, wherein the thermoplastic resin has a softening point of about 180° C. or more.

12. The compound of claim 1, wherein the compound includes the rare-earth alloy powder at about 60 mass % to about 99 mass % with respect to the sum of the rare-earth alloy powder and the binder.

13. The compound of claim 1, wherein the rare-earth alloy powder is made up of powder particles obtained by pulverizing a rapidly solidified alloy with a thickness of about 60 μm to about 300 μm.

14. The compound of claim 1, wherein the rare-earth alloy powder is made up of powder particles obtained by pulverizing a rapidly solidified alloy that has been formed by a strip casting process.

15. The compound of claim 1, wherein the rare-earth alloy powder is made up of powder particles obtained from a rapidly solidified alloy.

16. The compound of claim 1, further comprising a coupling agent.

17. A bonded magnet made of the compound of claim 1.

18. The bonded magnet of claim 17, wherein the magnet is made by an injection molding process.

19. The bonded magnet of claim 18, wherein the rare-earth alloy powder is loaded to at least about 60 vol %.

20. An electronic appliance comprising the bonded magnet of claim 17.

* * * * *